(12) United States Patent
Mattoussi et al.

(10) Patent No.: US 10,040,874 B2
(45) Date of Patent: Aug. 7, 2018

(54) MULTIFUNCTIONAL AND MULTICOORDINATING AMPHIPHILIC POLYMER LIGANDS FOR INTERFACING SEMICONDUCTING, MAGNETIC, AND METALLIC NANOCRYSTALS WITH BIOLOGICAL SYSTEMS

(71) Applicant: The Florida State University Research Foundation, Inc., Tallahassee, FL (US)

(72) Inventors: Hedi Mattoussi, Tallahassee, FL (US); Wentao Wang, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 15/241,203

(22) Filed: Aug. 19, 2016

(65) Prior Publication Data
US 2017/0058056 A1    Mar. 2, 2017

Related U.S. Application Data

(60) Provisional application No. 62/210,801, filed on Aug. 27, 2015.

(51) Int. Cl.
| | | |
|---|---|---|
| C08F 8/32 | (2006.01) |
| C08G 81/02 | (2006.01) |
| C09D 123/36 | (2006.01) |
| C09D 187/00 | (2006.01) |
| G01N 33/50 | (2006.01) |
| G01N 33/58 | (2006.01) |
| C09K 11/02 | (2006.01) |
| C09K 11/88 | (2006.01) |
| C09D 133/06 | (2006.01) |
| B82Y 15/00 | (2011.01) |

(52) U.S. Cl.
CPC .............. *C08F 8/32* (2013.01); *C09D 123/36* (2013.01); *C09D 133/064* (2013.01); *C09K 11/025* (2013.01); *C09K 11/883* (2013.01); *B82Y 15/00* (2013.01); *Y10S 977/774* (2013.01)

(58) Field of Classification Search
CPC ........ C08F 22/36; C08F 22/06; C08F 222/06; C08F 8/32
See application file for complete search history.

(56) References Cited

U.S. PATENT DOCUMENTS 9,150,748 B1   10/2015   Mattoussi et al.
9,309,432 B1   4/2016   Mattoussi et al.

OTHER PUBLICATIONS

Wang et al. (A multifunctional amphiphilic polymer as a platform for surface-functionalizing metallic and other inorganic nanostructures, Faraday Discuss., 2014, 175, 137) (Year: 2014).*

(Continued)

*Primary Examiner* — Alexandre F Ferre
(74) *Attorney, Agent, or Firm* — Armstrong Teasdale LLP

(57) ABSTRACT

The disclosure is directed to a set of multi-coordinating imidazole- and zwitterion-based ligands suited for surface-functionalizing quantum dots (QDs). The polymeric ligands are built using a one-step nucleophilic addition reaction between poly(isobutylene-alt-maleic anhydride) and distinct amine-containing functionalities.

19 Claims, 15 Drawing Sheets

(56) References Cited

OTHER PUBLICATIONS

Figure 2A:
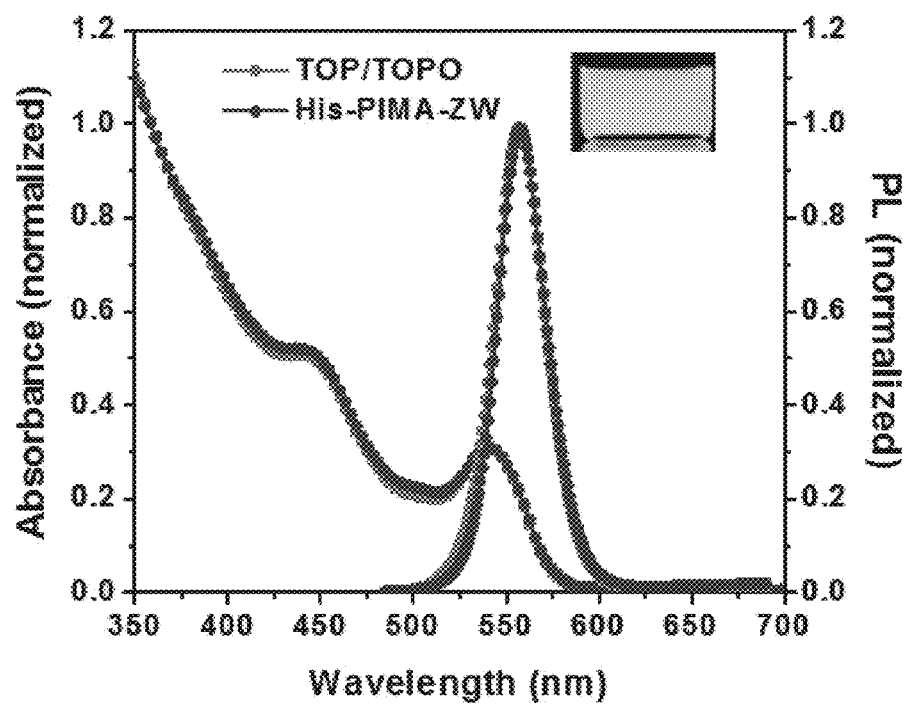

Giovanelli et al. (Highly Enhanced Affinity of Multidentate versus Bidentate Zwitterionic Ligands for Long-Term Quantum Dot Bioimaging, Langmuir, 2012, 28,1 5177-15184). (Year: 2012).*

Alivisatos, A.P., Semiconductor Clusters, Nanocrystals, and Quantum Dots, Science; Feb. 16, 1996, vol. 271, No. 5251; ProQuest; pp. 933-937.

Murray, C. B., et al., Synthesis and Characterization of Monodisperse Nanocrystals and Close-Packed Nanocrystal Assemblies, Annu. Rev. Mater. Sci, 2000, vol. 30 pp. 545-610.

Klimov, V.I. et al., Optical Gain and Stimulated Emission in Nanocrystal Quantum Dots, Science, Oct. 13, 2000, vol. 290, No. 5490; ProQuest, pp. 314-317.

Malko, A.V. et al., From amplified spontaneous emission to microring lasing using nanocrystal quantum dots solids, Applied Physcis Letters, Aug. 12, 2002, vol. 81, No. 7, pp. 1303-1305.

Nozik, A. J. et al., Semiconductor Quantum Dots and Quantum Dot Arrays and Applications of Multiple Exciton Generation to Third-Generation Photovoltaic Solar Cells, Chem. Rev., 2010, vol. 110, pp. 6873-6890.

Li Ling et al., Highly Efficient CdS Quantum Dot-Sensitized Solar Cells Based on a Modified Polysulfide Electrolyte, Journal of the American Chemical Society, 2011, vol. 133, pp. 8458-8460.

Raymo, Francisco M., et al., Luminescent chemosensors based on semiconductor quantum dots, Physical Chemistry Chemical Physics, Feb. 1, 2007, vol. 9, pp. 2036-2043.

Medintz, Igor L., et al., Quantum dot bioconjugates for imaging labelling and sensing, Nature Materials, Jun. 2005, vol. 4, pp. 435-446.

Michalet, X. et al., Quantum Dots for Live Cells, in Vivo Imaging, and Diagnostics, Science, Jan. 28, 2005, vol. 307, pp. 538-544.

Biju, Vasudevanpillai et al., Delivering quantum dots to cells: bioconjugated quantum dots for targeted and nonspecific extracellular and intracellular imaging, Chemical Society Reviews, May 27, 2010, vol. 39, pp. 3031-3056.

Zrazhevskiy, Paul et al., Designing multifunctional quantum dots for bioimaging, detection, and drug delivery, Chemical Society Reviews, Dec. 23, 2009, vol. 39, pp. 4326-4354.

Pinaud, Fabien et al., Probing cellular events, one quantum dot at a time, Nature Methods, Apr. 2010, vol. 7, No. 4, pp. 275-285.

Jaiswal, Jyoti K. et al., Long-term multiple color imaging of live cells using quantum dot bioconjugates, Nature Biotechnology, Jan. 2003, vol. 21, pp. 47-51.

Gao, Xiaohu, et al., In vivo cancer targeting and imaging with semiconductor quantum dots, Nature Biotechnology, Aug. 4, 2004, vol. 22, No. 8, pp. 969-976.

Rossetti, R. et al., Size effects in the excited electronic states of small colloidal CdS crystallites, Journal of Chemical Physics, 1984, vol. 80, pp. 4464-4469.

Murray, C. B. et al., Synthesis and Characterization of Nearly Monodisperse CdE (E=S, Se, Te) Semiconductor Nanocrystallites, American Chemical Socity, 1993, vol. 115, pp. 8706-8715.

Dabbousi, B. O. et al., (CdSe)Zns Core-Shell Quantum Dots: Synthesis and Characterization of a Size Series of Highly Luminescent Nanocrystallites, 1997, vol. 101, pp. 9463-9475.

Liu, Wenhao et al., Compact Biocompatible Quantum Dots Functionalized for Cellular Imaging, Journal of American Chemical Society, 2008, vol. 130, pp. 1274-1284.

Susumu, Kimihiro et al., Multifunctional ligands based on dihydrolipoic acid and polyethylene glycol to promote biocompatibility of quantum dots, Nature Protocols, 2009, vol. 4, No. 3, pp. 424-436.

Jung, Jongjin et al., Selective Inhibition of Human Tumor Cells through Multifunctional Quantum-Dot-Based siRNA Delivery**, Angew. Chem. Inc. Ed., 2010, vol. 49, pp. 103-107.

Liu, Wenhao et al., Compact Biocompatible Quantum Dots via RAFT-Mediated Synthesis of Imidazole-Based Random Copolymer Lignad, American Chemical Society, 2010, vol. 132, pp. 472-483.

Lee, Jae-Hyun et al., Artificially engineered magnetic nanoparticles for ultra-sensitive molecular imaging, Jan. 2007, vol. 13, No. 1, pp. 95-99.

Stewart, Michael H. et al., Multidentate Poly(ethylene glycol) Ligands Provide Colloidal Stability to Semiconductor and Metallic Nanocrystals in Extreme Conditions, Journal of American Chemical Society, 2010, vol. 132, pp. 9804-9813.

Muro, Eleonora et al., Small and Stable Sulfobetaine Zwitterionic Quantum Dots for Functional Live-Cell Imaging, Journal of American Chemical Society, 2010, vol. 132, pp. 4556-4557.

Lees, Emma E. et al., Experimental Determination of Quantum Dot Size Distributions, Ligand Packing Densities, an Bioconjugation Using Analytical Ultracentrifugation, American Chemical Society, 2008, vol. 8, No. 9, pp. 2883-2890.

Liu, Lu et al., Bifunctional Multidentate Ligand Modified Highly Stable Water-Soluble Quantum Dots, Inorganic Chemistry, American Chemical Society, 2010, vol. 49, pp. 3768-3775.

Clapp, Aaron R. et al., Capping of CdSe—ZnS quantum dots with DHLA and subsequent conjugation with proteins, Nature Protocols, 2006, vol. 1, No. 3, pp. 1258-1266.

Qu, Lianhua et al., Alternative Routes toward High Quality CdSe Nanocrystals, American Chemical Society, 2001, vol. 1, No. 6, pp. 333-337.

Mei, Bing C., Modular poly(ethylene glycol) ligands for biocompatible semiconductor and gold nanocrystals with extended pH and ionic stability, J. Mater. Chem., 2008, vol. 18, pp. 4949-4958.

Uyeda, Tetsuo H. et al., Synthesis of Compact Multidentate Ligands to Prepare Stable Hydrophilic Quantum Dot Fluorophores, Journal of American Chemical Society, 2005, vol. 127, pp. 3870-3878.

Choi, Chung Hang J., et al., Mechanism of active targeting in solid tumors with transferrin-containing gold nanoparticles, PNAS, Jan. 19, 2010, vol. 107, No. 3, 1235-1240.

Clapp, Aaron R. et al., Fluorescence Resonance Energy Transfer Between Quantum Dot Donors, Journal of American Chemical Society, 2004, vol. 126, pp. 301-310.

Medintz, Igor L., et al., Proteolytic activity monitored by fluorescence resonance energy transfer through quantum-dot-peptide conjugates, Nature Materials, Jul. 2006, vol. 5, pp. 581-589.

Chen, Chun-Yen et al., Potassium ion recognition by 15-crown-5 functionalized CdSe/ZnS quantum dots in H2O, Chem. Commun, 2006, pp. 263-265.

Susumu, Kimihiro et al., Colloidal Quantum Dots: Synthesis, Photophysical Properties, and Biofunctionalization Strategies, Atrech House, Aug. 25, 2008, pp. 1-26.

Hines, Margaret A., et al., Synthesis and Characterization of Strongly Luminescing ZnS-Capped CdSe Nanocrystals, J. Phys. Chem, American Chemical Society, 1996, vol. 100, No. 2, pp. 468-471.

van Embden, Joel et al., Mapping the Optical Properties of CdSe/CdS Heterostructure Nanocrystals: The Effects of Core Size and Shell Thickness, Journal of American Chemical Society, 2009, vol. 131, pp. 14299-14309.

Gerion, Daniele, et al., Synthesis and Properties of Biocompatible Water-Soluble Silica-Coated CdSe/ZnS Semicondutor Quantum Dots, J. Phys. Chem. B, 2001, vol. 105, pp. 8861-8871.

Bhang, Suk Ho et al., Hyaluronic Acid-Quantum Dot Conjugates for In Vivo Lymphatic Vessel Imaging, American Chemical Society, May 28, 2009, vol. 3, No. 6, pp. 1389-1398.

Yildiz, Ibrahim et al., Biocompatible CdSe—ZnS Core-Shell Quantum Dots Coated with Hydrophilic Polythiols, American Chemical Society, 2009, vol. 25, No. 12, pp. 7090-7096.

Yildiz, Ibrahim et al., Biocompatible CdSe—ZnS Core-Shell Quantum Dots with Reactive Function Groups on Their Surface, Langmuir, 2010, vol. 26, No. 13, pp. 11503-11511.

Shen, Hongyan et al., Poly(ethylene glycol) Carbondiimide Coupling Reagents for the Biological and Chemical Functionalization of Water-Soluble Nanoparticles, American Chemical Society, 2009, vol. 3, No. 4, pp. 915-923.

Anderson, Robin E. et al., Systematic Investigation of Preparing Biocompatible, Single, and Small ZnS-Capped CdSe Quantum Dots with Amphiphilic Polymers, American Chemical Society, 2008, vol. 2, No. 7, pp. 1341-1352.

Bullen, C. et al., The Effects of Chemisorption on the Luminescence of CdSe Quantum Dots, Langmuir, 2006, vol. 22, pp. 3007-3013.

(56) References Cited

OTHER PUBLICATIONS

Munro, Andrea M. et al., Quantitative Study of the Effects of Surface Ligand Concentration on CdSe Nanocrystal Photoluminescence, J. Phys. Chem. C, 2007, vol. 111, pp. 6220-6227.

Mei, Bing C. et al., Effects of Ligand Coordination Number and Surface Curvature on the Stability of Gold Nanoparticles in Aqueous Solutions, Langmuir, American Chemical Society, 2009, vol. 25, No. 18, pp. 10604-10611.

Na, Hyon Bin et al., Multidentate Catechol-Based Polyethylene Glycol Oligomers Provide Enhanced Stability and Biocompatibility to Iron Oxide Nanoparticles, American Chemical Society, 2012, vol. 6, No. 1, pp. 389-399.

U.S. Appl. No. 13/888,488 entitled Photo-Induced Phase Transfer of Luminescent Quantum Dots filed May 7, 2013; pp. 1-47.

U.S. Appl. No. 14/672,436 entitled Polymer Ligands for Nanoparticles filed Mar. 30, 2015, pp. 1-74.

U.S. Appl. No. 14/672,462 entitled Photoligation of an Amphiphilic Polymer with Mixed Coordination Provides Compact and Reactive Quantum Dots filed Mar. 30, 2015, pp. 1-72.

Wang, Wentao et al., Design of a Multi-Dopamine-Modified Polymer Ligand Optimally Suited for Interfacing Magnetic Nanoparticles with Biological Systems, Langmuir Article, 2014, pp. 6197-6208, vol. 30, ACS Publications.

Wang, Wentao et al., Photoligaion of an Amphiphilic Polymer with Mixed Coordination Provides Compact and Reactive Quantum Dots, Journal of the American Chemical Society, 2015, pp. 5438-5451, vol. 137, ACS Publications.

\* cited by examiner

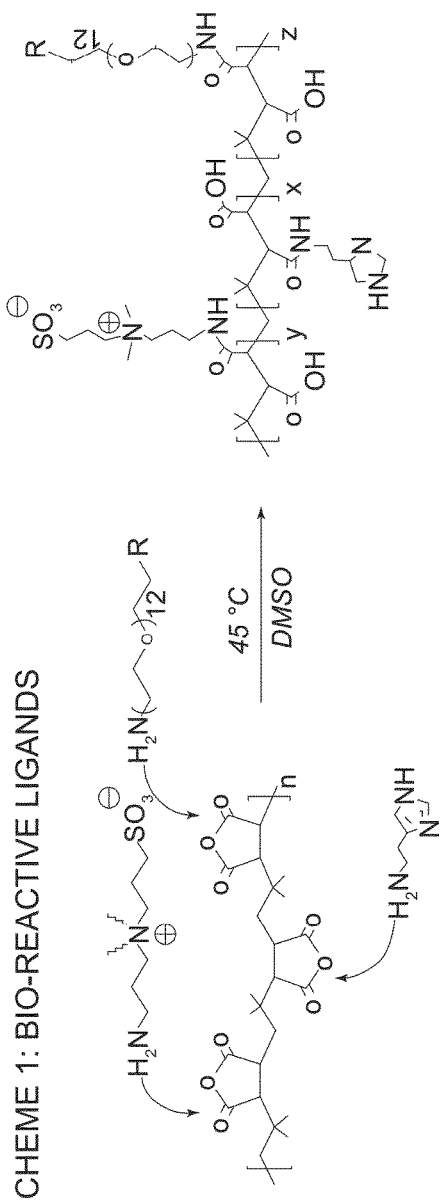
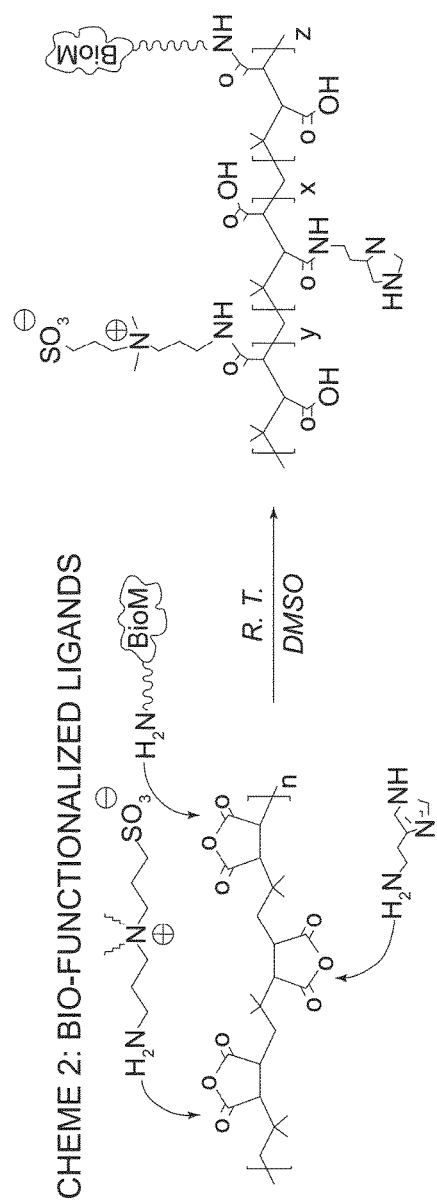
FIG. 1A

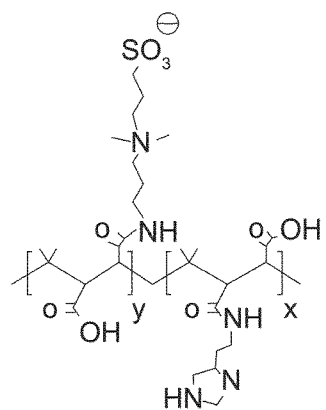
His-PIMA-ZW
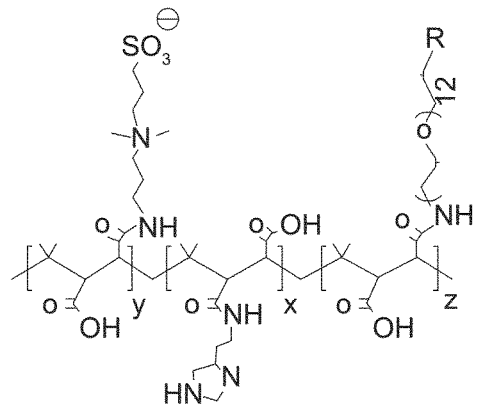
His-PIMA-ZW/NH$_2$
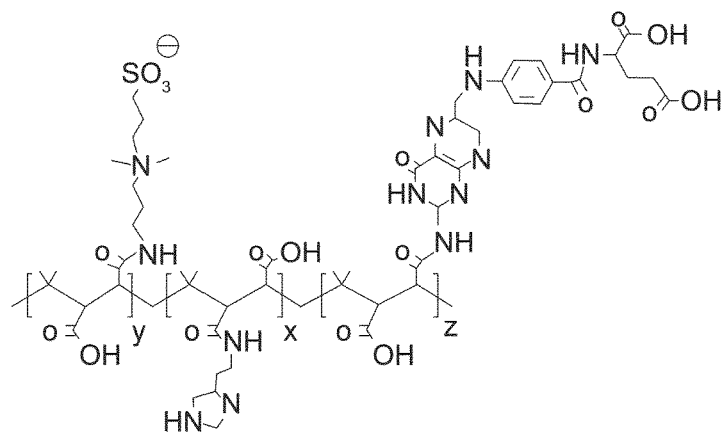
His-PIMA-ZW/FA
FIG. 1B

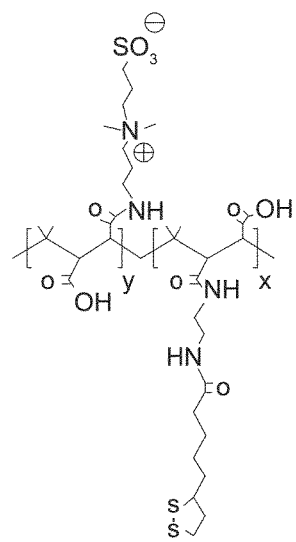
LA-PIMA-ZW/COOH
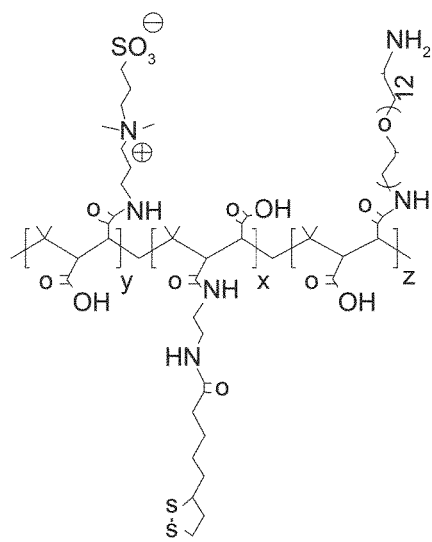
LA-PIMA-ZW/NH$_2$
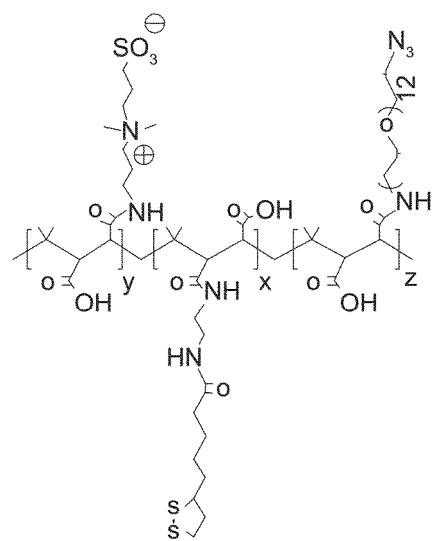
LA-PIMA-ZW/N$_3$
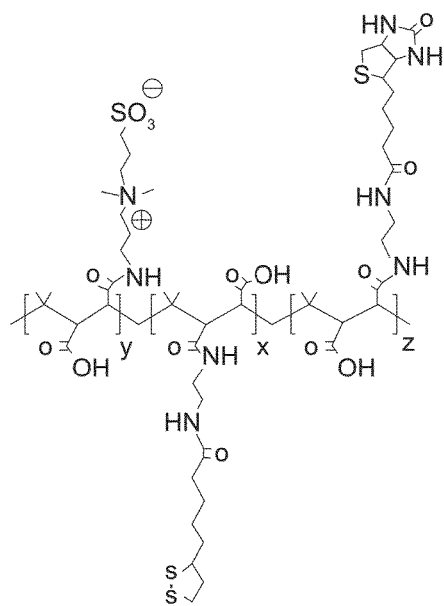
LA-PIMA-ZW/biotin
FIG. 1C

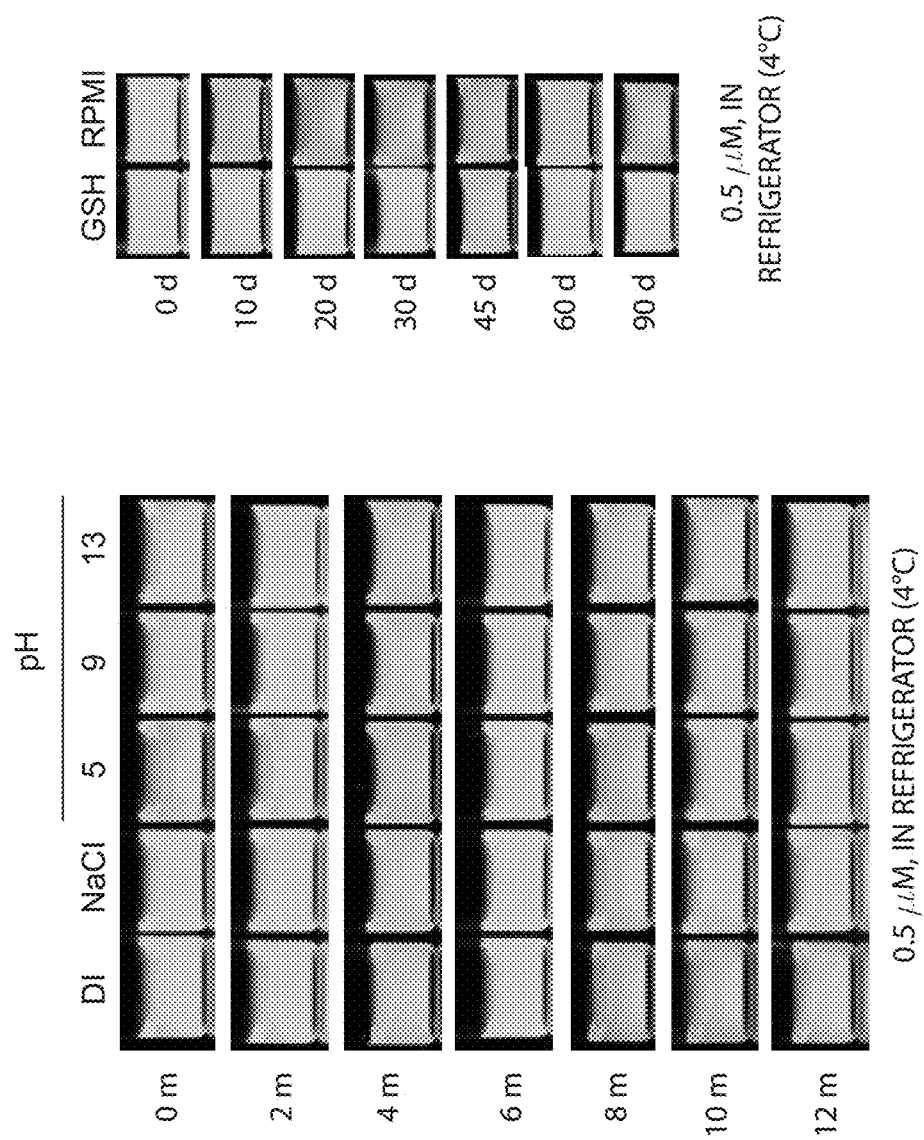

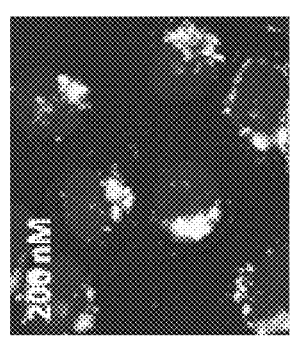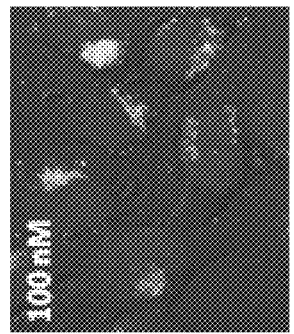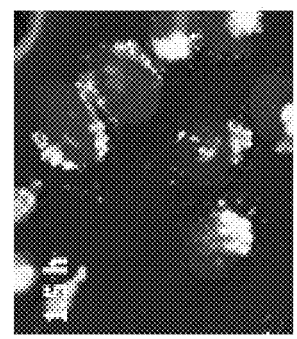
FIG. 6A      FIG. 6B      FIG. 6C

MULTIFUNCTIONAL AND MULTICOORDINATING AMPHIPHILIC POLYMER LIGANDS FOR INTERFACING SEMICONDUCTING, MAGNETIC, AND METALLIC NANOCRYSTALS WITH BIOLOGICAL SYSTEMS

CROSS REFERENCE TO RELATED APPLICATION(S)

This application claims priority to U.S. provisional application Ser. No. 62/210,801, filed Aug. 27, 2015, the disclosure of which is hereby incorporated by reference as if set forth in its entirety.

STATEMENT REGARDING FEDERALLY SPONSORED RESEARCH OR DEVELOPMENT

This invention was made with government support under NSF-CHE #1508501 and #1058957 awarded by the National Science Foundation. The government has certain rights in the invention.

FIELD OF THE INVENTION

The present invention relates to a polymer ligand suitable for coordinating with a nanoparticle or a quantum dot.

BACKGROUND OF THE INVENTION

Semiconductor nanocrystals (quantum dots, QDs) along with metal and metal-oxide nanoparticles possess unique size and/or composition-tunable physical and spectroscopic properties. See References 1-5. For instance, QDs such as ZnS-overcoated CdSe nanocrystals exhibit narrow emission with high quantum yield and remarkable photostability. See References 6-8. Additionally, because these nanocrystals are in a size range comparable to those of biomolecules, they are very attractive for use as imaging probes and as sensing and diagnostic tools. See References 9-20. Nonetheless, application of these materials in biology is still limited by constraints that include a rather large hydrodynamic size and limited colloidal stability. See References 21-26. The large size negatively affects their transport properties in biological media, such as cellular internalization, blood vasculature circulation lifetime and renal clearance. See References 21, 23, and 25-27. Furthermore, several important in vivo studies, such as the fluorescence tracking of protein dynamics and detection of individual binding events, require the use of very small reagent concentrations. See Reference 28. However, achieving robust colloidal stability of hydrophilic QDs at nanomolar concentrations and under ambient conditions is still challenging. See References 22-24. These properties are primarily dependent on the nature of the capping ligands and the surface coating strategy used to functionalize the nanocrystals.

Water solubilization of high quality QDs and other nanocrystals, prepared using high temperature growth routes, has been achieved via either cap exchange with thiol-based metal-coordinating ligands or encapsulation within amphiphilic block copolymers and phospholipid micelles. See References 9 and 29-36. However, both approaches have faced inherent limitations. For example, under room temperature and light exposure conditions, thiol-based ligands tend to oxidize with time, which can cause ligand desorption from the QD surface and result in aggregation; this is particularly important at very low reagent concentrations. See References 22 and 37-39. In addition, thiol coordination has been reported to weaken the QD fluorescence. See Reference 40. Conversely, the encapsulation strategy produces nanoparticles with limited stability at low concentrations and it also tends to significantly increase the hydrodynamic radius of the QDs. See References 35 and 41.

Recently, several strategies have been explored to alleviate the above issues. To minimize the hydrodynamic size of the QDs without sacrificing aqueous solubility, a series of dihydrolipoic acid (DHLA)-based ligands appended with zwitterion groups have been developed as an alternative to poly(ethylene glycol) (PEG). See References 24 and 42-47. Due to their small volume, ligands based on the zwitterion motif yield nanocrystals with compact size. Additionally, imidazole-based ligands have been proposed by a few groups as an alternative to thiols, because they are not affected by oxidation and tend to maintain high QD photoluminescence (PL). See References 22, 25, 48, and 49.

The present disclosure refers to the following references by number:
(1) Murray, C. B.; Norris, D. J.; Bawendi, M. G. *J Am Chem Soc* 1993, 115, 8706.
(2) Alivisatos, A. P. *J Phys Chem-US* 1996, 100, 13226.
(3) Murray, C. B.; Kagan, C. R.; Bawendi, M. G. *Annu Rev Mater Sci* 2000, 30, 545.
(4) Peng, Z. A.; Peng, X. G. *J Am Chem Soc* 2001, 123, 183.
(5) Talapin, D. V.; Rogach, A. L.; Kornowski, A.; Haase, M.; Weller, H. *Nano Lett* 2001, 1, 207.
(6) Hines, M. A.; Guyot-Sionnest, P. *Journal of Physical Chemistry* 1996, 100, 468.
(7) Dabbousi, B. O.; RodriguezViejo, J.; Mikulec, F. V.; Heine, J. R.; Mattoussi, H.; Ober, R.; Jensen, K. F.; Bawendi, M. G. *J Phys Chem B* 1997, 101, 9463.
(8) Reiss, P.; Bleuse, J.; Pron, A. *Nano Lett* 2002, 2, 781.
(9) Wu, X. Y.; Liu, H. J.; Liu, J. Q.; Haley, K. N.; Treadway, J. A.; Larson, J. P.; Ge, N. F.; Peale, F.; Bruchez, M. P. *Nat Biotechnol* 2003, 21, 452.
(10) Michalet, X.; Pinaud, F. F.; Bentolila, L. A.; Tsay, J. M.; Doose, S.; Li, J. J.; Sundaresan, G.; Wu, A. M.; Gambhir, S. S.; Weiss, S. *Science* 2005, 307, 538.
(11) Zrazhevskiy, P.; Sena, M.; Gao, X. H. *Chem Soc Rev* 2010, 39, 4326.
(12) Chou, L. Y. T.; Ming, K.; Chan, W. C. W. *Chem Soc Rev* 2011, 40, 233.
(13) Freeman, R.; Willner, I. *Chem Soc Rev* 2012, 41, 4067.
(14) Kairdolf, B. A.; Smith, A. M.; Stokes, T. H.; Wang, M. D.; Young, A. N.; Nie, S. M. *Annu Rev Anal Chem* 2013, 6, 143.
(15) Kim, C. S.; Duncan, B.; Creran, B.; Rotello, V. M. *Nano Today* 2013, 8, 439.
(16) Sapsford, K. E.; Algar, W. R.; Berti, L.; Gemmill, K. B.; Casey, B. J.; Oh, E.; Stewart, M. H.; Medintz, I. L. *Chemical Reviews* 2013, 113, 1904.
(17) Lemon, C. M.; Curtin, P. N.; Somers, R. C.; Greytak, A. B.; Lanning, R. M.; Jain, R. K.; Bawendi, M. G.; Nocera, D. G. *Inorg Chem* 2014, 53, 1900.
(18) Howes, P. D.; Chandrawati, R.; Stevens, M. M. *Science* 2014, 346, 53.
(19) Palui, G.; Aldeek, F.; Wang, W. T.; Mattoussi, H. *Chemical Society Reviews* 2015, 44, 193.
(20) Silvi, S.; Credi, A. *Chemical Society Reviews* 2015, 44, 4275.
(21) Choi, H. S.; Liu, W.; Misra, P.; Tanaka, E.; Zimmer, J. P.; Ipe, B. I.; Bawendi, M. G.; Frangioni, J. V. *Nature Biotechnology* 2007, 25, 1165.
(22) Liu, W. H.; Greytak, A. B.; Lee, J.; Wong, C. R.; Park, J.; Marshall, L. F.; Jiang, W.; Curtin, P. N.; Ting, A. Y.;

Nocera, D. G.; Fukumura, D.; Jain, R. K.; Bawendi, M. G. *J Am Chem Soc* 2010, 132, 472.

(23) Baker, M. *Nature methods* 2010, 7, 957.

(24) Giovanelli, E.; Muro, E.; Sitbon, G.; Hanafi, M.; Pons, T.; Dubertret, B.; Lequeux, N. *Langmuir* 2012, 28, 15177.

(25) Han, H. S.; Martin, J. D.; Lee, J.; Harris, D. K.; Fukumura, D.; Jain, R. K.; Bawendi, M. *Angew Chem Int Ed Engl* 2013, 52, 1414.

(26) Cai, E.; Ge, P. H.; Lee, S. H.; Jeyifous, O.; Wang, Y.; Liu, Y. X.; Wilson, K. M.; Lim, S. J.; Baird, M. A.; Stone, J. E.; Lee, K. Y.; Davidson, M. W.; Chung, H. J.; Schulten, K.; Smith, A. M.; Green, W. N.; Selvin, P. R. *Angew Chem Int Edit* 2014, 53, 12484.

(27) Mattoussi, H.; Palui, G.; Na, H. B. *Adv Drug Deliver Rev* 2012, 64, 138.

(28) Dahan, M.; Levi, S.; Luccardini, C.; Rostaing, P.; Riveau, B.; Triller, A. *Science* 2003, 302, 442.

(29) Dubertret, B.; Skourides, P.; Norris, D. J.; Noireaux, V.; Brivanlou, A. H.; Libchaber, A. *Science* 2002, 298, 1759.

(30) Susumu, K.; Uyeda, H. T.; Medintz, I. L.; Pons, T.; Delehanty, J. B.; Mattoussi, H. *J Am Chem Soc* 2007, 129, 13987.

(31) Yu, W. W.; Chang, E.; Falkner, J. C.; Zhang, J. Y.; Al-Somali, A. M.; Sayes, C. M.; Johns, J.; Drezek, R.; Colvin, V. L. *J Am Chem Soc* 2007, 129, 2871.

(32) Liu, W.; Howarth, M.; Greytak, A. B.; Zheng, Y.; Nocera, D. G.; Ting, A. Y.; Bawendi, M. G. *J Am Chem Soc* 2008, 130, 1274.

(33) Lin, C. A.; Sperling, R. A.; Li, J. K.; Yang, T. Y.; Li, P. Y.; Zanella, M.; Chang, W. H.; Parak, W. J. *Small* 2008, 4, 334.

(34) Yildiz, I.; McCaughan, B.; Cruickshank, S. F.; Callan, J. F.; Raymo, F. M. *Langmuir* 2009, 25, 7090.

(35) Lees, E. E.; Nguyen, T. L.; Clayton, A. H. A.; Mulvaney, P.; Muir, B. W. *ACS Nano* 2009, 3, 1121.

(36) Thiry, M.; Boldt, K.; Nikolic, M. S.; Schulz, F.; Ijeh, M.; Panicker, A.; Vossmeyer, T.; Weller, H. *ACS nano* 2011, 5, 4965.

(37) Zhang, F.; Lees, E.; Amin, F.; Gil, P. R.; Yang, F.; Mulvaney, P.; Parak, W. J. *Small* 2011, 7, 3113.

(38) Nagaraja, A. T.; Sooresh, A.; Meissner, K. E.; McShane, M. J. *ACS nano* 2013, 7, 6194.

(39) Wang, W.; Kapur, A.; Ji, X.; Safi, M.; Palui, G.; Palomo, V.; Dawson, P. E.; Mattoussi, H. *J Am Chem Soc* 2015, 137, 5438.

(40) Bullen, C.; Mulvaney, P. *Langmuir* 2006, 22, 3007.

(41) Mattoussi, H.; Cheon, J. *Inorganic nanoprobes for biological sensing and imaging*; Artech House: Boston, 2009.

(42) Muro, E.; Pons, T.; Lequeux, N.; Fragola, A.; Sanson, N.; Lenkei, Z.; Dubertret, B. *J Am Chem Soc* 2010, 132, 4556.

(43) Park, J.; Nam, J.; Won, N.; Jin, H.; Jung, S.; Jung, S.; Cho, S. H.; Kim, S. *Advanced Functional Materials* 2011, 21, 1558.

(44) Susumu, K.; Oh, E.; Delehanty, J. B.; Blanco-Canosa, J. B.; Johnson, B. J.; Jain, V.; Hervey, W. J.; Algar, W. R.; Boeneman, K.; Dawson, P. E.; Medintz, I. L. *J Am Chem Soc* 2011, 133, 9480.

(45) Zhan, N. Q.; Palui, G.; Safi, M.; Ji, X.; Mattoussi, H. *J Am Chem Soc* 2013, 135, 13786.

(46) Sun, M. H.; Yang, L. K.; Jose, P.; Wang, L.; Zweit, J. *J Mater Chem B* 2013, 1, 6137.

(47) Garcia, K. P.; Zarschler, K.; Barbaro, L.; Barreto, J. A.; O'Malley, W.; Spiccia, L.; Stephan, H.; Graham, B. *Small* 2014, 10, 2516.

(48) Zhang, P. F.; Liu, S. H.; Gao, D. Y.; Hu, D. H.; Gong, P.; Sheng, Z. H.; Deng, J. H.; Ma, Y. E.; Cai, L. T. *J Am Chem Soc* 2012, 134, 8388.

(49) Viswanath, A.; Shen, Y.; Green, A. N.; Tan, R.; Greytak, A. B.; Benicewicz, B. C. *Macromolecules* 2014, 47, 8137.

(50) Mattoussi, H.; Mauro, J. M.; Goldman, E. R.; Anderson, G. P.; Sundar, V. C.; Mikulec, F. V.; Bawendi, M. G. *J Am Chem Soc* 2000, 122, 12142.

(51) Medintz, I. L.; Clapp, A. R.; Mattoussi, H.; Goldman, E. R.; Fisher, B.; Mauro, J. M. *Nature Materials* 2003, 2, 630.

(52) Clapp, A. R.; Medintz, I. L.; Mauro, J. M.; Fisher, B. R.; Bawendi, M. G.; Mattoussi, H. *J Am Chem Soc* 2004, 126, 301.

(53) Dif, A.; Boulmedais, F.; Pinot, M.; Roullier, V.; Baudy-Floc'h, M.; Coquelle, F. M.; Clarke, S.; Neveu, P.; Vignaux, F.; Le Borgne, R.; Dahan, M.; Gueroui, Z.; Marchi-Artzner, V. *J Am Chem Soc* 2009, 131, 14738.

(54) Ghadiali, J. E.; Cohen, B. E.; Stevens, M. M. *ACS nano* 2010, 4, 4915.

(55) Wang, W.; Ji, X.; Na, H. B.; Safi, M.; Smith, A.; Palui, G.; Perez, J. M.; Mattoussi, H. *Langmuir* 2014, 30, 6197.

(56) Susumu, K.; Mei, B. C.; Mattoussi, H. *Nature Protocols* 2009, 4, 424.

(57) Hens, Z.; Martins, J. C. *Chemistry of Materials* 2013, 25, 1211.

(58) Einstein, A. *Ann Phys-Berlin* 1905, 17, 549.

(59) Edward, J. T. *J Chem Educ* 1970, 47, 261.

(60) Pons, T.; Uyeda, H. T.; Medintz, I. L.; Mattoussi, H. *J Phys Chem B* 2006, 110, 20308.

(61) Mattoussi, H.; Cumming, A. W.; Murray, C. B.; Bawendi, M. G.; Ober, R. *Phys Rev B* 1998, 58, 7850.

(62) Paiva, T. B.; Tominaga, M.; Paiva, A. C. M. *J Med Chem* 1970, 13, 689.

(63) Aldeek, F.; Safi, M.; Zhan, N. Q.; Palui, G.; Mattoussi, H. *ACS Nano* 2013, 7, 10197.

(64) Medintz, I. L.; Pons, T.; Susumu, K.; Boeneman, K.; Dennis, A. M.; Farrell, D.; Deschamps, J. R.; Melinger, J. S.; Bao, G.; Mattoussi, H. *J Phys Chem C* 2009, 113, 18552.

(65) LaVoie, M. J.; Ostaszewski, B. L.; Weihofen, A.; Schlossmacher, M. G.; Selkoe, D. *J. Nat Med* 2005, 11, 1214.

(66) Olanow, C. W.; Tatton, W. G. *Annu Rev Neurosci* 1999, 22, 123.

(67) Sulzer, D.; Bogulaysky, J.; Larsen, K. E.; Behr, G.; Karatekin, E.; Kleinman, M. H.; Turro, N.; Krantz, D.; Edwards, R. H.; Greene, L. A.; Zecca, L. *P Natl Acad Sci USA* 2000, 97, 11869.

(68) Mosca, L.; Lendaro, E.; d'Erme, M.; Marcellini, S.; Moretti, S.; Rosei, M. A. *Neurochem Int* 2006, 49, 262.

(69) Jiang, D. L.; Shi, S. Y.; Zhang, L.; Liu, L.; Ding, B. R.; Zhao, B. Q.; Yagnik, G.; Zhou, F. M. *Acs Chem Neurosci* 2013, 4, 1305.

(70) Ji, X.; Palui, G.; Avellini, T.; Na, H. B.; Yi, C. Y.; Knappenberger, K. L.; Mattoussi, H. *J Am Chem Soc* 2012, 134, 6006.

(71) Ji, X.; Makarov, N. S.; Wang, W. T.; Palui, G.; Robel, I.; Mattoussi, H. *J Phys Chem C* 2015, 119, 3388.

(72) Ji, X.; Wang, W.; Mattoussi, H. *Physical chemistry chemical physics: PCCP* 2015, 17, 10108.

(73) Campbell, I. G.; Jones, T. A.; Foulkes, W. D.; Trowsdale, *J. Cancer research* 1991, 51, 5329.

(74) Low, P. S.; Henne, W. A.; Doorneweerd, D. D. *Accounts of chemical research* 2008, 41, 120.

(75) Kamen, B. A.; Capdevila, A. *P Natl Acad Sci USA* 1986, 83, 5983.

(76) Lee, R. J.; Low, P. S. *Journal of Biological Chemistry* 1994, 269, 3198.
(77) Lu, Y. J.; Low, P. S. *Advanced Drug Delivery Reviews* 2002, 54, 675.
(78) Bharali, D. J.; Lucey, D. W.; Jayakumar, H.; Pudavar, H. E.; Prasad, P. N. *J Am Chem Soc* 2005, 127, 11364.
(79) Hermanson, G. T. *Bioconjugate Techniques, 3rd Edition* 2013, 1.
(80) Wang, W. T.; Aldeek, F.; Ji, X.; Zeng, B. R.; Mattoussi, H. *Faraday Discussions* 2014, 175, 137.

SUMMARY OF THE INVENTION

The disclosure is directed to a set of multi-coordinating lipoic acid-based, imidazole-based, catechol-based, PEG-based, zwitterion-based, biotin-based, and folic acid-based ligands suited for surface-functionalizing quantum dots (QDs). The polymeric ligands are built using a one-step nucleophilic addition reaction between poly(isobutylene-alt-maleic anhydride) and distinct amine-containing functionalities. This has allowed us, for example, in some embodiments, to introduce several imidazole anchoring groups along the chain to tightly coordinate onto the QD surface, a controllable number of zwitterion moieties for water solubilization. It has also permitted the introduction of reactive and biomolecular groups to allow for further conjugation and targeting. The QDs ligated with these new ligands exhibit excellent long-term colloidal stability over a broad range of pH, to excess electrolyte, in cell growth media and in the presence of natural reducing agents such as glutathione. These QDs are also resistant to the oxidizing agent $H_2O_2$. More importantly, by using zwitterion moieties as the hydrophilic block, this polymer design provides QDs with thin coating and compact overall dimensions. The QDs are easily self-assembled with full size proteins expressed with a polyhistidine tag via metal-histidine coordination. Additionally, incorporation of amine groups allows covalent coupling of the QDs to the neurotransmitter dopamine. This has yielded redox active QD platforms that were used to track pH changes, sensing interactions with Fe ions and cysteine. Finally, we found that QDs cap exchanged with folic acid-functionalized ligands could effectively target cancer cells, where folate receptor-mediated endocytosis of QDs into living cells was time- and concentration-dependent.

The present invention is directed to a composition comprising a polymer comprising repeat unit (F) as represented by the following structure:

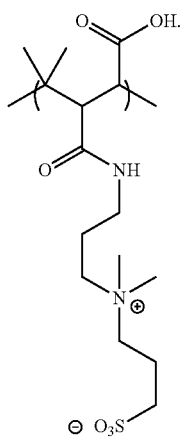

(F)

The present invention is further directed to a composition comprising a nanoparticle; and a coating encompassing the nanoparticle, the coating comprising a polymer comprising repeat unit (F) as represented by the following structure:

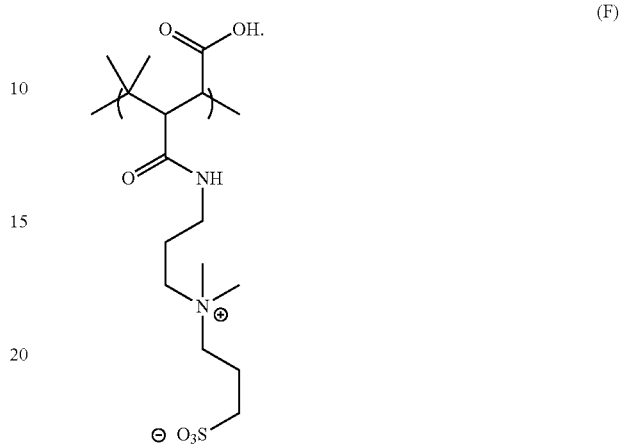

(F)

Other objects and features will be in part apparent and in part pointed out hereinafter.

BRIEF DESCRIPTION OF THE DRAWING(S)

FIG. 1A is a schematic representation of the ligand synthesis using the one-step nucleophilic addition reaction starting with poly(isobutylene-alt-maleic anhydride). Bioreactive ligands are depicted in scheme 1, and in-situ biofunctionalized ligands are depicted in scheme 2.

FIGS. 1B and 1C provide structures of representative ligands according to some embodiments.

Figure 2B:
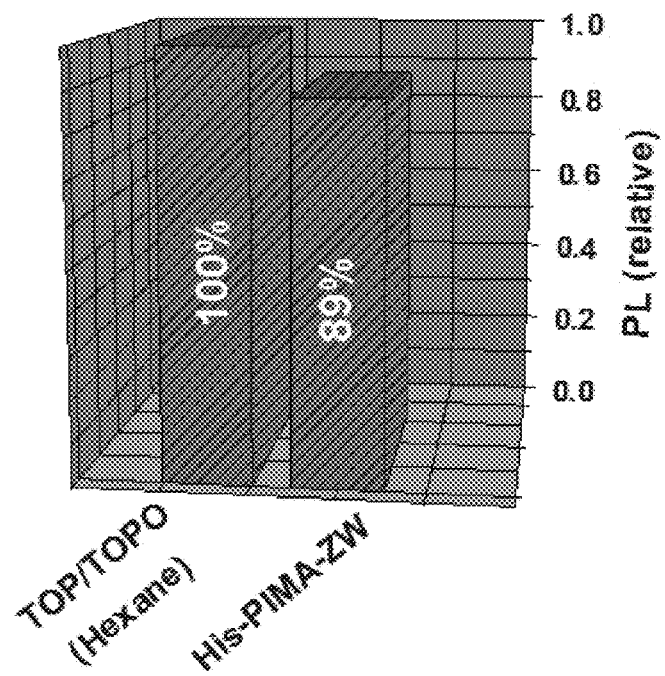
Figure 2C:
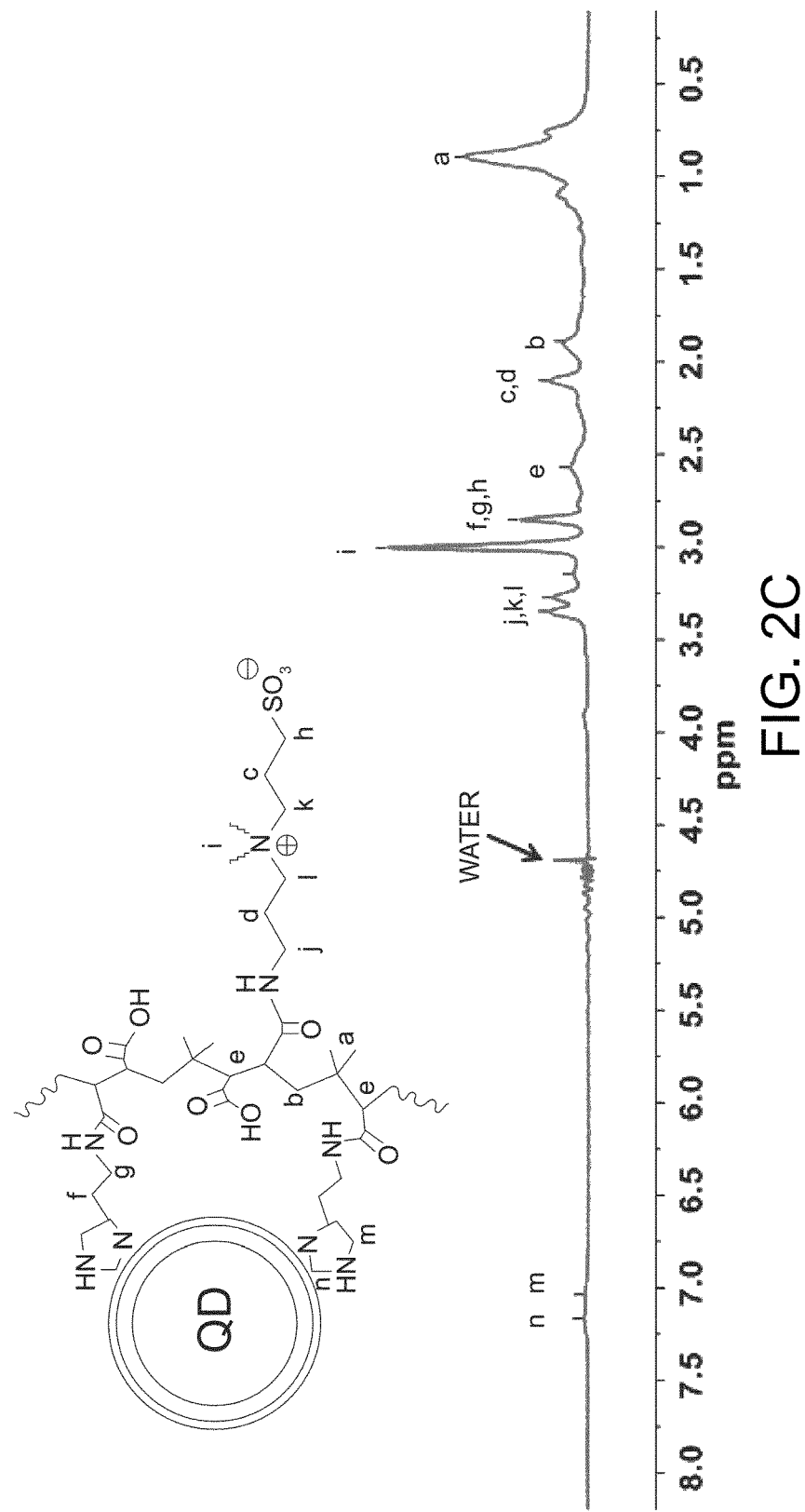
Figure 2D:
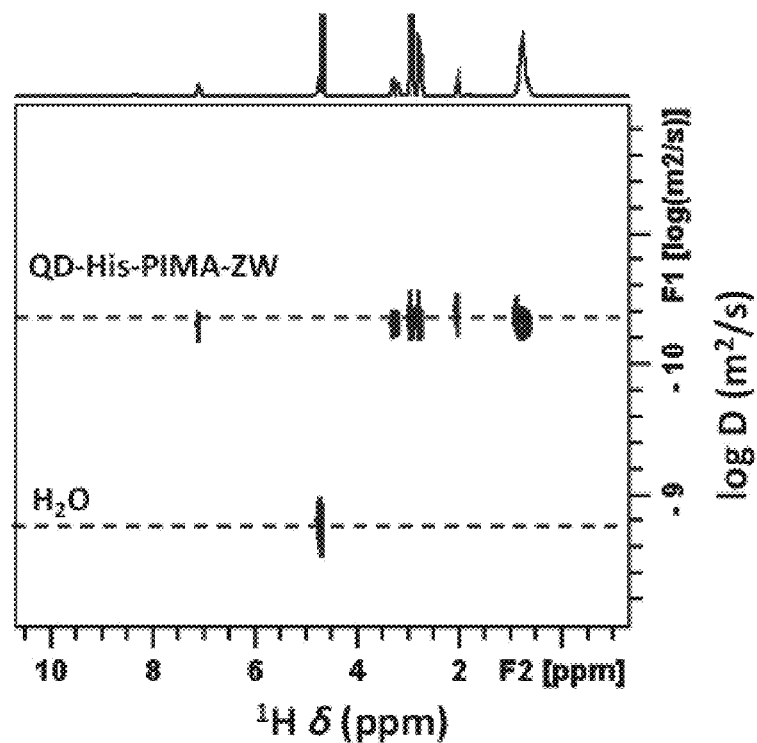
Figure 2E:
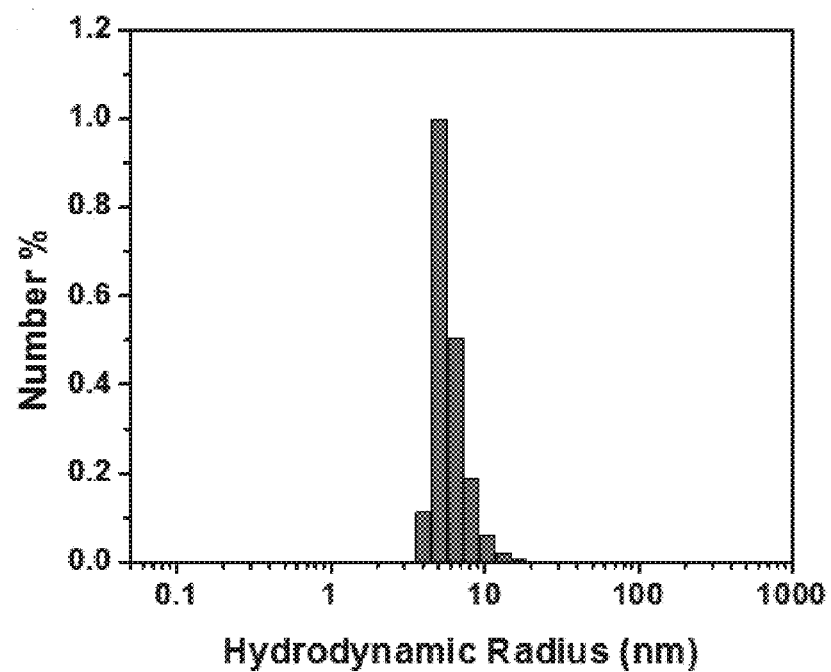

FIG. 2A depicts absorption and emission spectra of QDs (emitting at 556 nm) capped with TOP/TOPO in hexane (light line) and His-PIMA-ZW in $H_2O$ (dark line). Inset shows the fluorescence image of an aqueous QD dispersion (0.5 µM) irradiated using a hand UV lamp ($\lambda_{exc}$=365 nm). FIG. 2B depicts PL intensity of His-PIMA-ZW-QDs in buffer (pH 7.5) relative to the intensity measured for the native QDs in hexane; the same optical density is used for both samples. FIG. 2C depicts Pulsed-field gradient-based water suppression $^1H$ NMR spectrum of hydrophilic QDs (in $D_2O$); assignment of the various peaks is detailed on the ligand structure. FIG. 2D is DOSY NMR spectrum collected from QDs capped with His-PIMA-ZW in $D_2O$. FIG. 2E is a histogram of the hydrodynamic size distribution measured for QDs capped with His-PIMA-ZW extracted from the dynamic light scattering measurement.

FIG. 3A depicts Colloidal stability tests of QDs ligated with His-PIMA-ZW dispersed in DI water, NaCl solution (1 M), and in phosphate buffer (20 mM) with different pH (5 to 13) for 12-month storage. FIG. 3B depicts Stability tests (over 3 month-storage) of QD dispersions in the presence of 10 mM glutathione (GSH) and when mixed with growth media (RPMI-1640). The concentration of QDs was ~0.5 µM. All samples were stored at 4° C.

Figure 4B:
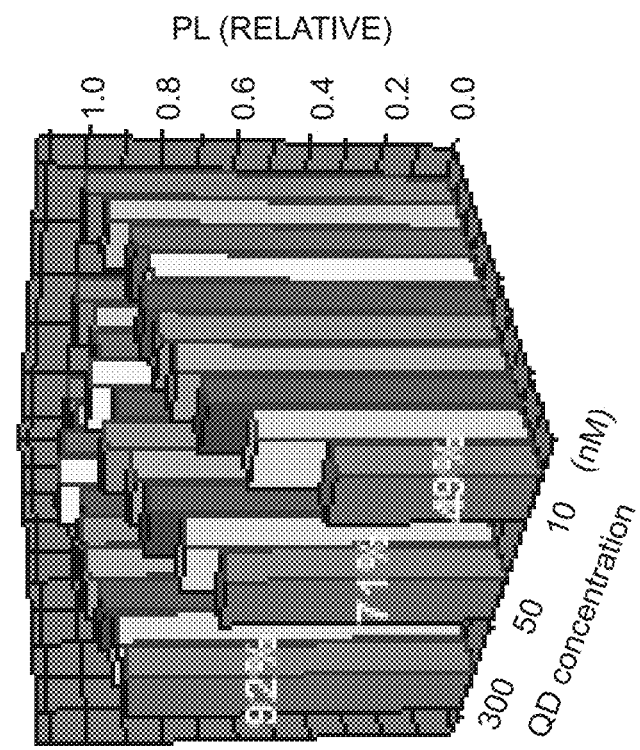
Figure 4A:
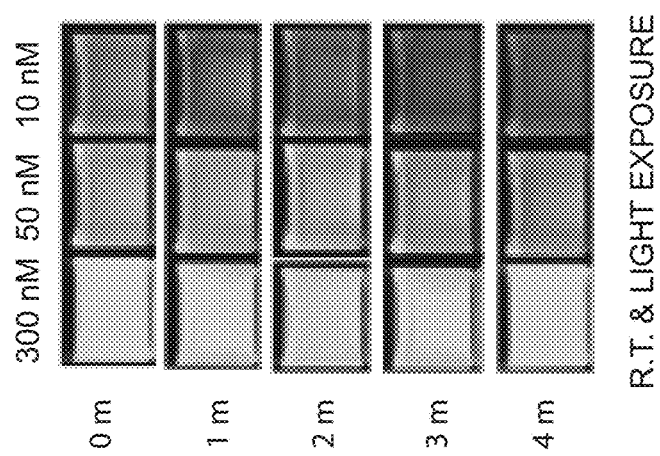
Figure 4C:
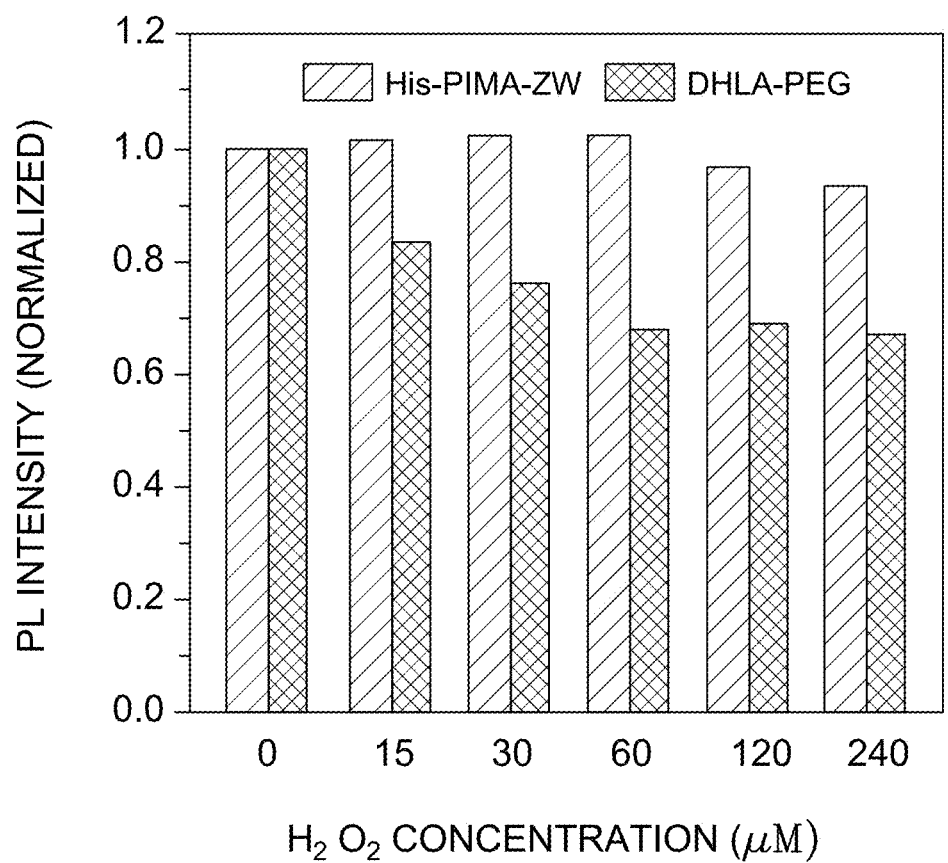

FIG. 4A depicts fluorescence images for three sets of QD dispersions during storage at room temperature and under light exposure for up to 4 months. The concentrations were 300 nM, 50 nM and 10 nM, respectively. FIG. 4B depicts the time progression of the PL intensities of these three QD samples normalized with respect to the value measured at day 0. FIG. 4C depicts the normalized PL intensities of His-PIMA-ZW-QDs and DHLA-PEG-QDs against chemical oxidation in the presence of increasing concentration of $H_2O_2$.

Figure 5A:
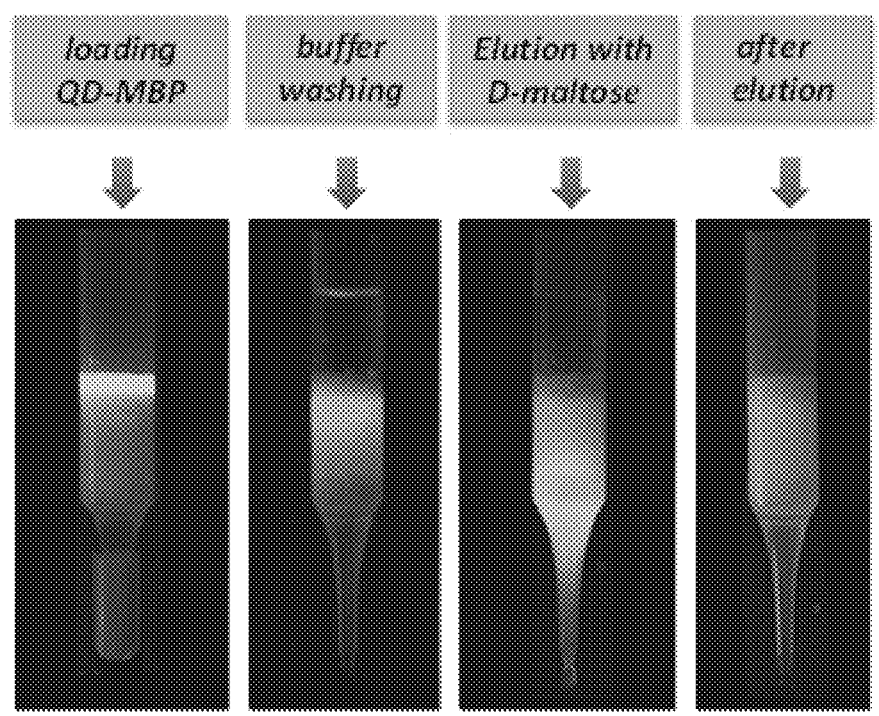
Figure 5B:
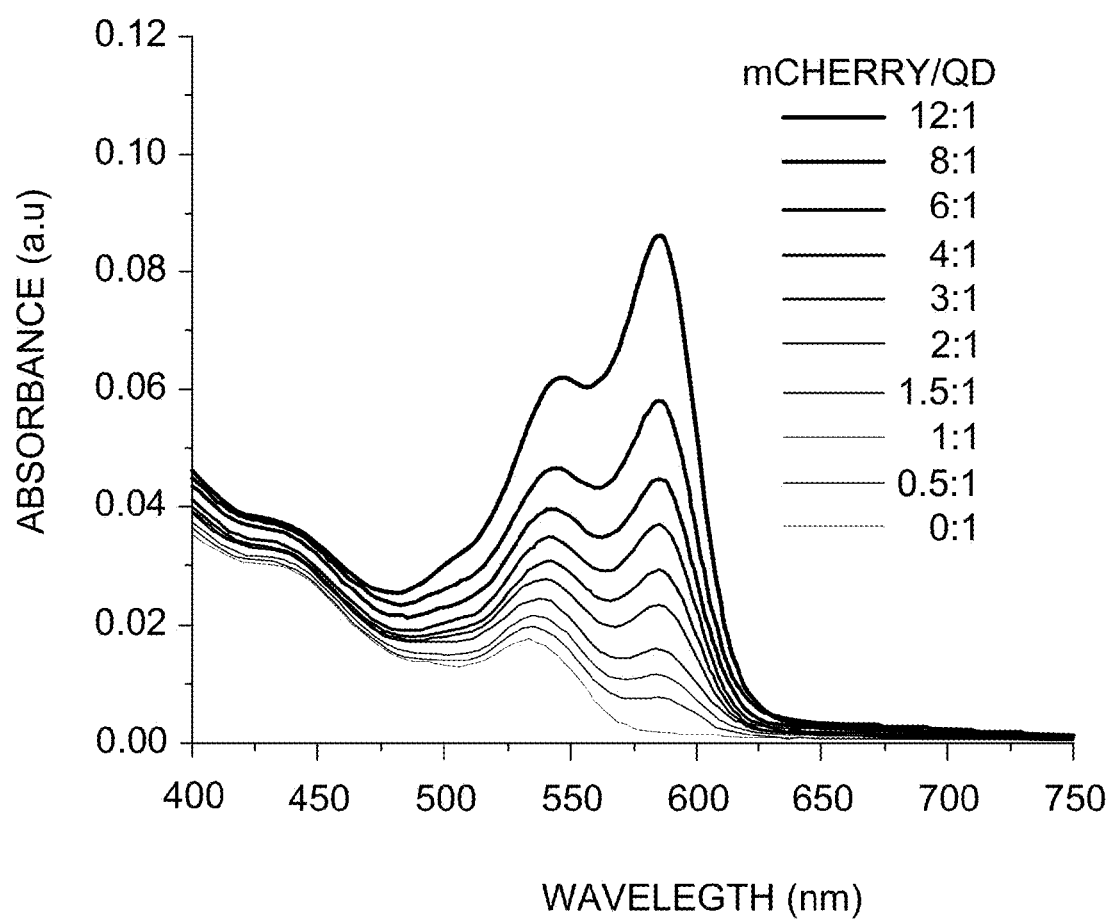
Figure 5C:
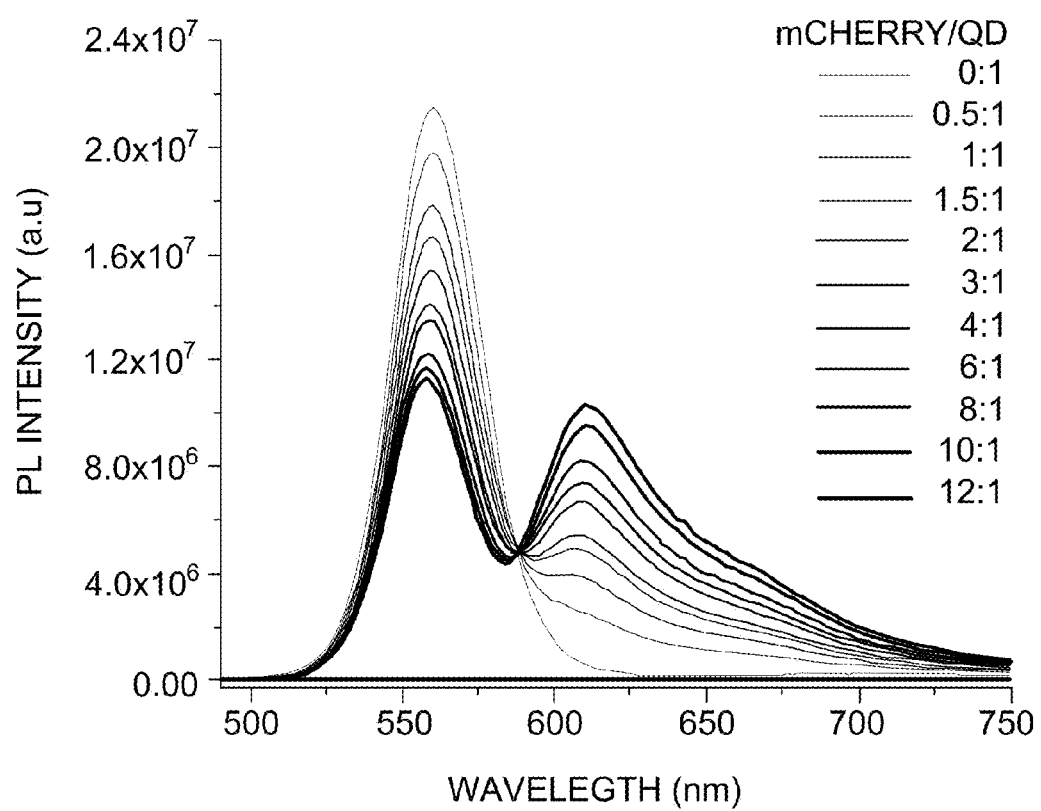
Figure 5D:
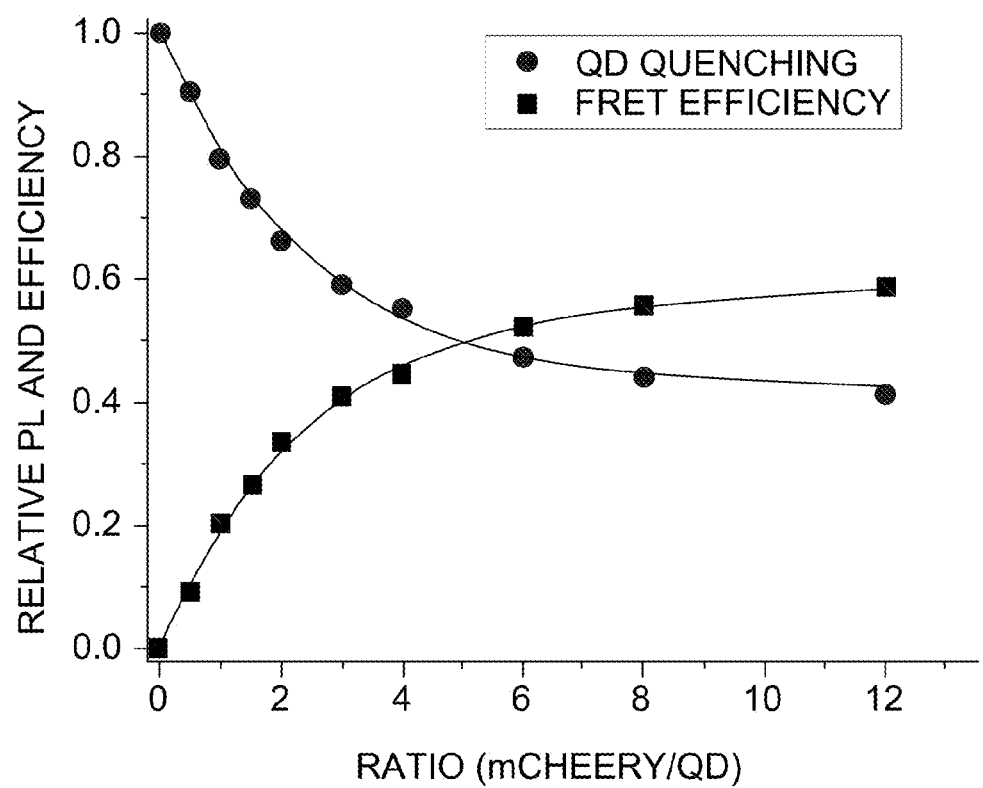

FIG. 5A depicts the Amylose chromatography assay testing conjugation of QDs with MBP-His$_7$, the ratio of MBP to QD was 12:1. FIGS. 5B and 5C depict Evolution of absorption and emission spectra of QD-mCherry-His$_6$ conjugates as a function of the protein-to-QD ratio (valence) varied between 0:1 and 12:1. FIG. 5D depicts Experimental values for the relative QD PL decay (dotted line) versus valence n together with the corresponding FRET efficiency (line with squares) with a fit to hyperbolic function in the form: $E = nR_0^6/(nR_0^6 + r^6)$.

FIG. 6A are Representative epi-fluorescence images collected from HeLa cells co-incubated with 200 nM QD-FA and 0.5 μM Texas Red-transferrin for 1 hour. The panels correspond to QD fluorescence (green, ~537 nm), Texas Red-transferrin as endosome-specific marker (red, ~615 nm), composite images with DAPI (blue, ~460 nm) and differential interference contrast (DIC) respectively. FIG. 6B depicts Concentration-dependent cellular internalization of QD-FA. The merged fluorescent images were collected for HeLa cells co-incubated with 537-nm emitting QD-FA at different concentration: 100 nM (left), 150 nM (middle) and 200 nM (right), along with 0.5 μM Texas Red-transferrin. FIG. 6C depicts Time-dependent intracellular uptake of QD-FA. The composite images were collected for HeLa cells co-incubated with 200 nM QD-FA and 0.5 μM Texas Red-transferrin for 30 min and 1.5 hours.

Figure 7A:
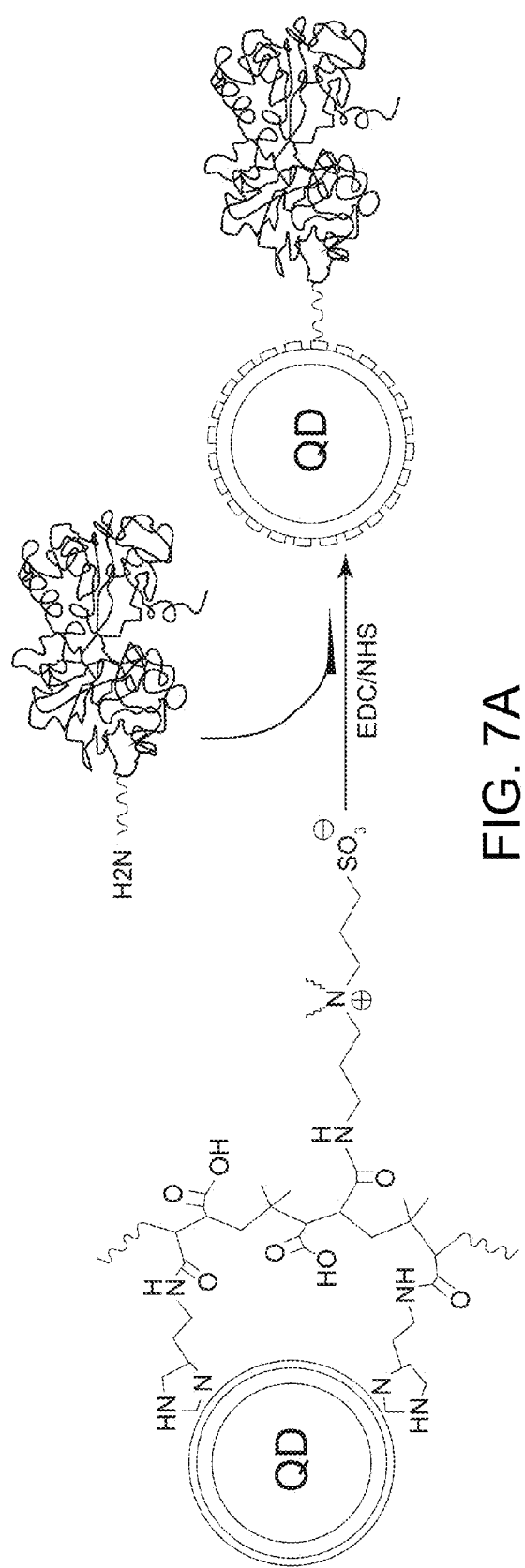
Figure 7B:
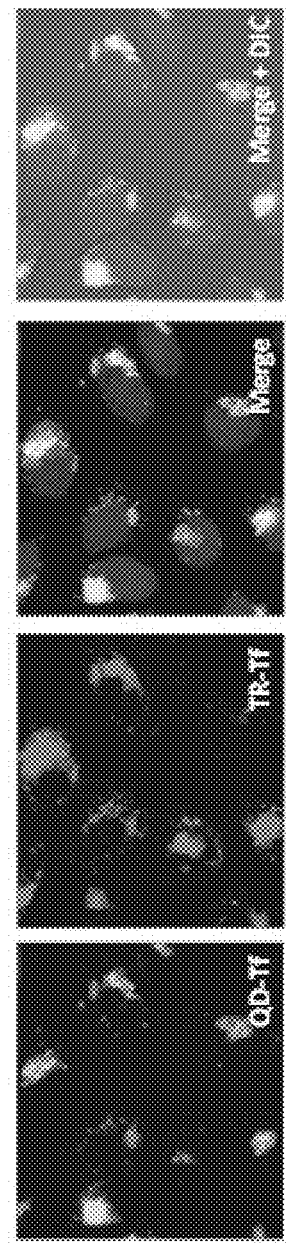

FIG. 7A is a Schematic of the QD-transferrin conjugates assembly via EDC/NHS coupling. FIG. 7B are Representative images for HeLa cells incubated with 200 nM QD-transferrin conjugates for 1 hour, then with 0.5 μM Texas Red-transferrin for 40 min. The corresponding QD fluorescence (green), Texas Red-transferrin fluorescence (red), composite images with DAPI fluorescence (blue) and differential interference contrast (DIC) are shown.

DESCRIPTION OF THE EMBODIMENT(S) OF THE INVENTION

In this study, a set of ligands have been developed to promote the phase transfer of hydrophobic QDs to aqueous media. In some embodiments, this ligand design combines the benefits of the small size zwitterion with imidazole coordination. The ligand synthesis relies on the one-step nucleophilic addition reaction of distinct amine-containing functionalities with poly(isobutylene-alt-maleic anhydride), PIMA. In some embodiments, the resulting modular ligands have multi-imidazoles for metal-coordination on the QD, several zwitterion moieties for water solubilization and reactive groups for bioconjugation. See FIG. 1A, which is a schematic representation of the ligand synthesis using the one-step nucleophilic addition reaction starting with poly (isobutylene-alt-maleic anhydride). Bio-reactive ligands are depicted in scheme 1, and in-situ bio-functionalized ligands are depicted in scheme 2. Structures of several representative ligands are shown in FIGS. 1B and 1C, including, for example, His-PIMA-ZW, His-PIMA-ZW/NH$_2$ and folic acid-modified ligand, His-PIMA-ZW/FA. In particular, this synthetic route allows the insertion of target biomolecules in-situ during ligand synthesis, thus integrating hydrophilic modification and bioconjugation of the QDs in one step, e.g., scheme 2 in FIG. 1A.

Functionalizing the QDs with these and other ligands produces dispersions that are highly fluorescent and exhibit long-term stability over a broad range of conditions, including in growth media, in the presence of oxidizing agents, and storage at nanomolar concentrations under room temperature and light exposure conditions. In some embodiments, substituting PEG with zwitterion moieties produces QDs that are compact and easily conjugated with His-tagged proteins. See References 50-54. Additionally, covalent attachment of the neurotransmitter dopamine to QDs capped with amine-modified polymer ligands, provides a platform that can be used to sense pH changes, iron ion, and cysteine amino acid via charge transfer interactions. Finally, we show that folic acid-modified ligands can promote the delivery of large amounts of QDs into living cells through folate receptor-mediated endocytosis.

I. Ligand Design.

The present ligand design builds on previous ideas where the highly efficient and specific nucleophilic addition reaction of maleic anhydride towards amine-presenting molecules/moieties has been exploited. See References 31, 33, 39, and 55. For example, we have applied this route, starting with poly(isobutylene-alt-maleic anhydride), PIMA, to prepare a few poly(ethylene glycol)-modified, metal-coordinating ligands for surface functionalization of QDs or $Fe_3O_4$ nanoparticles. See References 39 and 55. In some embodiments, we extend those rationales to prepare a set of hydrophilic, multi-coordinating polymer ligands based on the zwitterion motif. The ability to carry out synthesis without the need for coupling reagents or excess precursors eliminates constraints associated with compound purification, due to limited solubility of the zwitterion groups in organic solvents. In addition, this one-step reaction route is easy to implement, compared to other polymer ligand designs, which tend to require multistep synthesis with attendant purification requirements. See References 22 and 25.

FIG. 1A summarizes the general schemes employed to prepare two sets of exemplary imidazole- and zwitterion-modified polymers: one set is made of bio-reactive ligands while the second is made of PIMA simultaneously coupled to zwitterion groups and biological receptors. FIGS. 1B and 1C provide exemplary ligands according to the present invention. With reference to scheme 1 of FIG. 1A, the bio-reactive ligand refers to the polymer presenting zwitterion and reactive groups (such as carboxy, amine, and azide) along its backbone; the latter could be used for further coupling to target biomolecules. This set includes His-PIMA-ZW (see FIG. 1B), made by reacting PIMA with a mixture of histamine (50%) and amino-zwitterion (50%). It is expected to introduce about 20 imidazole anchors and 20 zwitterion moieties, while freeing ~40 reactive carboxylic groups per PIMA chain. These carboxylic groups can be used for conjugating the polymer-coated QDs to biomolecules, such as transferrin via EDC/NHS chemistry. Another representative ligand is made from a stoichiometric mixture of histamine, amino-zwitterion and reactive groups, His-PIMA-ZW/R (R=amine, azide, or biotin). This can be achieved by replacing a fraction of the amino-zwitterion moieties with H$_2$N-PEG-R during the addition reaction. We have, for example, prepared His-PIMA-ZW/NH$_2$ ligands where the PIMA was modified with 10% H$_2$N-PEG-NH$_2$ together with 40% amino-zwitterion and 50% histamine. See FIG. 1A. With reference to scheme 2 of FIG. 1A, the bio-functionalized ligands are prepared by introducing amine-presenting biomolecules, along with histamine and amino-zwitterion onto the PIMA chain during the nucleophilic addition reaction. We have synthesized a ligand His-PIMA-ZW/FA, modified with 10% folic acid (along with 50% histamine and 40% amino-zwitterion), as a coating with potential cancer cell targeting capacity. Indeed QDs functionalized with His-PIMA-ZW/FA have been employed to target and deliver large amounts of QDs into living cells. We should note that this scheme could, in principle, be used to introduce an array of amine-rich biomolecules into the polymer ligand, such as amine-terminated peptides or proteins.

II. Ligand Exchange and Characterization of the Hydrophilic QDs.

Ligand exchange was performed following the protocols described in References 5 and 6 with a few slight modifications. To circumvent the limited solubility of zwitterion groups in commonly used organic solvents, the ligands (e.g., His-PIMA-ZW) were dissolved in small amounts of DMSO prior to mixing with the hydrophobic QDs dispersed in chloroform. The mixture was left stirring at room temperature overnight. The displaced native ligands (TOP/TOPO and such) were then removed by two rounds of precipitation using a mixture of hexane and acetone, followed by centrifugation. After gentle drying, the QD pellet was readily dispersed in buffer. Further purification of the QD dispersion was carried out using two rounds of concentration/dilution with DI water using a centrifugal filtration device, yielding a clear and homogeneous colloidal suspension of nanocrystals. The hydrophilic QDs ligated with His-PIMA-ZW were characterized by 1) optical spectroscopy, 2) $^{1H}$ and $^{31}$P NMR spectroscopy, and 3) diffusion-ordered spectroscopy and dynamic light scattering. The $^1$H NMR data were further exploited to extract an estimate of the ligand density on the QD surfaces.

III. Repeat Unit Design and Synthesis.

In some embodiments, the polymer backbone is based on poly(isobutylene-alt-maleic acid). The poly(isobutylene-alt-maleic anhydride) (PIMA) platform may comprise between about 10 and about 20,000 repeat units. In general, commercially available PIMA has a number of repeat units between about 10 and about 1000, such as between about 20 and about 100, such as between about 30 and about 50, or between about 35 and about 45, such as about 39. In some embodiments, a commercially-available PIMA having Mw~6 kDa was suitable. See Reference 26. The maleic anhydride rings were either fully or partially reacted to provide controlled numbers of side groups bound to the backbone via an amide bond. The reactions to add side groups to the PIMA back bone further free several carboxylic groups (as many as the number of maleic anhydride rings present), which can provide additional hydrophilic and potential reactive groups in the final compound. We anticipate that for the molecular weight of approximately 6000 Daltons of polymer reported by the manufacturer the average number of monomers per PIMA chain (or index of polymerization) is equal to 39; a mass for the monomer unit of ~154 g/mol was used. During synthesis, we adjusted the molar amount of each amine-containing moiety with respect to the overall molar amount of monomer units in the precursor polymer.

In some embodiments, the polymer of the present invention is synthesized using poly(isobutylene-alt-maleic anhydride) as a starting reactant and platform. Poly(isobutylene-alt-maleic anhydride) (referred to as PIMA throughout this specification) has the following general structure:

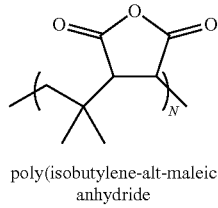

poly(isobutylene-alt-maleic anhydride)

wherein N has a value between about 10 and about 40,000, such as between about 10 and about 20,000, such as between about 10 and about 10,000, or between about 10 and about 5,000. In general, commercially available PIMA has a number of repeat units between about 10 repeat units and about 2000 repeat units, such as between about 20 repeat units and about 1000 repeat units, between about 20 repeat units and about 400 repeat units, such as between about 20 repeat units and about 100 repeat units, such as between about 30 repeat units and about 50 repeat units, or between about 35 repeat units and about 45 repeat units, such as about 39 repeat units. The molecular weight of the PIMA platform may be between about 150 Daltons and about 2,000,000 Daltons, such as between about 300 Daltons and about 800,000 Daltons, or between about 300 Daltons and about 200,000 Daltons, or between about 4500 Daltons and about 70,000 Daltons. A commercially available PIMA has an average Mw of about 165,000 Daltons. Another commercially available PIMA has an average Mw of about 60,000 Daltons. Another commercially available PIMA has an average Mw of about 6000 Daltons. In some embodiments, a commercially available PIMA (Mw, 6000 g/mol; ~39 maleic anhydride monomers per chain) may be selected. According to the present invention, PIMA may be contacted with a reactant comprising a primary and/or secondary amine for nucleophilic coupling to maleic anhydride.

In some embodiments, reactions for nucleophilic coupling of various amines to a PIMA chain to thereby prepare the repeat units present in ligands according to the present invention are shown below.

The reaction of N-(2-aminoethyl)-4-(1,2-dithiolan-3-yl)pentamide (amine-terminated lipoic acid) to a PIMA chain is shown as Reaction (A'):

Reaction (A')

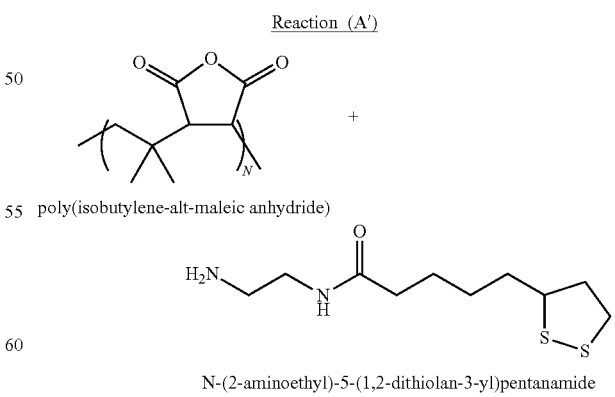

poly(isobutylene-alt-maleic anhydride)

N-(2-aminoethyl)-5-(1,2-dithiolan-3-yl)pentanamide

Reaction (A') depicts the reaction between PIMA and N-(2-aminoethyl)-4-(1,2-dithiolan-3-yl)pentamide (amine-terminated lipoic acid) to yield a Repeat Unit (A'), comprising a 1,2-diothiolane ring, having the structure:

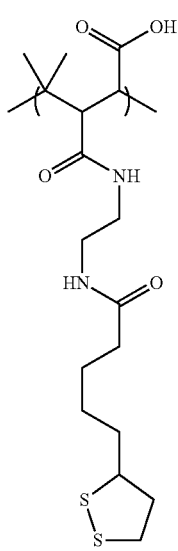

(A')

The reaction of N-(2-aminoethyl)-6,8-dimercaptooctanoic acid (amine terminated dihydrolipoic acid, or DHLA) to a PIMA chain is shown as Reaction (A"):

Reaction (A")

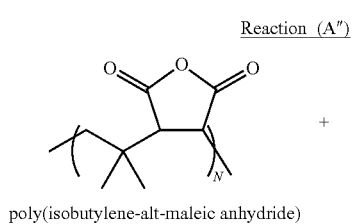

poly(isobutylene-alt-maleic anhydride)

+

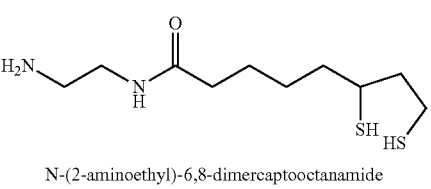

N-(2-aminoethyl)-6,8-dimercaptooctanamide

In some embodiments, PIMA may be reacted with N-(2-aminoethyl)-6,8-dimercaptooctanoic acid (amine terminated dihydrolipoic acid, or DHLA, in which the five-membered ring is open) to yield a Repeat Unit (A") having the structure:

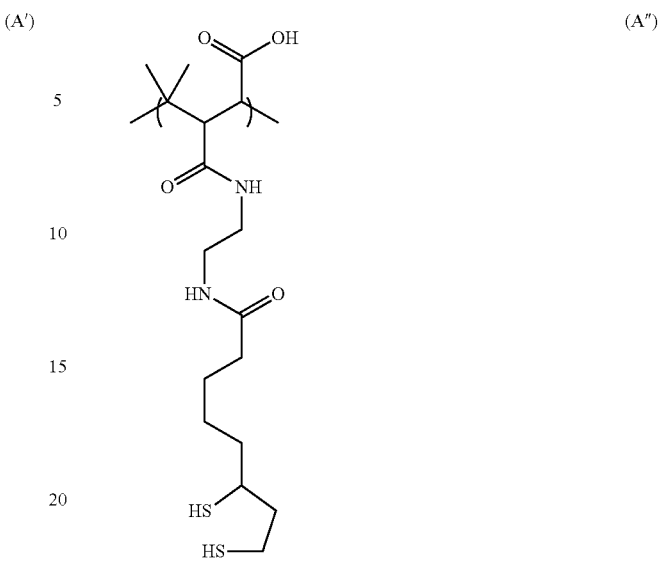

(A")

Repeat unit (A") may also be prepared by oxidizing the 1,2-diothiolane ring of repeat unit (A').

The reaction of histamine to a PIMA chain is shown as Reaction (B):

Reaction (B)

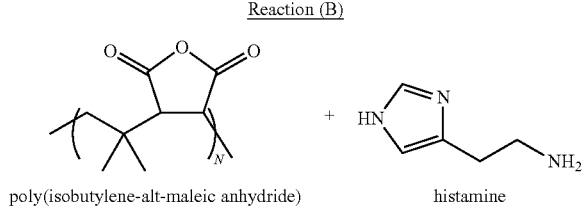

poly(isobutylene-alt-maleic anhydride)        histamine

Reaction (B) depicts the reaction between PIMA and histamine to yield a Repeat Unit (B) having the structure:

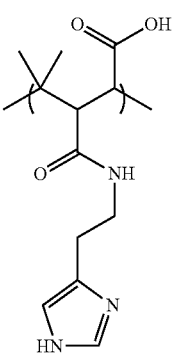

(B)

In some embodiments, the reaction mixture may comprise PIMA and N-(2-aminoethyl)-4-(1,2-dithiolan-3-yl)pentamide (amine-terminated lipoic acid) and/or N-(2-aminoethyl)-6,8-dimercaptooctanoic acid and/or histamine. In some embodiments, the method of the present invention comprises contacting PIMA with N-(2-aminoethyl)-4-(1,2-dithiolan-3-yl)pentamide (amine-terminated lipoic acid) to thereby yield a polymer comprising repeat unit (A'). In some embodiments, the method of the present invention comprises contacting PIMA with N-(2-aminoethyl)-6,8-dimercaptooctanoic acid (amine terminated dihydrolipoic acid, or DHLA) to thereby yield a polymer comprising repeat unit (A"). In some embodiments, the method of the present invention comprising oxidizing the 1,2-diothiolane ring in repeat unit (A') to thereby prepare a polymer comprising repeat unit (A"). In some embodiments, the method of the present invention comprises contacting PIMA with histamine to thereby yield a polymer comprising repeat unit (B). In some embodiments, the method of the present invention comprises contacting PIMA with N-(2-aminoethyl)-4-(1,2-dithiolan-3-yl)pentamide (amine-terminated lipoic acid) and histamine to thereby yield a polymer comprising repeat units (A') and (B). In some embodiments, the method of the present invention comprises contacting PIMA with N-(2-aminoethyl)-6,8-dimercaptooctanoic acid (amine terminated dihydrolipoic acid, or DHLA) and histamine to thereby yield a polymer comprising repeat units (A") and (B). In some embodiments, the method of the present invention comprises contacting PIMA with amine-terminated lipoic acid and/or amine-terminated dihydrolipoic acid to prepare a polymer in which all maleic anhydride units are reacted, or less than all maleic anhydride units are reacted. For example, the reaction mixture may comprise PIMA and N-(2-aminoethyl)-4-(1,2-dithiolan-3-yl)pentamide (amine-terminated lipoic acid) in relative amounts sufficient to react between about 2% and about 100%, between about 10% and about 100%, or between about 20% and about 80%, or between about 30% and about 70% of the maleic anhydride units. In some embodiments, the method of the present invention comprises contacting PIMA with histamine to prepare a polymer comprising repeat units (B) in which all maleic anhydride units are reacted, or less than all maleic anhydride units are reacted. For example, the reaction mixture may comprise PIMA and histamine in relative amounts sufficient to react between about 2% and about 100%, between about 10% and about 100%, or between about 20% and about 80%, or between about 30% and about 70% of the maleic anhydride units. In some embodiments, the reaction mixture may comprise PIMA, amine-terminated lipoic acid, and/or amine-terminated dihydrolipoic acid, and/or histamine in relative amounts sufficient to react between about 2% and about 100%, between about 10% and about 100%, or between about 20% and about 80%, or between about 30% and about 70% of the maleic anhydride units.

Maleic anhydride that is not coupled with amine-containing reactant may nonetheless undergo ring opening. In some embodiments, therefore, the polymer may additionally comprise a repeat unit that results from ring opening, but not coupling with an amine-containing reactant. Accordingly, in some embodiments, the polymer may comprise a repeat unit (C), having the structure shown below:

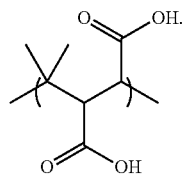

(C)

In some embodiments, the reaction may incorporate a polyethylene glycol reagent comprising an amine group and a terminal functional group. In general, a structure of a poly(ethylene glycol) reactant may be as follows:

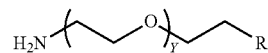

wherein Y has a value between one and about 100 and each R is independently selected from the group consisting of hydroxy (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15.

The reaction of a polyethylene glycol reagent comprising an amine group and a terminal functional group to a PIMA chain is shown as Reaction (D):

Reaction (D)

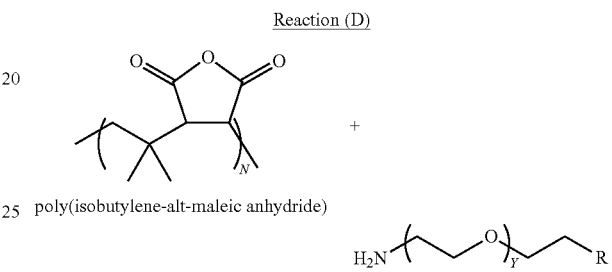

poly(isobutylene-alt-maleic anhydride)

Reaction (D) depicts the reaction between PIMA and a polyethylene glycol reagent comprising an amine group and a terminal functional group to yield a Repeat Unit (D) having the structure:

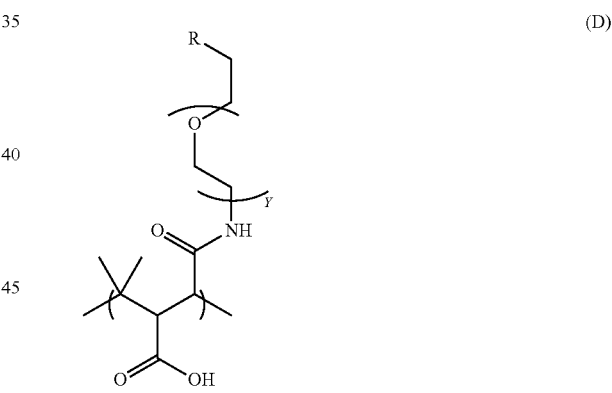

(D)

wherein Y has a value between one and about 100 and each R is independently selected from the group consisting of hydroxy (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15.

In some embodiments, the polyethylene glycol reagent comprising an amine group and a terminal functional group may be capped with methoxy. For example, the PEG precursor may have the structure:

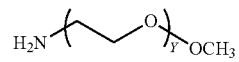

wherein Y has a value between one and about 100. In some embodiments, Y may have a value between 5 and about 50, such as between 10 and about 20, such as about 12, or about 15.

In some embodiments, the R moiety of repeat unit (D) is methoxy (—OCH$_3$). The repeat unit (D) may have the following structure (D'):

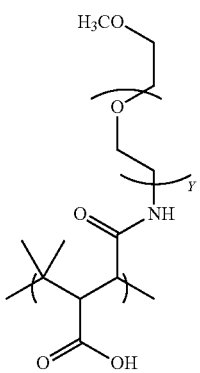

(D')

wherein Y has a value between one and about 100. In some embodiments, Y may have a value between 5 and about 50, such as between 10 and about 20, such as about 12, or about 15. In some embodiments, the R moiety of repeat unit (D) is methoxy (—OCH$_3$), and Y is 15.

In some embodiments, the polyethylene glycol reagent comprising an amine group and a terminal functional group may be capped with azide. For example, the PEG precursor may have the structure:

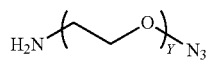

wherein Y has a value between one and about 100. In some embodiments, Y may have a value between 5 and about 50, such as between 10 and about 20, such as about 12, or about 15.

In some embodiments, the R moiety of repeat unit (D) is azide (—N$_3$). The repeat unit (D) may have the following structure (D"):

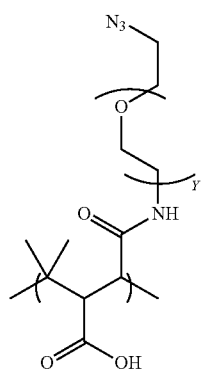

(D")

wherein Y has a value between one and about 100. In some embodiments, Y may have a value between 5 and about 50, such as between 10 and about 20, such as about 12, or about 15. In some embodiments, the R moiety of repeat unit (D) is azide (—N$_3$), and Y is 15.

In some embodiments, the polyethylene glycol reagent comprising an amine group and a terminal functional group may be capped with amino (—NH$_2$). For example, the PEG precursor may have the structure:

wherein Y has a value between one and about 100. In some embodiments, Y may have a value between 5 and about 50, such as between 10 and about 20, such as about 12, or about 15.

In some embodiments, the R moiety of repeat unit (D) is amino (—NH$_2$). The repeat unit (D) may have the following structure (D'''):

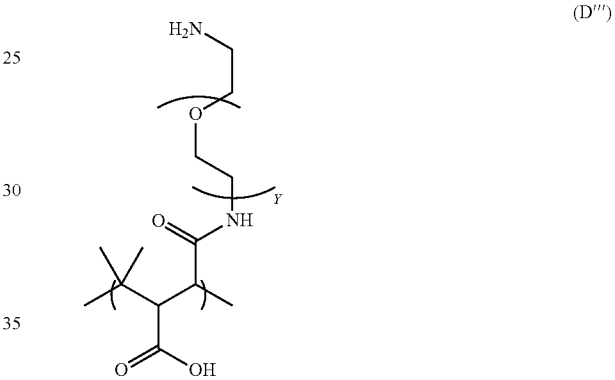

(D''')

wherein Y has a value between one and about 100. In some embodiments, Y may have a value between 5 and about 50, such as between 10 and about 20, such as about 12, or about 15. In some embodiments, the R moiety of repeat unit (D) is amino (—NH$_2$), and Y is 15.

In some embodiments of the invention, the R group of the polyethylene glycol reagent comprising an amine group and a terminal functional group may be functionalized with an amine-reactive fluorescent dye in order to couple the dye to the polymer. Exemplary dyes for coupling to the polymer include Cyanine3 NHS ester, Cyanine5 NHS ester, Cyanine3.5 NHS ester, Cyanine5.5 NHS ester, Alexa Fluor® 488 NHS Ester, and X-Rhodamine-5-(and-6)-Isothiocyanate (5(6)-XRITC).

In some embodiments, the reaction may incorporate a reactant comprising a six-membered ring and an amine having the following general structure:

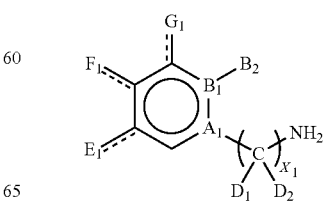

wherein $A_1$ is N or C;
$B_1$ is C, N, or O;
$B_2$ is —H, —CH$_3$, or —NO$_2$;
Each $D_1$ and $D_2$ are independently —H or —COOH;
Each $E_1$, $F_1$, and $G_1$ are independently —OH, —H, or =O; and
$X_1$ is 1 or 2.

In some embodiments, $E_1$ and $G_1$ are independently —OH, —H, or =O, and $F_1$ is —OH or —H. In some embodiments, the bonds to $E_1$, $F_1$, and $G_1$ may be single bonds or double bond. In some embodiments, the bonds to $E_1$ and $G_1$ may be single bonds or double bond, and the bonds to $F_1$ are single bonds. In some embodiments, preferably the amine-containing reactant comprises no more than one $D_1$ or $D_2$ comprising —COOH. In some embodiments, at least two of $E_1$, $F_1$, and $G_1$ are —OH.

The reaction of the reactant comprising a six-membered ring and an amine to a PIMA chain is shown as Reaction (E):

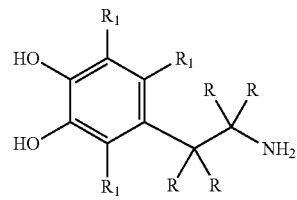

poly(isobutylene-alt-maleic anhydride)

Reaction (E) depicts the reaction between PIMA and the reactant comprising a six-membered ring and an amine to yield a Repeat Unit (E) having the structure:

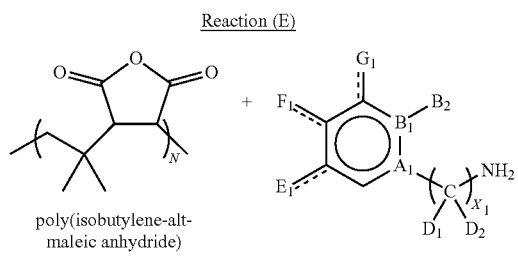

(E)

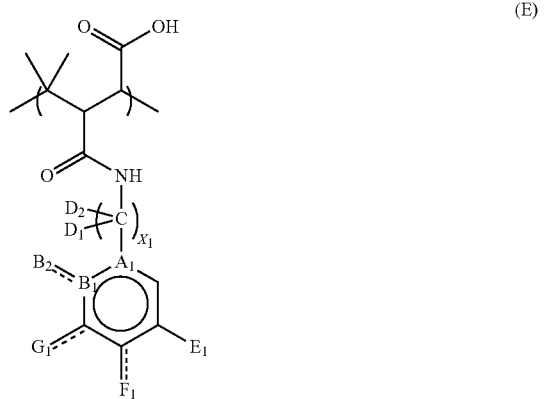

wherein $A_1$ is N or C;
$B_1$ is C, N, or O;
$B_2$ is —H, —CH$_3$, or —NO$_2$;
Each $D_1$ and $D_2$ are independently —H or —COOH;
Each $E_1$, $F_1$, and $G_1$ are independently —OH, —H, or =O; and
$X_1$ is 1 or 2.

In some embodiments, $E_1$ and $G_1$ are independently —OH, —H, or =O, and $F_1$ is —OH or —H. In some embodiments, the bonds to $E_1$, $F_1$, and $G_1$ may be single bonds or double bond. In some embodiments, the bonds to $E_1$ and $G_1$ may be single bonds or double bond, and the bonds to $F_1$ are single bonds. In some embodiments, preferably the amine-containing reactant comprises no more than one $D_1$ or $D_2$ comprising —COOH. In some embodiments, at least two of $E_1$, $F_1$, and $G_1$ are —OH.

In some embodiments, the reactant comprising a six-membered ring and an amine has the structure:

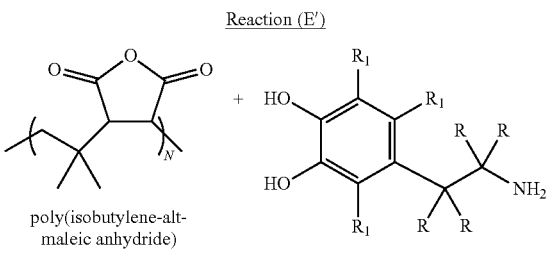

wherein each R is independently hydrogen or —COOH, and
each $R_1$ is independently —H, —NO$_2$, or —OH.

In some embodiments, preferably the amine-containing reactant comprises no more than one R comprising —COOH. Stated another way, three or more R are hydrogen. In some embodiments, each $R_1$ comprises —H.

The reaction of this reactant comprising a six-membered ring and an amine to a PIMA chain is shown as Reaction (E'):

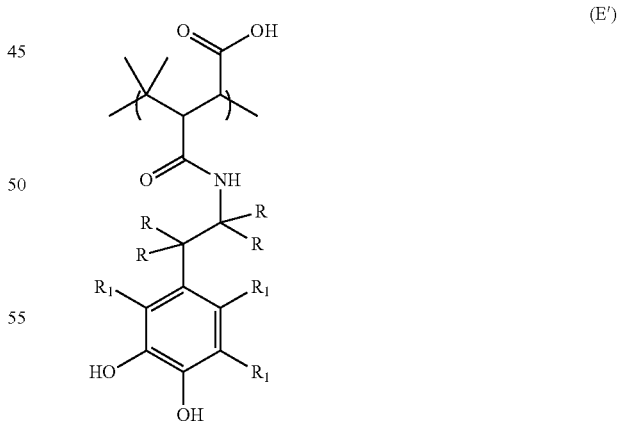

poly(isobutylene-alt-maleic anhydride)

Reaction (E') depicts the reaction between PIMA and the reactant comprising a six-membered ring and an amine to yield a Repeat Unit (E') having the structure:

(E')

wherein each R is independently hydrogen or —COOH, and
each $R_1$ is independently —H, —NO$_2$, or —OH.

In some embodiments, PIMA may be contacted with an amine-containing reactant selected from among dopamine; 2-amino-3-(3,4-dihydroxyphenyl)propanoic acid; L-DOPA (L-3,4-dihydroxyphenylalanine, (S)-2-amino-3-(3,4-dihydroxyphenyl)propanoic acid); D-DOPA (L-3,4-dihydroxyphenylalanine, (S)-2-amino-3-(3,4-dihydroxyphenyl)propanoic acid); norepinephrine; epinephrine; 2-amino-3-(4,5-dihydroxy-2-nitrophenyl)propanoic acid; 6-nitrodopamine (4-(2-aminoethyl)-5-nitrobenzene-1,2-diol); 5-hydroxydopamine (5-(2-aminoethyl)benzene-1,2,3-triol); 2-amino-3-(3,4-dihydroxypyridin-1(4H)-yl)propanoic acid; 2-amino-3-(3-hydroxy-4-oxopyridin-1(4H)-yl)propanoic acid; 1-(2-aminoethyl)-3-hydroxy-2-methylpyridin-4(1H)-one; 2-(aminomethyl)-5-hydroxy-4H-pyran-4-one; and the like.

In some preferred embodiments, PIMA may be contacted with dopamine as shown in the following reaction (E″):

Reaction (E″)

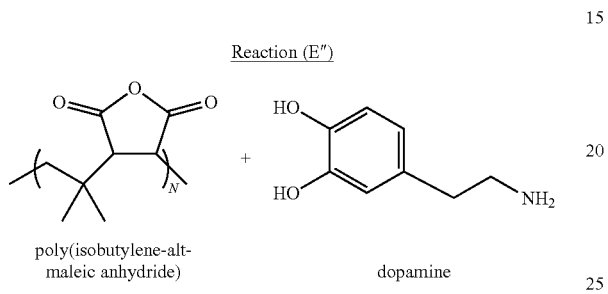

poly(isobutylene-alt-maleic anhydride)    dopamine

Reaction (E″) depicts the reaction between PIMA and dopamine to yield a Repeat Unit (E″) having the structure:

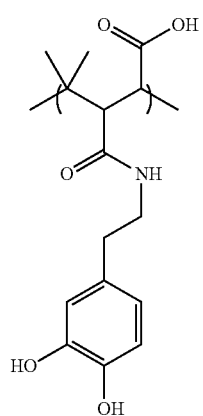

(E″)

In some embodiments, the reaction may incorporate a zwitterionic reactant. In some embodiments, the zwitterionic reactant is 3-((2-aminoethyl)dimethylammonio)propane-1-sulfonate having the following structure:

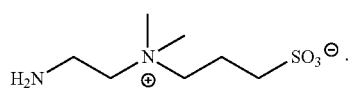

The reaction of the zwitterionic reactant with PIMA is shown as Reaction (F):

Reaction (F)

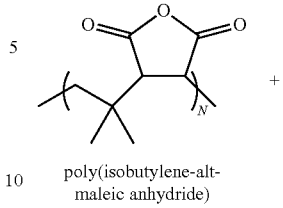

poly(isobutylene-alt-maleic anhydride)

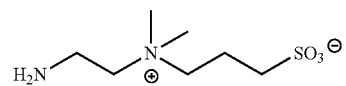

In some embodiments, reaction between PIMA and 3-((2-aminoethyl)dimethylammonio)propane-1-sulfonate yields polymer comprising the repeat unit (F) having the structure shown below:

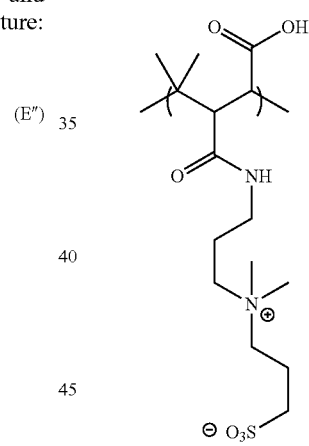

(F)

In some embodiments, the reaction may incorporate an amino-modified biotin reactant. In some embodiments, the amino-modified biotin reactant is N-(2-aminoethyl)-5-(2-oxohexahydro-1H-thieno[3,4-d]imidazol-4-yl)pentanamide having the following structure:

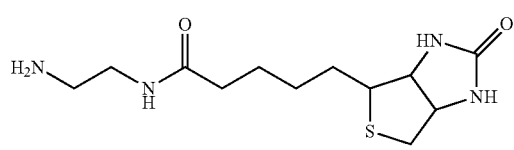

N-(2-aminoethyl)-5-(2-oxohexahydro-1H-thieno[3,4-d]imidazol-4-yl)pentanamide

The reaction of the amino-modified biotin reactant with PIMA is shown as Reaction (G):

Reaction (G)

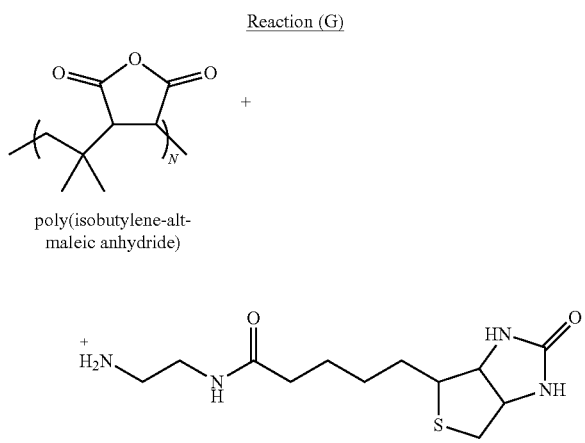

poly(isobutylene-alt-maleic anhydride)

In some embodiments, reaction between PIMA and N-(2-aminoethyl)-5-(2-oxohexahydro-1H-thieno[3,4-d]imidazol-4-yl)pentanamide yields polymer comprising the repeat unit (G) having the structure shown below:

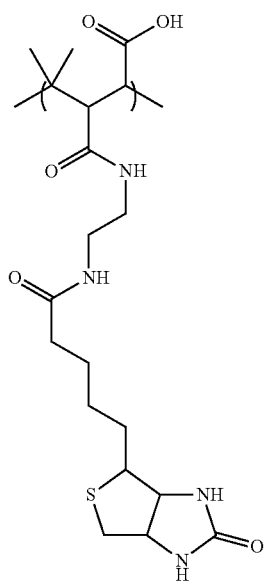

(G)

In some embodiments, the reaction may incorporate a folic acid or folate reactant. In some embodiments, the folic acid or folate reactant has the following structure:

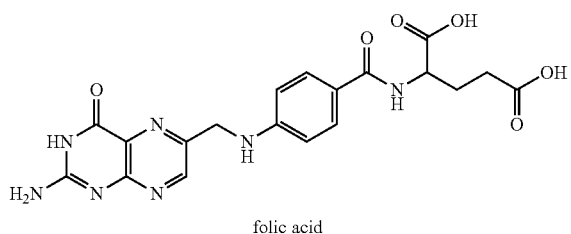 [SMILES: Nc1nc2ncc(CNc3ccc(C(=O)NC(CCC(=O)O)C(=O)O)cc3)nc2c(=O)[nH]1]

folic acid

The reaction of the folic acid or folate reactant with PIMA is shown as Reaction (H):

Reaction (H)

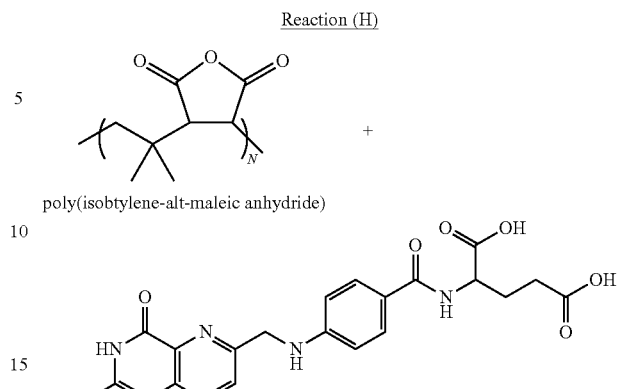

poly(isobtylene-alt-maleic anhydride)

In some embodiments, reaction between PIMA and folic acid or folate yields polymer comprising the repeat unit (H) having the structure shown below:

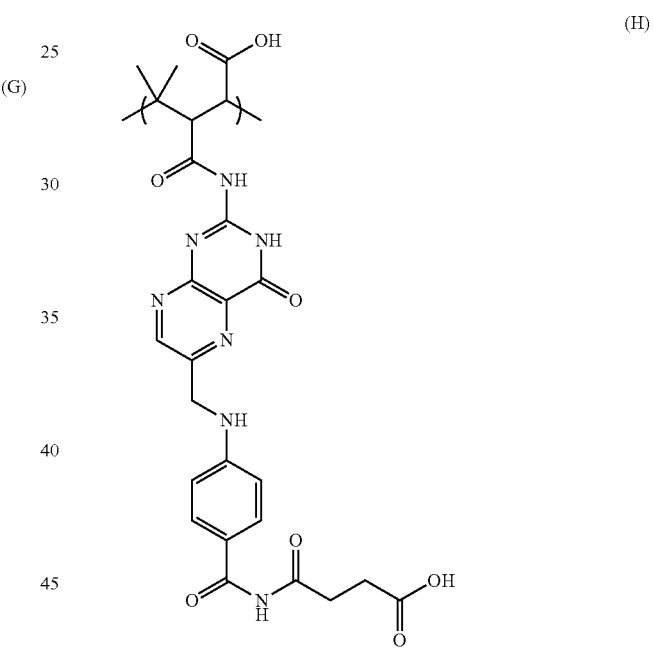

(H)

Contact with any of the amine-containing reactants described herein causes a ring-opening reaction to occur in which the amine-containing reactant is coupled to the maleic anhydride moiety using nucleophilic addition. The contact may occur in an organic, aprotic solvent, such as dimethylformamide, hexane, benzene, toluene, 1,4-dioxane, chloroform, diethyl ether, dichloromethane, tetrahydrofuran, ethyl acetate, acetone, acetonitrile, dimethylsulfoxide, and the like. In general, the nucleophilic coupling reaction may occur at elevated temperatures, such as between about 25° C. and about 200° C., such as between about 35° C. and about 100° C., such as between about 40° C. and about 70° C.

Polymers of the present invention may comprise repeat units (A'), (A"), (B), (C), (D), (D'), (D"), (E), (E'), (E"), (F), (G), and (H) in any combination and any arrangement. The repeat units may be arranged in random, alternating, or block formations. Importantly, the arrangement of repeat units in the structures represented below are presented in order to exemplify the repeat units contained within the polymer structures, but do not necessarily represent the exact arrangement of the repeat units. That is, each repeat unit is present in the polymer, but the repeat units may be randomly located within the polymer, arranged as blocked, or may alternate with the other repeat units.

In some embodiments, the polymer of the present invention may comprise any combination of repeat units (A'), (A"), (B), (C), (D), (D'), (D"), and (D'"). In some embodiments, the polymer of the present invention may comprise repeat units (A') and (C). In some embodiments, the polymer of the present invention may comprise repeat units (A") and (C). In some embodiments, the polymer of the present invention may comprise repeat units (A'), (A"), and (C). In some embodiments, the polymer of the present invention may comprise any of the repeat units (A'), (C) (D), (D'), (D"), and (D'"). In some embodiments, the polymer of the present invention may comprise any of the repeat units (A"), (C) (D), (D'), (D"), and (D'"). In some embodiments, the polymer of the present invention may comprise repeat units (B) and (C). In some embodiments, the polymer of the present invention may comprise repeat units (A'), (B), and (C). In some embodiments, the polymer of the present invention may comprise repeat units (A"), (B), and (C). In some embodiments, the polymer of the present invention may comprise repeat units (A'), (A"), (B), and (C). The molar ratio of lipoic acid reactant and histamine reactant may be between about 4:1 to about 1:4, such as between about 3:1 to about 1:3, such as between about 2:1 to about 1:2, such as about 1:1.

In some embodiments, the polymer of the present invention may comprise repeat units (A') and (C). A polymer comprising repeat units (A') and (C) may have the following representative structure:

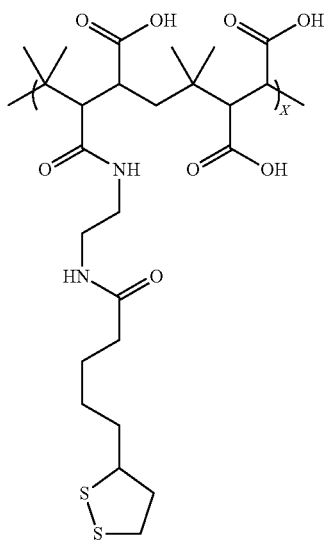

wherein X has a value between about 5 and about 20,000, such as between about 10 and about 20,000. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A") and (C). A polymer comprising repeat units (A") and (C) may have the following representative structure:

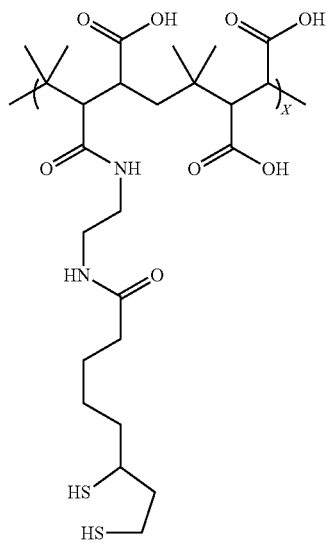

wherein X has a value between about 5 and about 20,000, such as between about 10 and about 20,000. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A') and (D). A polymer comprising repeat units (A') and (D) may have the following representative structure:

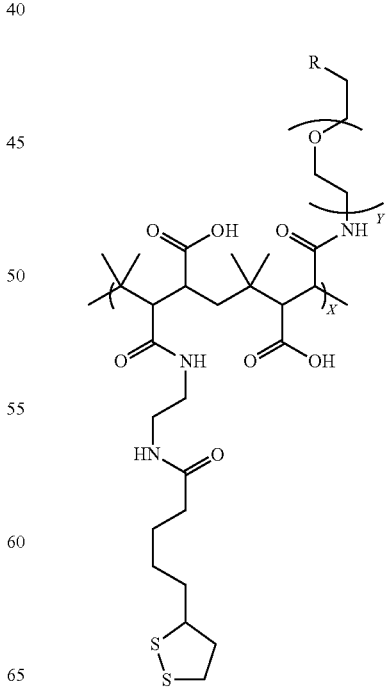

wherein Y has a value between one and about 100, X has a value between about 5 and about 10,000 such as between about 10 and about 10,000, and each R is independently selected from the group consisting of hydroxyl (—OH), methoxy (—OCH₃), amino (—NH₂), azido (—N₃), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A") and (D). A polymer comprising repeat units (A") and (D) may have the following representative structure:

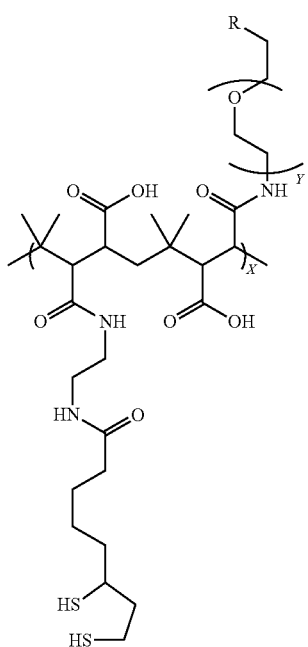

wherein Y has a value between one and about 100, X has a value between about 5 and about 10,000, or between about 10 and about 10,000, and each R is independently selected from the group consisting of hydroxyl (—OH), methoxy (—OCH₃), amino (—NH₂), azido (—N₃), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (B) and (C). A polymer comprising repeat units (B) and (C) may have the following representative structure:

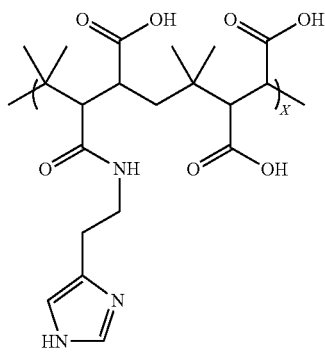

wherein X has a value between about 5 and about 20,000, or between about 10 and about 20,000. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (B) and (D). A polymer comprising repeat units (B) and (D) may have the following representative structure:

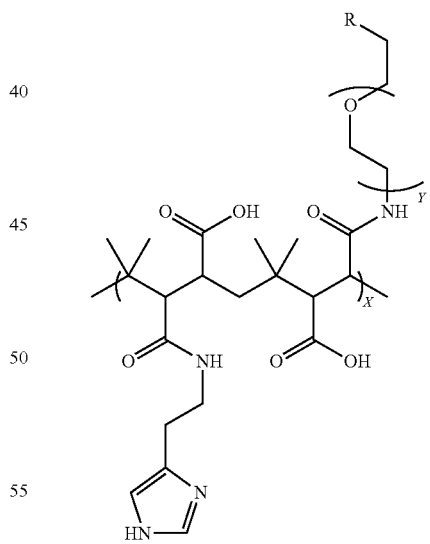

wherein Y has a value between one and about 100, X has a value between about 5 and about 10,000 or between about 10 and about 10,000, and each R is independently selected from the group consisting of hydroxyl (—OH), methoxy (—OCH₃), amino (—NH₂), azido (—N₃), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A'), (B), and (D). A polymer comprising repeat units (A'), (B), and (D) may have the following structure:

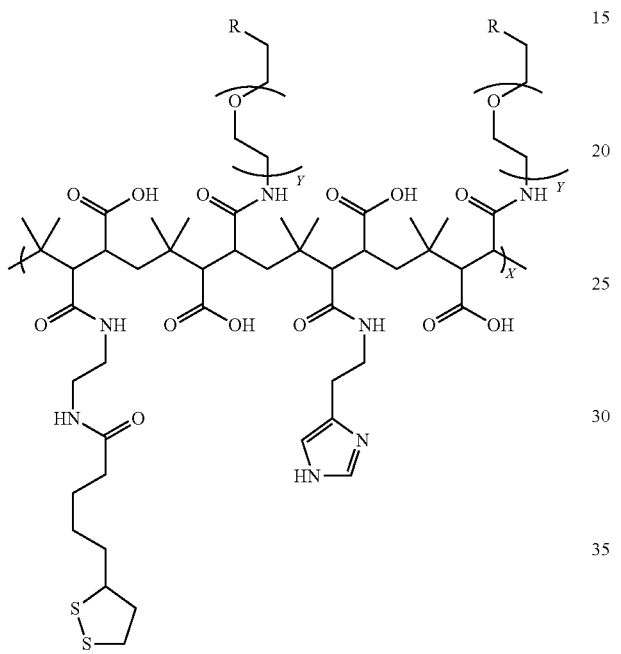

wherein Y has a value between one and about 100, X has a value between about 5 and about 10,000 or between about 10 and about 10,000, and each R is independently selected from the group consisting of hydroxyl (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A''), (B), and (D). A polymer comprising repeat units (A'), (B), and (D) may have the following structure:

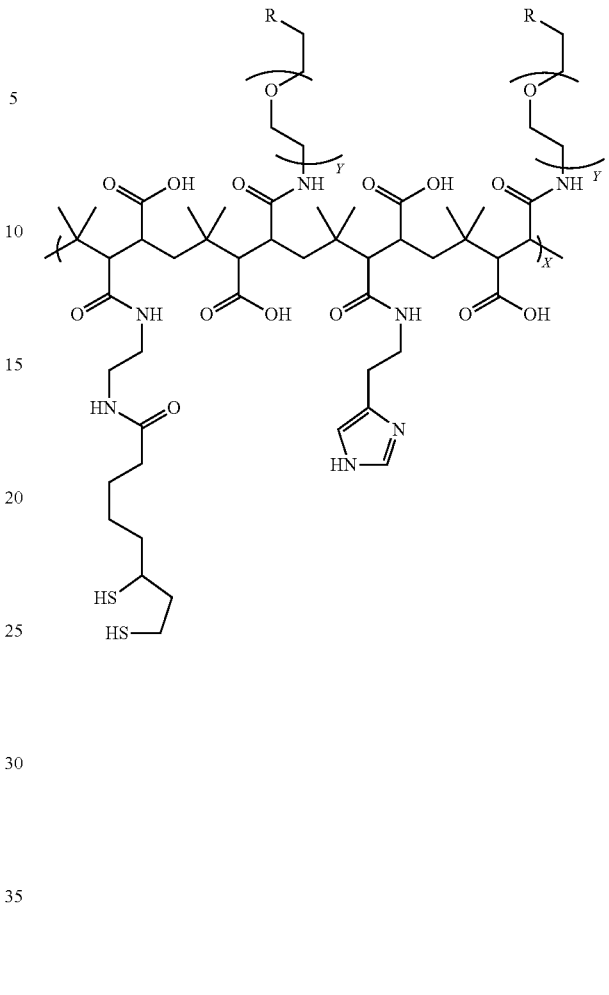

wherein Y has a value between one and about 100, X has a value between about 5 and about 10,000 or between about 10 and about 10,000, and each R is independently selected from the group consisting of hydroxyl (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A'), (B), and (D'). A polymer comprising repeat units (A'), (B), and (D') may have the following structure:

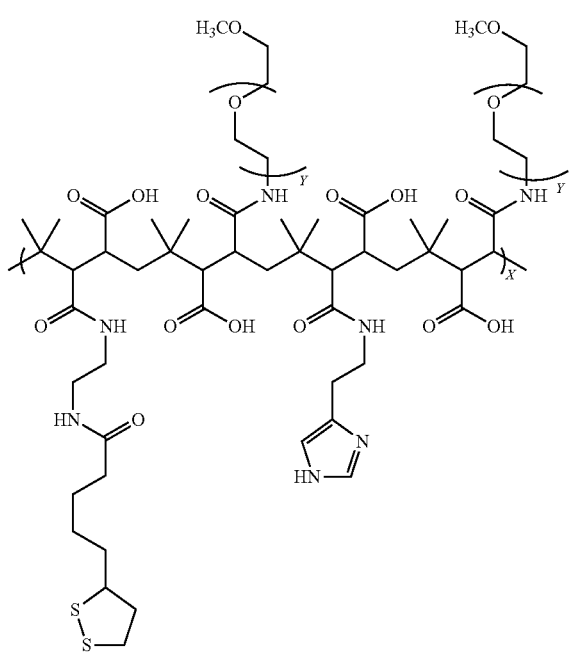

wherein Y has a value between one and about 100, X has a value between about 5 and about 10,000 or between about 10 and about 10,000. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A"), (B), and (D'). A polymer comprising repeat units (A'), (B), and (D') may have the following structure:

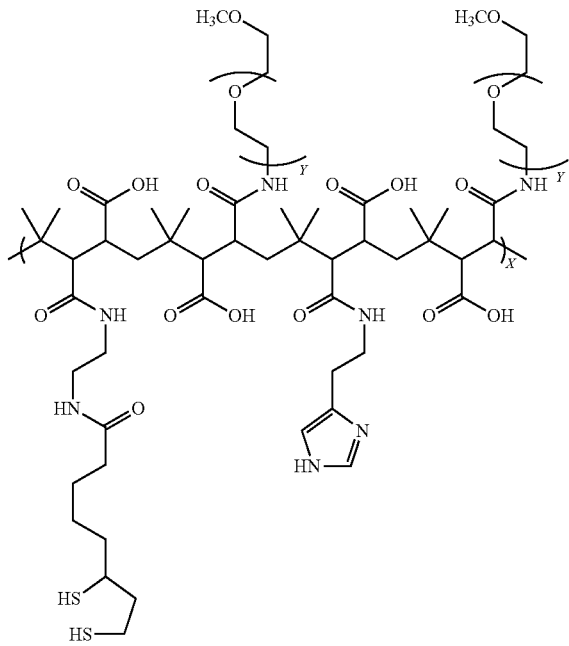

wherein Y has a value between one and about 100, X has a value between about 5 and about 10,000, or between about 10 and about 10,000. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A'), (B), (D), and (D'). A polymer comprising repeat units (A'), (B), (D), and (D') may have the following structure:

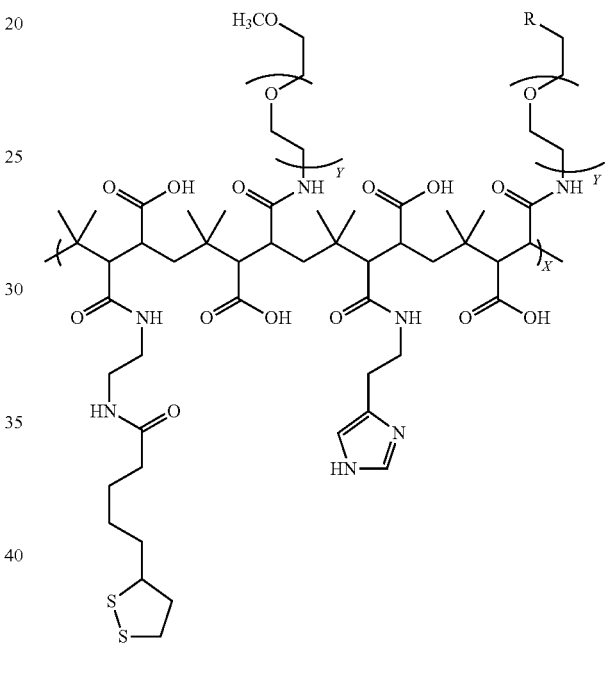

wherein Y has a value between one and about 100, X has a value between about 5 and about 10,000 or between about 10 and about 10,000, and each R is independently selected from the group consisting of hydroxyl (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the above polymer may be represented as follows:

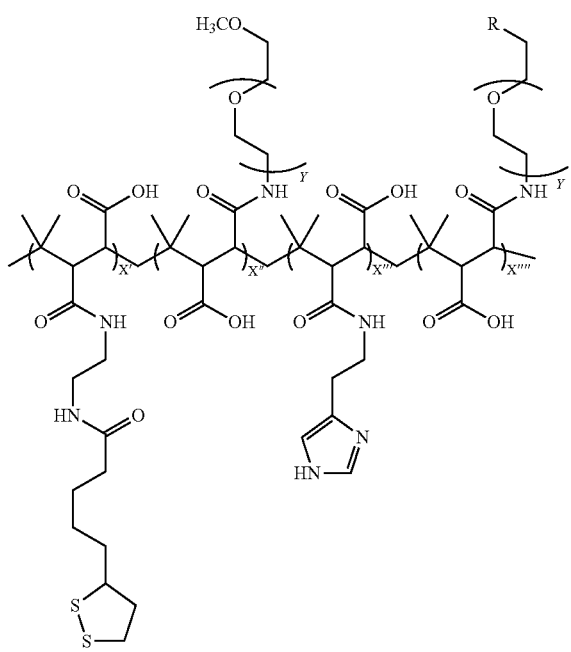

wherein Y has a value between one and about 100, each of X', X", X'", and X"" has a value between about 2 and about 5,000, and each R is independently selected from the group consisting of hydroxyl (—OH), methoxy (—OCH₃), amino (—NH₂), azido (—N₃), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, each of X', X", X'", and X"" has a value between about two and about 1,000, or between about 2 repeat units and about 500 repeat units, such as between about 3 repeat units and about 100 repeat units, between about 4 repeat units and about 50 repeat units, such as between about 4 repeat units and about 20 repeat units. The use of X', X", X'", and X"" is not intended to mean that each of the repeat units are present in block formation. Instead, the use of X', X", X'", and X"" is to provide the range of repeat units in the polymer. The various repeat units may be arranged in alternating, block, or random configurations.

In some embodiments, the polymer of the present invention may comprise repeat units (A"), (B), (D), and (D'). A polymer comprising repeat units (A'), (B), (D), and (D') may have the following structure:

wherein Y has a value between one and about 100, X has a value between about 5 and about 10,000 or between about 10 and about 10,000, and each R is independently selected from the group consisting of hydroxyl (—OH), methoxy (—OCH₃), amino (—NH₂), azido (—N₃), thiol (—SH), lipoic acid, ethynyl (—C≡CH), carboxyl (—COOH), aldehyde (—C(O)H), maleimide, and biotin. In some embodiments, Y may have a value between 5 and about 50, such as between 10 and about 20, such as about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units selected from among (A'), (A"), (B), (C), (D), (D'), (D"), (D'"), (E), (E'), and (E"). In some embodiments, the composition comprising the polymer comprising repeat units (E") and (C) may comprise the following structure:

wherein X has a value between about 10 and about 40,000, such as between about 5 and about 20,000 or between about 10 and about 20,000, such as between about 10 and about 10,000, or between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units selected from among (A'), (A''), (B), (C), (D), (D'), (D''), (D'''), (E), (E'), (E''), and (F). In some embodiments, the polymer of the present invention may comprise repeat units selected from among (A'), (A''), (B), (C), (D), (D'), (D''), (D'''), (E), (E'), (E''), (F), and (H). In some embodiments, the polymer of the present invention may comprise repeat units selected from among (A'), (A''), (B), (C), (D), (D'), (D''), (D'''), (E), (E'), (E''), and (G). In some embodiments, the polymer of the present invention may comprise repeat units selected from among (A'), (A''), (B), (C), (D), (D'), (D''), (D'''), (E), (E'), (E''), (G), and (H). In some embodiments, the polymer of the present invention may comprise repeat units selected from among (A'), (A''), (B), (C), (D), (D'), (D''), (D'''), (E), (E'), (E''), (F), and (G). In some embodiments, the polymer of the present invention may comprise repeat units selected from among (A'), (A''), (B), (C), (D), (D'), (D''), (D'''), (E), (E'), (E''), (F), (G), and (H).

In some embodiments, the polymer of the present invention may comprise repeat units (A'), (C), and (F). In some embodiments, the polymer of the present invention may comprise repeat units (A') and (F). In some embodiments, the polymer of the present invention may comprise repeat units (A'), (C), (D''), and (F). In some embodiments, the polymer of the present invention may comprise repeat units (A'), (D''), and (F). In some embodiments, the polymer of the present invention may comprise repeat units (A'), (C), (D'''), and (F). In some embodiments, the polymer of the present invention may comprise repeat units (A'), (D'''), and (F). In some embodiments, the polymer of the present invention may comprise repeat units (A'), (C), and (F).

In some embodiments, the polymer of the present invention may comprise repeat units (B), (C), and (F). In some embodiments, the polymer of the present invention may comprise repeat units (B), (C), (F), and (H). In some embodiments, the polymer of the present invention may comprise repeat units (B) and (F). In some embodiments, the polymer of the present invention may comprise repeat units (B), (F), and (H).

In some embodiments, the polymer of the present invention may comprise repeat units (B), (C), (D''), and (F). In some embodiments, the polymer of the present invention may comprise repeat units (B), (D''), and (F). In some embodiments, the polymer of the present invention may comprise repeat units (B), (C), (D'''), and (F). In some embodiments, the polymer of the present invention may comprise repeat units (B), (D'''), and (F). In some embodiments, the polymer of the present invention may comprise repeat units (B), (C), and (F).

In some embodiments, the composition comprising the polymer comprising repeat units (F) and (C) may comprise the following structure:

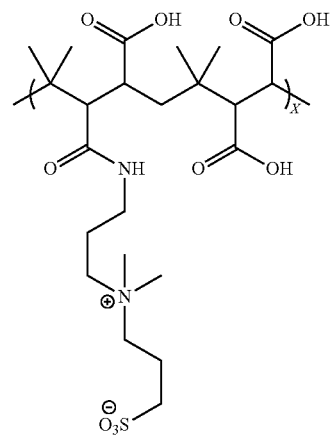

wherein X has a value between about 5 and about 40,000, between about 10 and about 40,000, such as between about 10 and about 20,000, such as between about 10 and about 10,000, or between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (C), (D), (E''), and (F). A polymer comprising repeat units (D), (E''), and (F) may have the following representative structure:

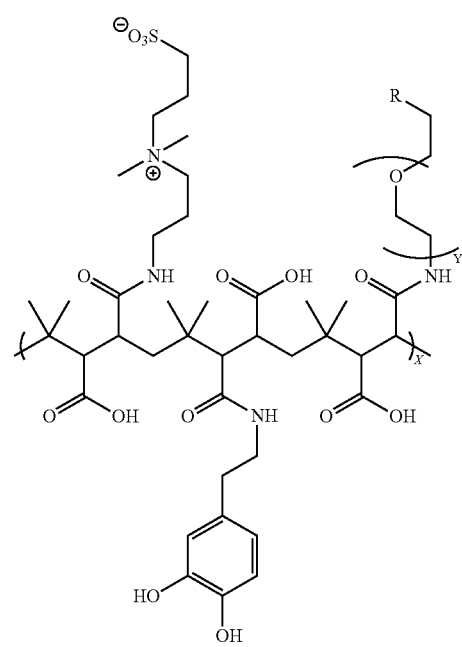

wherein Y has a value between one and about 100, X has a value between about 5 and about 10,000 or between about 10 and about 10,000, and each R is independently selected from the group consisting of hydroxyl (—OH), methoxy (—OCH₃), amino (—NH₂), azido (—N₃), thiol (—SH), lipoic acid, ethynyl (—C≡CH), carboxyl (—COOH), aldehyde (—C(O)H), maleimide, and biotin. In some embodiments, Y may have a value between 3 and about 50, such as between 3 and about 20, such as about 3, about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (B) and (F). A polymer comprising repeat units (B) and (F) may have the following representative structure:

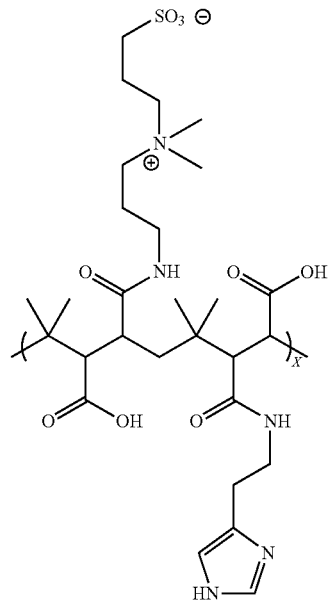

wherein X has a value between about 5 and about 10,000 or between about 10 and about 10,000. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (B), (F), and (H). A polymer comprising repeat units (B), (F), and (H) may have the following representative structure:

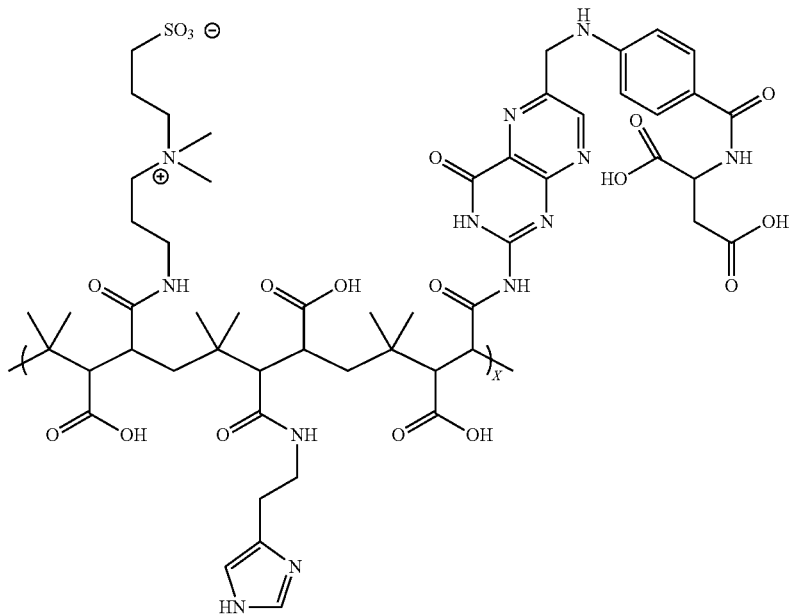

wherein X has a value between about 5 and about 10,000 or between about 10 and about 10,000. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (B), (D), and (F). A polymer comprising repeat units (B), (D), and (F) may have the following structure:

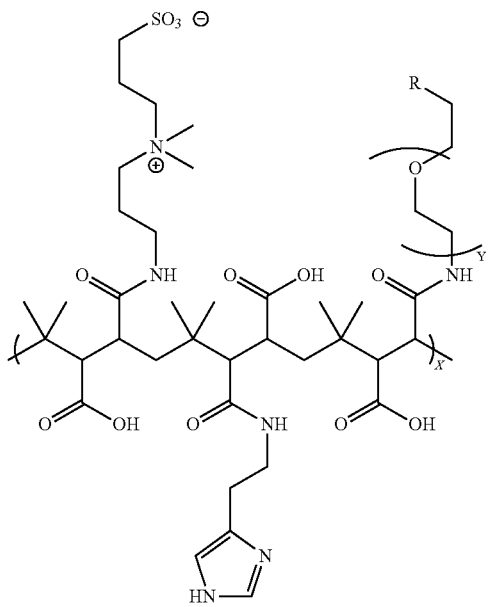

wherein Y has a value between one and about 100, X has a value between about 5 and about 10,000 or between about 10 and about 10,000, and each R is independently selected from the group consisting of hydroxyl (—OH), methoxy (—OCH₃), amino (—NH₂), azido (—N₃), thiol (—SH), lipoic acid, ethynyl (—C≡CH), carboxyl (—COOH), aldehyde (—C(O)H), maleimide, and biotin. In some embodiments, Y may have a value between 3 and about 50, such as between 3 and about 20, such as about 3, about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (B), (D″), and (F). A polymer comprising repeat units (B), (D), and (F) may have the following structure:

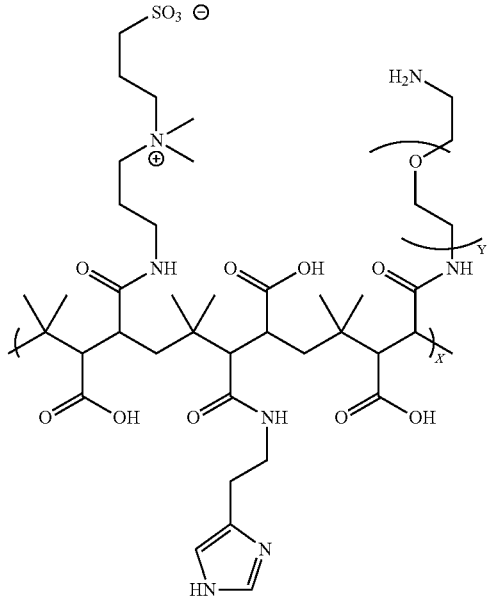

wherein Y has a value between one and about 100 and X has a value between about 5 and about 10,000 or between about 10 and about 10,000. In some embodiments, Y may have a value between 3 and about 50, such as between 3 and about 20, such as about 3, about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A') and (F). A polymer comprising repeat units (A') and (F) may have the following structure:

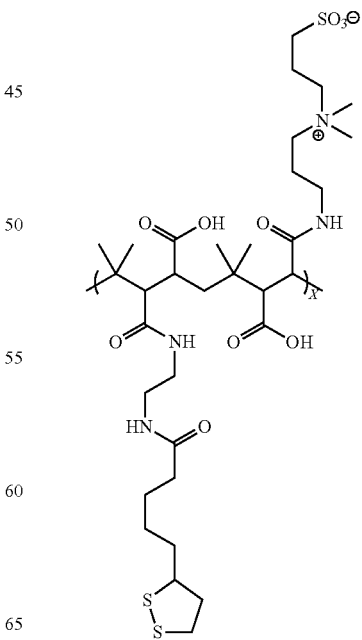

wherein X has a value between about 5 and about 10,000 or between about 10 and about 10,000. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A'), (D"), and (F). A polymer comprising repeat units (A'), (D"), and (F) may have the following structure:

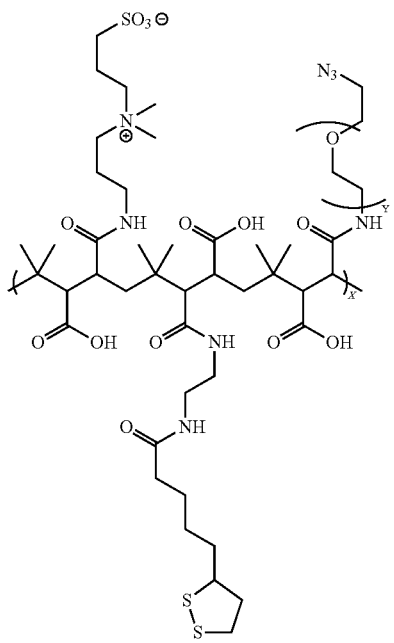

wherein Y has a value between one and about 100 and X has a value between about 5 and about 10,000 or between about 10 and about 10,000. In some embodiments, Y may have a value between 3 and about 50, such as between 3 and about 20, such as about 3, about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A'), (D'''), and (F). A polymer comprising repeat units (A'), (D'''), and (F) may have the following structure:

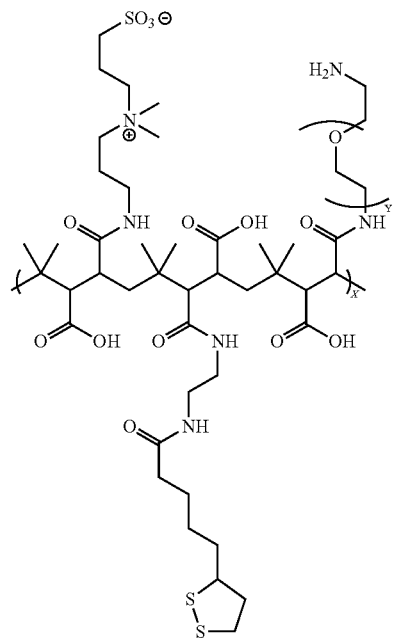

wherein Y has a value between one and about 100 and X has a value between about 5 and about 10,000 or between about 10 and about 10,000. In some embodiments, Y may have a value between 3 and about 50, such as between 3 and about 20, such as about 3, about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A'), (B), (D), and (F). A polymer comprising repeat units (A'), (B), (D), and (F) may have the following structure:

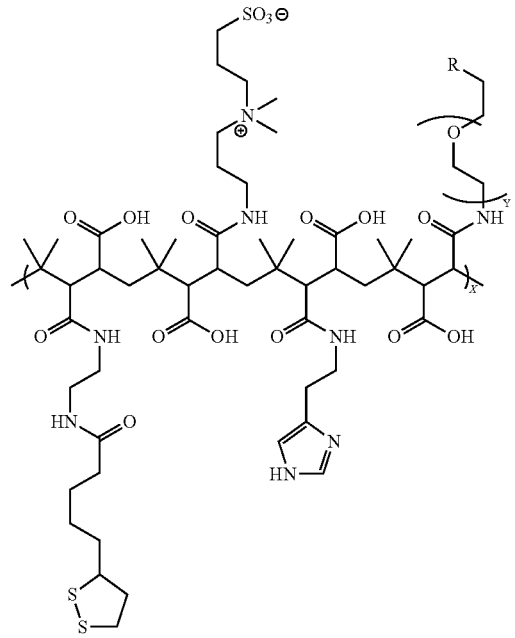

wherein Y has a value between one and about 100, X has a value between about 5 and about 10,000 or between about 10 and about 10,000, and each R is independently selected from the group consisting of hydroxyl (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin. In some embodiments, Y may have a value between 3 and about 50, such as between 3 and about 20, such as about 3, about 12, or about 15. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units, or between about 5 and about 50 repeat units.

In some embodiments, the polymer of the present invention may comprise repeat units (A') and (G). In some embodiments, the polymer of the present invention may comprise repeat units (A'), (C), (D"), and (G). In some embodiments, the polymer of the present invention may comprise repeat units (A'), (D"), and (G). In some embodiments, the polymer of the present invention may comprise repeat units (A'), (C), (D'''), and (G). In some embodiments, the polymer of the present invention may comprise repeat units (A'), (D'''), and (G).

In some embodiments, the polymer of the present invention may comprise repeat units (B) and (G). In some embodiments, the polymer of the present invention may comprise repeat units (B), (C), (D"), and (G). In some embodiments, the polymer of the present invention may comprise repeat units (B), (D"), and (G). In some embodiments, the polymer of the present invention may comprise repeat units (B), (C), (D'''), and (G). In some embodiments, the polymer of the present invention may comprise repeat units (B), (D'''), and (G).

In some embodiments, the polymer of the present invention may comprise repeat units (A'), (C), (F), and (G). In some embodiments, the polymer of the present invention may comprise repeat units (A'), (F), and (G). In some embodiments, the polymer of the present invention may comprise repeat units (A'), (C), (D"), (F), and (G). In some embodiments, the polymer of the present invention may comprise repeat units (A'), (D"), (F), and (G). In some embodiments, the polymer of the present invention may comprise repeat units (A'), (C), (D'''), (F), and (G). In some embodiments, the polymer of the present invention may comprise repeat units (A'), (D'''), (F), and (G).

In some embodiments, the polymer of the present invention may comprise repeat units (B), (C), (F), and (G). In some embodiments, the polymer of the present invention may comprise repeat units (B), (F), and (G). In some embodiments, the polymer of the present invention may comprise repeat units (B), (C), (D"), (F), and (G). In some embodiments, the polymer of the present invention may comprise repeat units (B), (D"), (F), and (G). In some embodiments, the polymer of the present invention may comprise repeat units (B), (C), (D'''), (F), and (G). In some embodiments, the polymer of the present invention may comprise repeat units (B), (D'''), (F), and (G).

In some embodiments, the composition comprising the polymer comprising repeat units (G) and (C) may comprise the following structure:

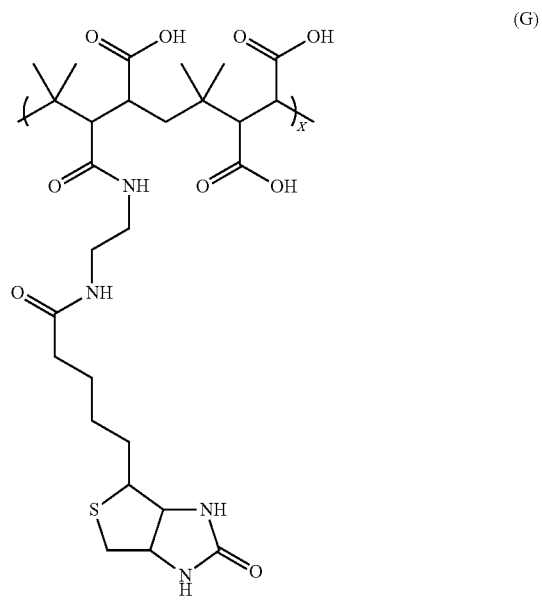

wherein X has a value between about 5 and about 40,000, between about 10 and about 40,000, such as between about 10 and about 20,000, such as between about 10 and about 10,000, or between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units.

In some embodiments, the polymer of the present invention may comprise repeat units (A'), (F), and (G). A polymer comprising repeat units (A'), (F), and (G) may have the following structure:

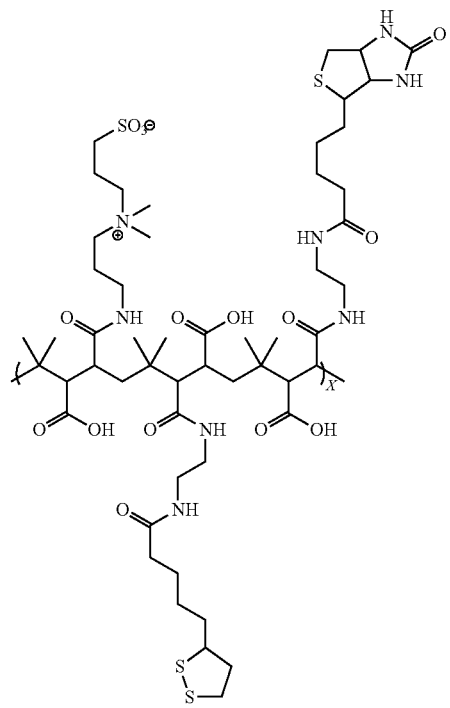

wherein X has a value between about 5 and about 10,000 or between about 10 and about 10,000. In some embodiments, X may have a value between about 10 and about 5,000, or between about 10 repeat units and about 2000 repeat units, such as between about 20 repeat units and about 1000 repeat units, between about 20 repeat units and about 400 repeat units, such as between about 20 repeat units and about 100 repeat units, or between about 10 repeat units and about 50 repeat units.

In each of the above polymers, the repeat units are depicted by way of example. The repeat units are shown in a certain arrangement merely to depict the repeat units that may occur in the polymer and not necessarily in the way they are present in the polymer. The repeat units may occur in random, alternating, or block fashion.

Contacting PIMA with one or more of the various amino containing reactants causes a ring-opening reaction to occur in which the amine-containing reactant is coupled to the maleic anhydride moiety using nucleophilic addition. The contact may occur in an organic, aproptic solvent, such as dimethylformamide, hexane, benzene, toluene, 1,4-dioxane, chloroform, diethyl ether, dichloromethane, tetrahydrofuran, ethyl acetate, acetone, acetonitrile, dimethylsulfoxide, and the like. In general, the nucleophilic coupling reaction may occur at elevated temperatures, such as between about 25° C. and about 200° C., such as between about 35° C. and about 100° C., such as between about 40° C. and about 70° C.

A polymer according to the present invention may have a molecular weight, Mw, between about 1000 Daltons and about 1,000,000 Daltons, such as between about 1000 Daltons and about 500,000 Daltons. In some embodiments, the polymer may comprise between about 10 repeat units and about 20,000 repeat units, such as between about 10 repeat units and about 10,000 repeat units, such as between about 10 repeat units and about 1000 repeat units, or between about 10 repeat units and about 100 repeat units, or between about 20 repeat units and about 50 repeat units.

In some embodiments, the invention provides a composition comprising a core nanoparticle material coated with a polymer ligand according to the present invention. A nanoparticle is generally a spherically shaped material having a diameter generally between about 1 nanometer and about 10,000 nanometers in diameter, such as between about 1 nanometer and about 2500 nanometers in diameter, or between about 1 nanometer and about 1000 nanometers in diameter, or between about 1 nanometer and about 100 nanometers in diameter. In some embodiments, the nanoparticle comprises a magnetic material. In some embodiments, the nanoparticle comprises a non-magnetic material. In some embodiments, the nanoparticle comprises a semiconductor material.

In some embodiments, the nanoparticle comprises a material selected from the group consisting of $Fe_3O_4$, $Fe_2O_3$, FePt, Co, Mn-doped $Fe_3O_4$, CdSeS/ZnS, InP/ZnS, PbS, CdTe, CoPt, FeCoPt, $CoFe_2O_4$, MnO, $Mn_3O_4$, $Co_3O_4$, FeO, Ni, $TiO_2$, $Al_2O_3$, CdSe, PbSe, $ZrO_2$, ZnO, Au, Ag, and graphene oxide.

In some embodiments, the nanoparticle comprises a material selected from the group consisting of silicon, germanium, tin, silicon carbide, selenium, tellurium, boron nitride, boron phosphide, boron arsenide, aluminum nitride, gallium nitride, gallium arsenide, indium nitride, indium antimonide, cadmium selenide, cadmium sulfide, zinc oxide, zinc sulfide, lead sulfide, and the like.

According to the present invention, nanoparticles may be capped or enclosed in a shell structure comprising the polymer of the present invention. Capping or enclosing the nanoparticle may occur by contacting a nanoparticle with a polymer of the present invention. In some embodiments, the polymer ligand of the present invention may displace an organic molecule, such as an oleic acid, that caps or encloses the nanoparticle. The organic molecule which caps the nanoparticle is often hydrophobic, and the nanoparticle may be dispersed in a hydrophobic solvent. By carrying out a ligand exchange reaction, the polymer of the present invention may convert a hydrophobic particle into a hydrophilic particle.

IV. Characterization of the Hydrophilic QDs.

The hydrophilic QD dispersions have been characterized using three complementary analytical techniques: 1) absorption and fluorescence spectroscopy; 2) dynamic light scattering; 3) $^1$H NMR spectroscopy. $^1$H NMR was further utilized to estimate the surface ligand density.

1) OPTICAL CHARACTERIZATION

FIG. 2A shows the absorption and emission spectra of a representative set of green-emitting QDs (emission peak at 556 nm) before and after ligand exchange with His-PIMA-ZW. The spectra of hydrophilic QDs exhibit identical profiles to those collected for the starting materials (TOP/TOPO-capped), indicating that the integrity of the nanocrystals following phase transfer was maintained. The quantum yield (QY) of the QDs after ligand exchange was evaluated by comparing the PL of water dispersible QDs to that measured from the hydrophobic QDs dispersed in hexane. The relative PL intensity of the aqueous QDs with respect to the hydrophobic dispersions was ~90%. See FIG. 2B. This rather high PL of the hydrophilic QDs derives from the benefits of imidazole coordination onto the QD surfaces; this confirms and complements prior observations where conjugation of polyhistidine-tagged proteins onto DHLA-capped QDs produced a sizable enhancement in the PL signal. See References 50 and 51.

2) NMR CHARACTERIZATION

The $^1$H NMR spectrum in FIG. 2C, collected from His-PIMA-ZW-QDs, shows two distinct peaks at 7.03 and 7.17 ppm characteristic of the two protons in the imidazole ring; these peaks are slightly shifted and have lower intensity than those measured for the pure ligand, due to a change in environment following coordination onto the QD surfaces. The pronounced resonance at 3.00 ppm corresponds to the methyl groups of the zwitterion moieties, while the smaller peaks at 2.10, 2.85, 3.27 and 3.35 ppm are ascribed to the protons in the CH2 of the zwitterion and imidazole moieties. See FIG. 2C. The broad peak at ~0.89 ppm is ascribed to the methyl protons in the PIMA chain. Similarly, the $^{31}$P NMR spectrum collected for His-PIMA-ZW-QDs shows that the two sharp peaks at ~-30 ppm and ~50 ppm measured for the hydrophobic QDs and respectively attributed to TOP and TOPO, have disappeared following ligand exchange. These data indicate that cap exchange with His-PIMA-ZW is highly efficient and is driven by the coordination of the imidazole groups onto the QDs.

3) DIFFUSION-ORDERED SPECTROSCOPY AND DYNAMIC LIGHT SCATTERING

Diffusion-ordered NMR spectroscopy (simply DOSY) is a versatile, non-destructive technique that can resolve the diffusion coefficient, D, of sub-nanometer objects in solution, which makes it more suitable than dynamic light scattering for characterizing rather small nanoparticles. It exploits the time-dependent signature of NMR active atoms (e.g., $^1H$, $^{13}C$, or $^{31}P$) in a molecule of interest dispersed in a deuterated solution. See Reference 57. When applied to colloidal nanocrystals, DOSY provides a measure of the diffusion coefficients of ligands (associated with the observed resonances); thereby it permits the assignment of spectral features in the measured $^1H$ NMR spectrum to diffusing species that are either bound on the nanocrystals or free in the medium. For QDs ligated with His-PIMA-ZW, the various resonances in its $^1H$ NMR spectrum can be ascribed to two distinct diffusion coefficients. See FIG. 2D. The faster diffusion (D=$1.78 \times 10^{-9}$ $m^2/s$) is attributed to solubilized water molecules in the sample, while the smaller value (D=$4.16 \times 10^{-11}$ $m^2/s$) associated with multiple proton resonances in the ligands corresponds to His-PIMA-ZW-QDs (i.e., bound ligands). Given the absence of signals on unbound ligands in the measured spectrum, it indicates that following phase transfer and purification no measurable free ligands were left in the medium, further confirming the effectiveness of the ligand design and protocols used. The QD hydrodynamic radius (RH) extracted from the diffusion coefficient using Stokes-Einstein equation, D=$kBT/(6\pi\eta RH)$, is ~5.2 nm; kB is the Boltzmann constant, T is the absolute temperature (293 K) and $\eta$ is the dynamic viscosity of the medium (~1 cP or $1.002 \times 10-3$ N $s/m2$).58,59 This value is in good agreement with the size extracted from dynamic light scattering (RH~5.7 nm), using the Laplace transform of the autocorrelation function. See FIG. 2E. This size is comparable to that measured for DHLA-QDs, but ~2.5 nm smaller than the value measured for DHLA-PEG750-QDs with similar core radius.60 The rather compact size offered by this polymer-coating results from combining multi-coordination on the QDs and the use of the zwitterion motif, yielding homogeneous QDs with a very thin surface coating. Such thin coating is further confirmed by the ability to conjugate polyhistidine-tagged proteins onto these QDs (see below).

4) ESTIMATION OF THE LIGAND DENSITY PER QD

The above NMR data were exploited to extract an estimate for the density of polymer ligands on the nanocrystals, by comparing the total concentration of ligands to that of the QDs in the sample with added pyridine as a standard. The concentration of ligands was extracted by comparing the integrations of the methyl-proton in the polymer backbone to the α-proton in pyridine. The QD concentration was estimated from the absorbance at 350 nm. Such analysis yielded a value of ~13.3 polymer ligands per QD emitting at 537 nm (radius ~3.0 nm, extracted from x-ray scattering). This corresponds to ~260 imidazole anchoring groups per QD. We also used NMR data to estimate the number of amines and folic acid groups per QD when ligated with His-PIMA-ZW/NH2 (10% amine) or His-PIMA-ZW/FA (10% folic acid). Overall, there are ~52 amines or folic acid groups per QD.

5) COLLOIDAL STABILITY TESTS

The colloidal stability of aqueous QDs capped with His-PIMA-ZW was evaluated under several biologically relevant conditions, including a pH range 3-13, high ionic strength buffers (1 M NaCl), growth media (100% RPMI-1640), and storage of nanomolar dispersions (e.g., 10 nM) under room temperature and light exposure conditions.

FIG. 3A shows the fluorescence images of green-emitting QDs dispersed in buffers at pH 5-13 and in 1 M NaCl buffer, stored at ~4° C. in the dark. All QD dispersions stayed stable for at least 12 months, with no sign of aggregation or loss of fluorescence. QDs were stable in pH 3 buffer for at least 5 weeks, though the fluorescence sizably decreased after 3 weeks. This reduced stability at such low pH is expected, due to the protonation of imidazole (pKa of the imidazole ~6.0). This instability was reported for other imidazole-based ligands at pH≤5.22. See Reference 48. The stability of QDs was also assessed in the presence of endogenous thiols, namely glutathione and in cell growth media. FIG. 3B shows the fluorescence images for QD dispersions in 10 mM glutathione solution and 100% growth media (RPMI-1640), with no aggregation build up or loss of fluorescence for 3 months of storage. The above results are very important for using such QDs to investigate intracellular media, rich in ions, proteins and reducing agents.

We further tested the colloidal stability of His-PIMA-ZW-QDs at low concentrations and under room temperature and light exposure conditions. The fluorescence images in FIG. 4A indicate that the QDs stayed stable for at least 4 months at all the concentrations used: 300 nM, 50 nM, and 10 nM. The PL intensity measured for the 300 nM QD dispersion was essentially unchanged for at least 60 days. For the 50 nM and 10 nM dispersions the fluorescence emission was maintained for the first month, but gradually decreased after that. For example, losses of ~30% and ~50% were respectively measured for the 50 nM and 10 nM dispersions after 2 months. See FIG. 4B. In comparison, a pronounced reduction in the PL was measured for QDs photoligated with LA-PEG750-OMe-QDs reported in reference 45. The reduced stability of QDs capped with molecular thiol derivatives at small concentrations and over time has been attributed to possible thiol oxidation and ligand desorption from the QD surfaces. See References 22, 38, and 39. Stability against oxidation was monitored for our newly-capped QDs when dispersed in a solution of hydrogen peroxide ($H_2O_2$). FIG. 4C shows that the QD PL was essentially unaffected by the addition of $H_2O_2$ throughout the range of concentrations tested up to 240 μM, with the PL intensity remaining at 95%-100% of its initial value. In comparison, DHLA-PEG750-OMe-QDs exhibited weaker resistance to $H_2O_2$, as indicated by a ~30% reduction in PL measured at 60-240 μM $H_2O_2$.

Overall the better colloidal stability at pH 5-13, to $H_2O_2$ oxidation, and in growth media proves a great tolerance of the His-PIMA-ZW-QDs to photo and chemical oxidation, a result that can be attributed to the enhanced coordination of the multi-imidazole ligands and the strong affinity of zwitterion moieties to water.

6) QD-PROTEIN CONJUGATION

Direct immobilization of polyhistidine-appended biomolecules onto the nanocrystal surface, as a means of forming QD-bioconjugates driven by metal-affinity coordination, has been applied to attach peptides and proteins to core-shell QDs and AuNPs alike. See References 50, 52-54, and 63. This is an attractive route due to the ease of implementation and the ubiquitous presence of His-tagged proteins expressed in bacteria, or synthetically-prepared peptides. However, one key requirement for such conjugation is to use small capping ligands so that the His-tag is able to directly reach to the nanocrystal surface. In our previous work, DHLA-capped QDs have been extensively used for conjugation with His-tagged proteins, but the colloidal stability of these nanocrystals was limited to basic conditions. See References 50-52. Here, we applied this conjugation strategy to the His-PIMA-ZW-capped QDs (emitting at 556 nm) using two proteins: maltose binding protein appended with a N-terminus 7-histidine tag (MBP-His7) and a fluorescent protein appended with a N-terminus 6-histidine tag (mCherry-His6).

7) QD-MBP CONJUGATES

Amylose Column Assay

QD-MBP conjugation was tested using amylose chromatography, followed by competitive release with maltose. See FIG. 5A. Following incubation of MBP-His7 with His-PIMA-ZW-QDs (ratio of MBP:QD=12:1), the resulting QD-MBP conjugates were tightly bound onto the top of the amylose column (as indicated by the green fluorescent band observed under irradiation using a hand held UV lamp), and were not eluted even after three washes with buffer; this binding is promoted by the affinity of MBP to the amylose gel. Addition of 1 mL of 20 mM D-maltose, the substrate of MBP, readily resulted in elution of the conjugates. Binding to amylose and release by adding maltose, complemented with the fluorescence emission of the band, confirmed that the conjugation between MBP-His7 and the polymer-capped QDs has taken place. We should note that conjugation of DHLA-QDs to His-tagged proteins has been accompanied by enhancement in the QD emission. See References 50 and 51. A similar trend was observed for our conjugates, with a progressive increase in the sample PL when the ratio of MBP-to-QD increased from 0:1 to 12:1. However, this enhancement was much smaller compared with that measured for MBP-His5 self-assembled onto DHLA-capped QDs. See References 50 and 51. For instance, only ~20% enhancement was measured for the His-PIMA-ZW-QDs conjugated with ~8 MBP-His7, while an increase of ~90% was measured for the DHLA-QD with the same conjugate valence. See Reference 51. Such variance is probably due to the different nature of surface capping between the two sets of ligands. Thiol-appended ligand tends to lower QD PL, hence the effects of polyhistidine tag coordination are more pronounced. See Reference 40. In contrast, His-PIMA-ZW-QDs already have high PL signal with multi-imidazole coordination, limiting the enhancement effects of His-tagged protein conjugation.

8) QD-MCHERRY CONJUGATES

Fret Analysis

Self-assembly of the fluorescent mCherry protein appended with a His6-tag onto His-PIMA-ZW-QDs was verified by evaluating the fluorescence resonance energy transfer (FRET) interactions. FIG. 5B shows the absorption spectra of QD-mCherry-His6 at a protein-to-QD ratio (conjugate valence) ranging from 0:1 to 12:1. The progressive increase in the absorption peak at ~586 nm is due to mCherry contribution. The corresponding composite emission spectra, collected using excitation at 400 nm, are shown in FIG. 5C. Spectra show a progressive loss in QD emission accompanied with a gradual increase in mCherry emission as the molar ratio of protein-to-QD increases. Since the fluorescence due to direct excitation of the mCherry is negligible, we attribute the fluorescence contribution of mCherry in the composite spectra to FRET sensitization of the protein.

Values for the relative QD PL losses along with the FRET efficiencies, derived from the deconvoluted emission spectra as a function of conjugate valence, are shown in FIG. 5D. The trends for both experimental parameters agree well with the predictions from the FRET interactions between one central donor surrounded by n equally-spaced acceptors. Using the expression of FRET efficiency for the above conjugate configuration, $E=nR0^6/(nR0^6+r^6)$ (R0 and r being the Förster radius and QD-to-mCherry center-to-center separation distance, respectively), we extract an experimental estimate for r of ~60 Å. This value is comparable to the value measured for mCherry-His6 self-assembled onto QDs photoligated with bis(LA)-ZW ligands, but slightly larger than the value reported for mCherry self-assembled onto green-emitting DHLA-QDs (r~56 Å). We should note that in order to account for the small enhancement in QD PL upon conjugation to polyhistidine tagged proteins, the PL from dispersions of QD-MBP-His7 conjugates were used as control/reference samples to calculate the experimental FRET efficiencies. This result is greatly promising to form self-assembled QD-protein conjugates, where control over valence and potentially protein orientation is easily achieved using this approach.

9) QD-DOPAMINE CONJUGATES AS PL SENSING PLATFORMS

It has been reported that oxidized dopamine can interact with the cysteine residues of parkin, a ligase protein that mediates the degradation of proteins toxic to dopaminergic neurons. See Reference 65. This covalent modification results in degeneration of nigral neurons over time, due to the inactivation of its ubiquitin ligase function. Meanwhile, the oxidative metabolism of dopamine has received a great attention in Parkinson's disease because it yields quinones, hydrogen peroxide and other reactive oxygen species (ROS), which could damage lipids, proteins, DNA and consequently lead to cell death. See Reference 66. Those studies also indicate that oxidative metabolism of dopamine is closely related with iron-catalysis and depletion of bio-thiol molecules (e.g., cysteine) to form 5-S-cysteinyl-dopamine. See References 67-69.

We tested some of these interactions by probing their effects on the fluorescence emission of QD-dopamine conjugates. For this we first reacted dopamine-isothiocyanate (dopamine-ITC) with His-PIMA-ZW/NH$_2$-capped QDs to promote covalent attachment via isothiourea bond. See Reference 70. This produces sensing platforms where the fluorescence emission can be modulated by charge transfer (CT) interactions between the QD and proximal dopamines. We used these conjugates to probe: changes in the buffer pH, effects of added iron ions, and interactions with cysteine amino acid. pH-induced PL changes are attributed to a change in the oxidization potential of catechol with increasing pH, combined with a shift in the chemical equilibrium between dopamine catechol (reduced form) and dopamine quinone (oxidized form). The thiol group of cysteine reacts with quinone (dominant at pH 10) to form 5-S-cysteinyl-dopamine. This reaction produces a QD PL recovery, due to a reduction in the charge transfer interactions with the QDs, as the concentration of quinone in the medium is decreased. Fe-catalyzed oxidation of dopamine increases the concentration of quinone, thus enhancing electron transfer interactions from QDs. This results in pronounced PL loss that directly traces the concentration of added Fe ions. The added of cysteine molecules compete with Fe ions for interactions with quinone, promoting a reverse transformation to 5-S-cysteinyl-dopamine. This transformation alters the nature of QD-to-dopamine interactions, resulting in QD PL recovery.

10) INTRACELLULAR DELIVERY OF FOLIC ACID-DECORATED QDS

The folate receptor protein is a biomarker commonly overexpressed on the membrane of breast, lung, kidney and ovary epithelial cancer cells. See References 73 and 74. It has high affinity for folic acid (with a reported dissociation constant, $K_D \approx 0.1$ nM) and it promotes its intracellular transport via receptor-mediated endocytosis.74-76 This uptake mechanism has been exploited to promote the intracellular uptake of folic acid-conjugated nanoparticles and drugs, as well as for use in tumor-targeting, imaging and anticancer therapy. See References 74,77, and 78. Here, we demonstrate that our folic acid-modified ligand (His-PIMA-ZW/FA) can promote the delivery of large amounts of QDs into live cells.

FIG. 6A shows the epifluorescence images collected for HeLa cells co-incubated with QD-His-PIMA-ZW/FA (QD-FA, 200 nM) and Texas Red-transferrin (0.5 μM) for 1 hour. The images in the first panel correspond to the QD emission (green), Texas Red-transferrin endolysosomal marker (second panel, red), a merged composite fluorescence image with the DAPI staining of the nuclei (third panel, blue), along with an image superposing fluorescence and differential interference contrast (fourth panel, DIC). Images show the presence of punctuate QD fluorescence distributed in the perinuclear region, with no apparent nuclear staining. The QD fluorescence was mostly co-localized with the distribution of endo/lysosomal compartments shown in the merged images, indicating that the QD-FA conjugates have been mainly internalized via folate-mediated endocytosis. In comparison, control experiments carried out using cells incubated with QD-His-PIMA-ZW (no folic acid) showed no intracellular QD fluorescence.

To probe the efficiency of folic acid-mediated internalization, we incubated cells with QD-FA conjugates at different concentrations and for different time intervals. FIG. 6B shows three representative fluorescence images collected for HeLa cells incubated with 100, 150, and 200 nM QD-FA conjugates for 1 hour. Images clearly show that the intracellular uptake of QDs was concentration-dependent, with the highest fluorescence observed for cells incubated with 200 nM conjugate dispersions. Similarly, higher intracellular staining was measured for cells incubated with QD-FA conjugates for longer time (see FIG. 7C), indicating that uptake is also time-dependent. These results combined prove that folic acid-modified polymer ligand promote specific cellular internalization of QDs in concentration- and time-dependent manner.

11) CELLULAR UPTAKE OF QD-TRANSFERRIN CONJUGATES

Here, we tested the intracellular uptake of QDs conjugated to the protein receptor transferrin after phase transfer to buffer. For this, we started with QDs capped with His-PIMA-ZW ligands. The carboxylic acid groups along the PIMA backbone were then activated with EDC/NHS, followed by reaction with lysine amino acids of transferrin (via carboxyl-to-amine crosslinking), as illustrated in FIG. 7A. The QD-transferrin conjugates were separated from byproducts using PD-10 size exclusion column, then incubated with HeLa cells at 200 nM for 1 hour. These cells were washed twice with PBS buffer and subsequently incubated with 0.5 μM TR-Tf (as endosome marker) for an additional 40 min. FIG. 7B shows that the QD-green signal was observed for the cells incubated with the QD-transferrin, and that the distribution is fully co-localized with that of TR-Tf marker, indicating that here too the uptake is via endocytosis. Control experiments indicate that incubation of cells with unconjugated QDs at the same concentration resulted in no intracellular signal (data not shown).

These findings combined indicate that the prepared polymer-coated QDs can be reacted post phase transfer with specific proteins or peptides via either metal-polyhistidine conjugation or covalent coupling to yield bio-reactive conjugates. Alternatively, biomolecules can be introduced in the polymer structure in-situ during the ligand synthesis prior to ligand exchanged on the nanocrystal. The conjugates prepared via either route can be effectively used in applications such as sensing, cellular uptake and imaging.

12) CONCLUSION

In some embodiments, a new set of metal-coordinating polymer ligands is developed combining the imidazole anchoring group with the hydrophilic zwitterion motif and used them for the surface-functionalization of luminescent QDs. The ligand design exploits the highly efficient nucleophilic addition reaction between poly(isobutylene-alt-maleic anhydride), PIMA, and amines, and was used to introduce a controllable number of imidazole anchors, hydrophilic zwitterion moieties, along with reactive groups on the same polymer chain. We have further exploited this addition reaction to introduce biomolecules (such as folic acid as cancer cell targeting agent) into the polymer ligands prior to ligation on the QDs. This expands on our previous work using the PIMA precursor to prepare other PEG-based ligands; those ligands were used to functionalize iron oxide nanoparticles, QDs and AuNPs.

Ligation with these polymers has yielded hydrophilic QDs that exhibit excellent colloidal stability over a broad range of biological conditions, including storage at very low concentrations and under ambient conditions and a resistance against chemical oxidation by $H_2O_2$. This very thin hydrophilic coating afforded by zwitterion motif yields QDs with small hydrodynamic radius (RH~5-6 nm), allowing conjugation with polyhistidine-tagged proteins via metal-affinity coordination. We have also shown that coupling of dopamine onto the QDs provides fluorescent platforms that can sense changes in pH of the medium, the presence of Fe ions, and interactions with cysteine. Finally, we found that QDs ligated with folic acid-modified polymer could promote the effective delivery of large amounts of QDs into living cancer cells via folate receptor-mediated endocytosis.

These results are greatly promising for fluorescent labeling in biology, including cellular imaging and sensing, where probes that are small in size and stable at very low concentrations are often required. Conjugates prepared with such nanocrystals would find great use to image blood vasculature and for tracking protein migration in live cells and tissues. We also anticipate that this chemical design would be applicable to prepare additional polymers with other functionalities adapted to different inorganic nanocrystals. This nucleophilic addition reaction can be easily used to develop various functional polymers with potential applications in antifouling coating and for chelation to transition metal surfaces.

EXAMPLES

The following non-limiting examples are provided to further illustrate the present invention.

Example 1. Materials

Poly(isobutylene-alt-maleic anhydride) (PIMA) (average MW: 6000 Da), histamine, ethylenediamine, N,N-dimethylamino propylamine, 1,3-propanesultone, lipoic acid, biotin, di-tert-butyl dicarbonate, poly(ethylene glycol) (PEG) (average MW: ~600 Da), dopamine hydrochloride, triethylamine, hydrochloric acid, carbon disulfide, hydrogen peroxide solution, RPMI-1640 medium, dicyclohexylcarbodiimide (DCC), N-hydroxysuccinimide (NHS), tetramethylammonium hydroxide (TMAH), along with most of the chemicals used were purchased from Sigma Aldrich (St Louis, Mo.). Solvents were purchased from Sigma Aldrich (St Louis, Mo.). Deuterated solvents used for NMR experiments were purchased from Cambridge Isotope Laboratories (Andover, Mass.). x-rhodamine-5-(and-6)-isothiocyanate was purchased from Invitrogen, Life Technologies. DBCO-acid (MW=305.11 g/mol) was purchased from Click Chemistry Tools (Scottsdale, Ariz.). The chemicals and solvents were used as received unless otherwise specified.

The syntheses were carried out under $N_2$ passed through an $O_2$ scrubbing tower unless otherwise stated. Air sensitive materials were handled in an MBraun Labmaster glovebox, and standard Schlenk techniques were used when handling air-sensitive materials.

Example 2. Characterization

Optical absorption data of various QD dispersions were collected using a UV-Vis absorption spectrophotometer (UV 2450 model, Shimadzu, Columbia, Md.). The fluorescence spectra were collected using a Fluorolog-3 spectrofluorometer (HORIBA Jobin Yvon, Edison, N.J.) equipped with PMT and CCD detectors. $^1$H and $^{31}$P NMR spectra were recorded using a 600 MHz spectrometer (Bruker SpectroSpin, Billerica, Mass.). The dynamic light scattering measurements were carried out using ALV/CGS-3 Compact Goniometer System (ALV-GmbH, Langen, Germany). This system is equipped with a HeNe laser (illumination at 632.8 nm), ALV photon correlator and an avalanche photodiode for signal detection. Each scattered pattern used for analysis is the average of 3 acquisitions of 10 seconds each. Solvent evaporation was carried using a rotary evaporator R-215 (Buchi, New Castle, Del.). FT-IR spectra of the purified compounds were collected using a Spectrum 100 FTIR Spectrometer (PerkinElmer, Waltham, Mass.). The fluorescence images were acquired using an Inverted Nikon Eclipse Ti Microscope equipped with a color CoolSNAP HQ2 CCD camera. Excitation of the sample was provided by a Xe lamp, while the fluorescence images were collected using a 60× objective (Nikon) and a set of filter cubes from Chroma Technology (Rockingham, Vt.). The DAPI fluorescence was detected using a DAPI cube (with 340-380 nm excitation and 435-485 nm emission), the green QD signal was detected using a GFP/EGFP cube (with 450-490 nm excitation and 500-550 nm emission), and the red QD fluorescence and Texas Red-transferrin florescence was detected using a TEXAS RED HYQ cube (with 532-587 nm excitation and 608-683 nm emission).

Example 3. Syntheses of Lipoic Acid-Amine (LA-NH$_2$)

The amine-terminated lipoic acid precursor (LA-NH$_2$) was synthesized by coupling lipoic acid to ethylenediamine. The structure was characterized by $^1$H NMR in DMSO-d$_6$).

Example 4. Synthesis of Amino-Zwitterion (ZW—NH$_2$)

Step 1. N,N-dimethylamino propylamine (6 mL, 47.7 mmol) was dissolved in 50 mL of dioxane, and then di-tert-butyl dicarbonate (15.6 g, 71.5 mmol) was added. The solution was stirred at 0° C. for 2 h, and then warmed up to room temperature. After overnight reaction, the solvent was evaporated and 50 mL of DI water was added. The product was extracted with ethyl acetate 3 times. The combined organic layer was dried with Na$_2$SO$_4$. After evaporating ethyl acetate, the product was obtained as a white powder and used in the next step without further purification.

Step 2. The compound (7.2 g) obtained above was dissolved in 30 mL of DMF, and then 1,3-propanesultone (4.67 mL, 53.2 mmol) was added. This solution was stirred for 2 days at room temperature. After evaporating the solvent, the product was dispersed in ethyl ether and stirred for 10 min. The solvent containing excess 1,3-propanesultone was decanted, followed by further drying under vacuum to yield the product as a yellowish paste.

Step 3. The compound obtained in step 2 was dissolved in 100 mL of methylene chloride at 0° C., and then 10 mL of 4 M HCl in dioxane was added. After 30 min, the solvent was evaporated under vacuum. The crude compound was recrystallized in methylene chloride/isopropyl alcohol/methanol (10:5:1, volume ratio).

Example 5. Synthesis of Amino-Biotin (Biotin-NH$_2$)

Biotin (0.5 g, 2.0 mmol) and 1,1'-carbonyldiimidazole (0.389 g, 2.4 mmol) were mixed in a 100-mL round bottom flask. 20 mL of DMF was added to the flask and the reaction mixture was stirred at room temperature. The white turbid solution became clear and colorless after 15-20 min. The reaction mixture was further stirred for another 1 hour, then transferred to an addition funnel. This content was added dropwise (over 1 h) to a mixture of ethylenediamine (2.66 mL, 40 mmol) and 5 mL of DMF in a 100-mL two-neck round bottom flask. The reaction mixture was stirred at room temperature overnight. The solvent was removed under vacuum and diethyl ether (~40 mL) was added to precipitate the compound. The solid was collected by centrifugation and washed with tetrahydrofuran (3×20 mL). The solid was dried under vacuum, producing white powder with yield ~85%. The structure was characterized by $^1$H NMR in D$_2$O.

Example 6. Synthesis of His-PIMA-ZW

In a 50-mL three-neck round-bottom flask equipped with an addition funnel and a magnetic stirring bar, 0.385 g of poly(isobutylene-alt-maleic anhydride) (PIMA, MW 6000 g/mol, 2.5 mmol of monomer units) was dissolved in 5 mL of DMSO. The solution was purged with nitrogen for 10 min and then heated to 45° C. Histamine (0.139 g, 1.25 mmol) was dissolved in 1 mL of DMSO using a scintillation vial, and this content was added dropwise to the PIMA solution through the addition funnel. After that, 1 mL of DMSO solution containing ZW—NH$_2$ (0.280 g, 1.25 mmol) was added, and the reaction mixture was left stirring at 45° C. overnight. The solution was concentrated to ~2 mL under vacuum, and large excess of acetone was added to precipitate the compound, followed by centrifugation. The solid pellet was washed 3 times with chloroform and then dried under vacuum, producing the final product as white powder; the reaction yield was ~93%.

Example 7. Synthesis of His-PIMA-ZW/NH$_2$ (10% Amine)

PIMA (0.385 g, 2.5 mmol of monomers) was dissolved in 5 mL of dry DMSO using a 50-mL round-bottom flask equipped with an addition funnel and a magnetic stirring bar. The solution was purged with nitrogen for 10 min and then heated to 45° C. To the stirring solution, 1 mL of DMSO containing histamine (0.139 g, 1.25 mmol) was added dropwise through the addition funnel, followed by 1 mL of DMSO containing ZW—NH2 (0.224 g, 1 mmol). After 2 hours, H2N-PEG-NH2 (0.15 g, 0.25 mmol) dissolved in 1 mL of DMSO were finally added to the reaction mixture. Once the addition was complete, the mixture was stirred at 45° C. overnight. The solvent was then removed under vacuum and the compound was precipitated by adding large excess of acetone. After centrifugation, the solid pellet was washed with chloroform and dried under vacuum. The final compound was a yellowish solid, with a reaction yield of 85%.

Example 8. Synthesis of His-PIMA-ZW/FA (10% Folic Acid)

In 50-mL three-neck round-bottom flask equipped with a magnetic stirring bar, PIMA (0.15 g, 0.975 mmol of monomers) was dissolved in 3 mL of DMSO, then the solution was purged with nitrogen for 10 min while stirring. To this solution, 1 mL of DMSO containing histamine (0.0542 g, 0.487 mmol) was added dropwise using a syringe. This was followed by the stepwise addition of 1 mL of folic acid solution in DMSO (0.043 g, 0.097 mmol), and 1 mL of DMSO containing ZW—NH2 (0.087 g, 0.39 mmol). The reaction mixture was further stirred at room temperature overnight, and then concentrated to ~1 mL under vacuum. The compound was precipitated by adding excess acetone and centrifuged for 3 min at 3700 RPM. The resulting solid pellet was washed with chloroform and dried under vacuum, yielding a yellow powder; the reaction yield was ~86%.

Example 9. Synthesis of LA-PIMA-ZW (50% LA and 50% ZW)

In a 50 mL three-neck round-bottom flask, 0.385 g of PIMA (MW~6000 g/mol, 2.5 mmol of monomer units) was dissolved in 5 mL of DMSO. The solution was purged with nitrogen and heated to 50° C. LA-NH$_2$ (0.31 g, 1.25 mmol) dissolved in 1 mL of DMSO was added to the PIMA solution via a syringe, followed by the addition of 1 mL of DMSO solution containing ZW—NH$_2$ (0.280 g, 1.25 mmol). The reaction mixture was left stirring at 50° C. overnight. The solution was concentrated to ~1 mL under vacuum, and 30 mL of acetone was added to precipitate the compound. After centrifugation of the mixture for 5 min at 3700 RPM, the solvent was decanted and the solid pellet was washed twice with chloroform then dried under vacuum. This provided the final product as yellow solid; the final yield was ~87%.

Example 10. Synthesis of LA-PIMA-ZW/R (R=10% Azide, 10% Amine, or 10% Biotin)

Synthesis of the reactive polymer ligands were carried out following the steps described above, except that 10% of the precursor ZW—NH$_2$ was substituted with R—NH$_2$ (where R=PEG-azide, PEG-amine, or biotin). Here, we detail the synthesis of azide-functionalized polymer ligand. The protocols for the synthesis of amine- and biotin-functionalized compounds are provided in Supporting Information. PIMA (0.385 g, 2.5 mmol of monomers) was dissolved in 5 mL of DMSO using a 50 mL round-bottom flask. The solution was purged with nitrogen and heated to 50° C., then 1 mL of DMSO containing LA-NH$_2$ (0.31 g, 1.25 mmol) was added using a syringe, followed by addition of 1 mL of DMSO containing H$_2$N-PEG-N$_3$ (0.156 g, 0.25 mmol) and ZW—NH$_2$ (0.224 g, 1 mmol). The mixture was left stirring overnight at 50° C. The solvent was removed under vacuum and the compound was precipitated by adding 30 mL of acetone. After centrifugation, the solid pellet was washed with chloroform and dried under vacuum, yielding the final compound as yellow solid; the final yield was ~79%.

Example 11. Synthesis of LA-PIMA-ZW/Biotin (10% Biotin)

In a 50 mL three-neck round-bottom flask equipped with a magnetic stirring bar, PIMA (0.2 g, 1.3 mmol of monomers) was dissolved in 3 mL of DMSO. The solution was purged with nitrogen. To this solution, 1 mL of DMSO containing LA-NH$_2$ (0.161 g, 0.65 mmol) was added using a syringe. This was followed by the addition of 1 mL of DMSO contacting biotin-NH$_2$ (0.0372 g, 0.13 mmol) and ZW—NH$_2$ (0.117 g, 0.52 mmol). The reaction mixture was further stirred at 40° C. overnight, and then concentrated to ~1 mL under vacuum. The compound was precipitated by adding 20 mL of acetone. The resulting solid pellet was washed with chloroform and dried under vacuum, yielding a yellow solid with final yield of ~82%.

Example 12. Synthesis of the QDs

The nanocrystals used in this study were made of CdSe—ZnS core-shell, grown via reduction of organometallic precursors at high temperature in a hot coordinating solvent mixture, in two steps: growth of the CdSe core followed by ZnS-overcoating. Growth of the CdSe core involved the reduction of cadmium and selenium precursors at high temperature in a hot (300-350° C.) coordinating solvent mixture made of trioctyl phosphine (TOP), trioctyl phosphine oxide (TOPO), alkylamines and alkylcarboxyls; the nanocrystal core size was controlled by adjusting the precursor concentrations and temperature. Overcoating the CdSe core with ZnS shell using zinc was carried by reducing sulfur precursors at lower temperature (150-180° C.). The QD sizes were tuned by varying the CdSe core radius, while maintaining the same overcoating ZnS layer for all samples.

Example 13. Ligand Exchange

We limit our description to the preparation of QDs capped with His-PIMA-ZW. The same protocol is applicable to capping with the other ligands. A solution of hydrophobic QDs (26.7 μL, 150 μL) was precipitated using ethanol and redispersed in 200 μL of chloroform. Separately, 15 mg of His-PIMA-ZW was dissolved in 200 μL of DMSO with gentle heating and sonication (for ~3-5 min). The ligand solution and the QD dispersion were then mixed in scintillation vial. The vial was sealed with a rubber septum and the atmosphere was switched to nitrogen by applying 2 to 3 rounds of mild vacuum; the mixture was then left stirring at room temperature overnight. The QDs were precipitated by adding 500 μL of hexane and acetone (in excess). Following sonication for ~1 min, the solution was centrifuged at 3700 RPM for ~5 min, yielding a pellet. The procedure was repeated one more time. The final precipitate was dried under vacuum for ~10 min to yield a powder, which could then be readily dispersed in 3-5 mL of phosphate buffer (pH 12, 50 mM); sonication for ~5 min may be needed to fully disperse the powder. The obtained clear aqueous dispersion of QDs was filtered through a 0.45 μM syringe filter, and excess free ligands were removed by applying 3-4 rounds of concentration/dilution with DI water using a centrifugal filtration device (Millipore, MW cutoff=50 kDa). This protocol has provided clear QD dispersions, e.g., ~500 μL with a concentration of ~7-8 Ligand exchange with His-PIMA-ZW/NH2 or with His-PIMA-ZW/FA was carried out following the same steps, except that the amount of polymer ligands used was ~20 mg for both cases. When the ligand solution was mixed with the QD dispersion in an organic mixture, the solution became turbid due to the limited solubility of zwitterion moieties in the modified-polymer.

Example 14. Photoligation of QDs

We focus on ligand exchange of hydrophobic QDs with LA-PIMA-ZW ligands. The same protocol can be applied to ligation of the QDs with LA-PIMA-ZW/$N_3$, LA-PIMA-ZW/$NH_2$ or LA-PIMA-ZW/biotin. The QD phase transfer to water was carried out in two steps: 1) coating with an intermediate ligand made of $H_2N$-PEG-OMe, followed by 2) photoligation with LA-PIMA-ZW ligand.
1. Ligation with $H_2N$-PEG-OMe.

A solution of hydrophobic TOP/TOPO-QDs (~26.7 μM, 150 μL) was precipitated with 3 mL of ethanol and redispersed in 150 μL of chloroform. Separately, 60 mg of $H_2N$-PEG-OMe was dissolved in 250 μL of chloroform. The ligand solution was then mixed with the QD dispersion in a scintillation vial. The vial was sealed with a rubber septum and the atmosphere was switched to nitrogen by applying 2 to 3 rounds of mild vacuum followed by purging with nitrogen. The mixture was then left stirring at room temperature for 3 hours; alternatively one can apply overnight stirring at 4° C. The QDs were precipitated by adding 5 mL of hexane. Following sonication for ~1 min, the solution was centrifuged at 3700 RPM for ~5 min, yielding a jell-like pellet. The pellet was dried under vacuum for ~10 min and redispersed in 200 μL of methanol.
2. Photoligation with LA-PIMA-ZW.

In a separate vial, 15 mg of LA-PIMA-ZW was dissolved in 300 methanol, followed by the addition of 20 μL of fresh KOH aqueous solution (0.1 g/mL); a slight sonication (1-2 min) can accelerate ligand dissolution. This solution was mixed with the QD dispersion prepared in step one above, then 30 μL of tetramethylammonium hydroxide (~5 mM) pre-dissolved in methanol was added. The vial was sealed with a rubber septum and the atmosphere was switched to nitrogen by applying 2 to 3 rounds of mild vacuum followed by flushing with nitrogen. The vial was then placed inside the UV photoreactor (peak at 350 nm, 4.5 mW/cm$^2$, Model LZC-4 V, Luzchem Research, Ottawa, Canada) and irradiated for 35 min while stirring. The sample was retrieved and excess tetrahydrofuran was added to precipitate out the QDs, followed by sonication and centrifugation; the steps were repeated one more time. The resulting QD pallet was dried under vacuum and then dispersed in buffer (pH 12, 50 mM), yielding a clear aqueous dispersion; sonication for ~5 min can be applied to speed up the homogenization. The dispersion was filtered through a 0.45 μM syringe filter, and excess free ligands were removed by applying 3-4 rounds of concentration/dilution with DI water using a centrifugal filtration device (Millipore, MW cutoff=50 kDa).

Example 15. NMR Sample Preparation

We used pulsed-field gradient water suppression to collect the $^1$H NMR spectra. Briefly, after ligand exchange and phase transfer of the QDs (as described above), the DI water was switched to $D_2O$ by applying two rounds of concentration/dilution using deuterium oxide (2 mL each). The final volume of the QD dispersions in D2O used to collect the NMR spectra was adjusted to 500 μL and the concentration was ~8-9 μM. The $^1$H NMR spectra were collected by averaging over 500 scans. The samples used for surface ligand counting experiments were prepared following the same protocol, but 2 μL of pyridine (24.8 μmol) dissolved in 5 μL of $D_2O$ was added to the QD dispersion as standard. We should note that the final QD concentration in the NMR sample was slightly altered with the addition of pyridine (e.g., addition of pyridine reduced the QD concentration from ~8.6 μM to ~8.5 μM).

Example 16. Assembly of QD-Protein Conjugates

Two different proteins were used for conjugation onto the QDs via metal-histidine promoted self-assembly: maltose binding protein appended with a 7-histidine sequence (MBP-His7) and the fluorescent mCherry protein appended with a 6-histidine sequence (mCherry-His6); both sequences were inserted at the N-terminus. The protein expression and purification were carried out following the protocols detailed in reference 63. The conjugation was carried out using the same steps for both proteins. Here we detail the assembly of QD-mCherry conjugates with varying valence. ~22.2 μL aliquots of a stock QD dispersion (3.6 μM) were loaded into Eppendorf tubes and the volume in each tube was adjusted by adding phosphate buffer (pH 8.0, 40 mM) to 100 μL. The desired amounts of mCherry solutions were loaded into separate tubes, followed by the addition of phosphate buffer to bring the total volume to 300 μL. The ratio of mCherry-to-QD (i.e., valence) explored in this study was varied from 0.5:1 to 12:1. For example, dispersion with a valence of ~1 was prepared by adding ~6.2 μL of mCherry stock solution (12.9 μM) to 294 μL of phosphate buffer, followed by gentle mixing with the QD dispersion and incubation at 4° C. for 30 min to allow for self-assembly. The samples were then characterized by collecting the absorption and emission spectra.

Example 17. QD-Dopamine Conjugates

Freshly prepared QDs capped with His-PIMA-ZW/NH2 (10% amine) were reacted with dopamine-ITC to provide the final QD-dopamine conjugates.70 We prepared three sets of conjugate dispersions by reacting the His-PIMA-ZW/NH2-QDs with different amounts of dopamine-ITC. The first set was prepared by adding 25 μL aliquots of dopamine-ITC pre-dissolved in DMSO (0.5 mg/mL) to scintillation vials containing 136 µL of QD dispersion (~5.90 µM) and 20 µL NaCl solution (1 M); DI water was then added to bring the total volume to ~1 mL. The mixtures were then stirred for ~3 h in the dark, followed by removal of excess free/unreacted dopamine using one round of concentration/dilution through a membrane filtration device (MW cutoff: 50 kDa, Millipore) to provide the final conjugate dispersions (1 mL and ~0.8 µM QD concentration). For the other two samples, 50 µL and 100 µL aliquots of dopamine-ITC were reacted with the QD dispersions.

1) pH-Dependent Quenching of QD Fluorescence.

The pH-dependent PL quenching data were collected for all three sets of conjugates with QD-dopamine concentration of ~32 nM. These were prepared by mixing aliquots (40 µL) of the conjugate stock dispersions with 960 µL of phosphate buffer (10 mM) at the desired pH. The florescence spectra were collected for each sample, and the integrated PL signal was reported relative to the value measured at pH 4.

2) Interactions of QD-Dopamine with Soluble Cysteine.

The stock dispersions of QD-dopamine conjugates used in these experiments were prepared using 50 µL of dopamine-ITC (intermediate dopamine valence). 40 µL aliquots of the QD-dopamine conjugates were first dispersed in phosphate buffer (pH 10, 10 mM), then the desired volumes of cysteine stock solution (concentration=0.1 mM) were added. The final volume of solutions was adjusted to 1 mL by adding the required amounts of pH 10 buffer. The cysteine concentrations used in these measurements were 1, 4, and 8 µM (i.e., excess cysteine). The mixtures were incubated for different time periods and the PL spectra were recorded after each period.

3) Fluorescence Sensing of Fe Ions Using QD-Dopamine Conjugates.

Here, we started with the dispersions of QD-dopamine conjugates having the lowest valence (dispersions of conjugates prepared using 25 µL of dopamine-ITC). The conditions used for conjugation of QDs to dopamine-ITC were identical to those described above, except that the DI water was purged with argon for ~20 min.70 Separately, a stock solution of Fe ion (2 mM) was freshly prepared by dissolving $FeCl_3 \cdot 6H_2O$ in DI water. Then, aliquots of the QD-dopamine dispersions (50 µL) were diluted in DI water and mixed with the desired volume of Fe solution. The final total volume of the mixture was 1.5 mL. The concentration of QD-dopamine was fixed at ~26.7 nM, while that of Fe ions was varied from 0 to 20 µM. The PL spectrum was collected for each dispersion and the intensity was plotted versus the Fe ion concentration and reaction time.

4). Cysteine-Induced PL Recovery of QD-Dopamine-Fe-Complex Conjugates.

We start with a dispersion of QD-dopamine pre-mixed with Fe ions, i.e., quenched QD PL. This dispersion was prepared by diluting 50 µL of QD-dopamine conjugates in 1.423 mL of DI water, followed by the addition of 15 µL of Fe solution (2 mM). Then, 12 µL of cysteine was added to above solution and mixed. The final total volume of the dispersion was 1.5 mL, while the final concentrations of Fe and cysteine were 20 µM and 8 µM, respectively. The PL spectra were recorded from the sample at different time intervals. We started with Fe concentration that gave us the highest quenching (see above).

Example 18. Preparation of QD-Transferrin Conjugates

To prepare the QD-transferrin conjugates, the carboxylic groups available on the His-PIMA-ZW-QDs (freed during the addition reaction) were reacted with the amine groups of transferrin, via EDC/NHS condensation reaction. See Reference 79. Briefly, 50 µL of His-PIMA-ZW-capped QDs (7.22 µM) were first dispersed in 400 µL of phosphate buffer (pH=6.5, 50 mM), and then 100-fold excess of NHS (8.5 mM, 4.2 µL) and EDC (5 mM, 7.2 µL) dissolved in DI water was added. The reaction was left to proceed for ~3 hours at room temperature, then the excess EDC and NHS were removed by applying one round of concentration/dilution with DI water using a membrane filtration device (MW cutoff: 50 kDa, Millipore). The purified QD-NHS esters were added to 400 µL of phosphate buffer (pH=7.8, 20 mM) containing ~20-fold excess of transferrin (0.58 mg, MW=80 kDa) with respect to the QD concentration, and the mixture was incubated at 4° C. overnight. The conjugates were separated from unbound transferrin and NHS byproducts via size exclusion chromatography using PD 10 column. The first eluted fraction containing the QD-transferrin conjugates was used for the cellular uptake experiments.

Example 19. Cell Imaging

HeLa cell cultures (human cervix carcinoma cell line), provided by the FSU cell culture facility, were grown at 37° C. in a humidified 5% CO2 atmosphere at 37° C., as a monolayer in a complete growth medium (Dulbecco's Modified Eagle's Medium, DMEM, Cellgro), supplemented with 10% (v/v) fetal bovine serum (Gibco), 4.5 g/L glucose, L-glutamine, sodium pyruvate, 1% (v/v) antibiotic-antimycotic 100× (Gibco), and 1% (v/v) non-essential amino-acid solution 100× (Sigma). 8×104 of the above cells were seeded onto 12 mm round micro-cover glasses in a 24-well microplate (CellStar, VWR). The plates were placed in an incubator for 24 hours to allow for cell attachment. The cells were then incubated with QD-FA or QD-transferrin conjugates and Texas Red labeled transferrin (at a concentration of ~0.5 µM). The QD concentrations and incubation times were adjusted according to the experimental needs. After incubation the cells were washed with PBS buffer twice, fixed with 3.7% paraformaldehyde and stained with 4,6-diamino-2-phenylindole (Prolong Antifade mounting media with DAPI nuclear staining, Invitrogen). Control experiments were carried out by incubating the cells with polymer-coated QDs (without folic acid or transferrin). The fluorescence images were acquired using an Inverted Nikon Eclipse Ti Microscope equipped with a color CoolSNAP HQ2 CCD camera. Excitation of the sample was provided by a Xe lamp, while the fluorescence images were collected using a 60× objective (Nikon) and a set of filter cubes from Chroma Technology (Rockingham, Vt.). The DAPI fluorescence was detected using a DAPI cube (with 340-380 nm excitation and 435-485 nm emission), the QD signal was detected using a GFP/EGFP cube (with 450-490 nm excitation and 500-550 nm emission), and the Texas Red-transferrin florescence was detected using a TEXAS RED HYQ cube (with 532-587 nm excitation and 608-683 nm emission).

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A composition comprising a polymer comprising a repeat unit (F) as represented by the following structure:

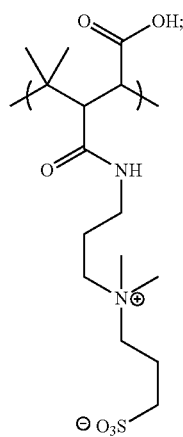

(F)

wherein the polymer further comprises a repeat unit selected from the group consisting of a repeat unit (A'), a repeat unit (A"), a repeat unit (B), and any combination thereof, as represented by the following structures:

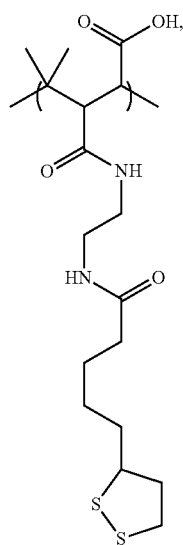

(A')

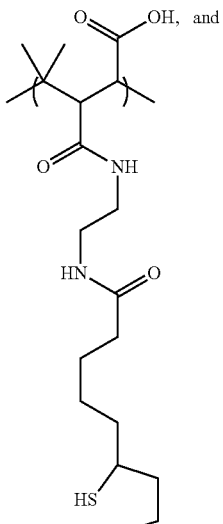

(A")

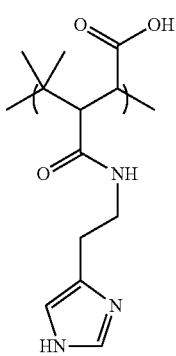

(B)

further wherein the polymer further comprises a repeat unit selected from the group consisting of a repeat unit (G), a repeat unit (H), and a combination thereof, as represented by the following structures:

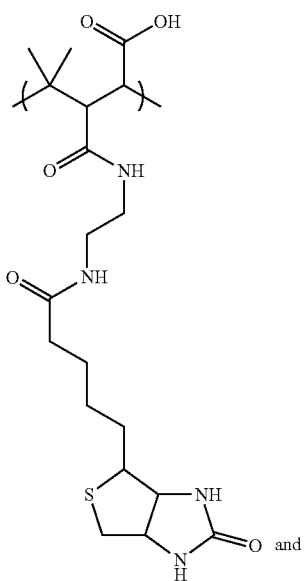

(G)

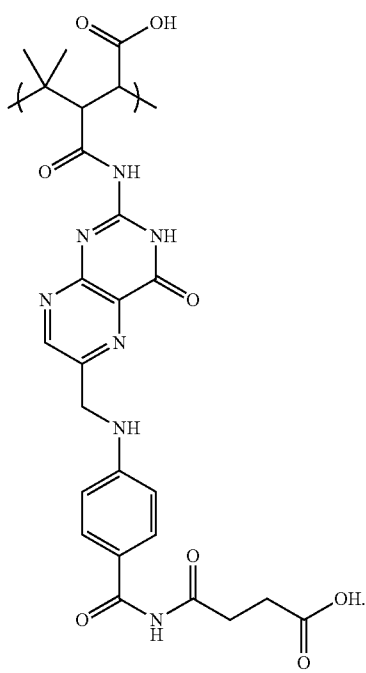
(H)

2. The composition of claim 1 wherein the polymer further comprises a repeat unit (E') as represented by the following structure:

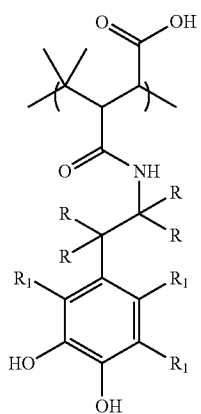
(E')

wherein each R is independently hydrogen or COOH, and each $R_1$ is independently —H, —NO$_2$, or —OH.

3. The composition of claim 1 wherein the polymer further comprises a repeat unit (E") as represented by the following structure:

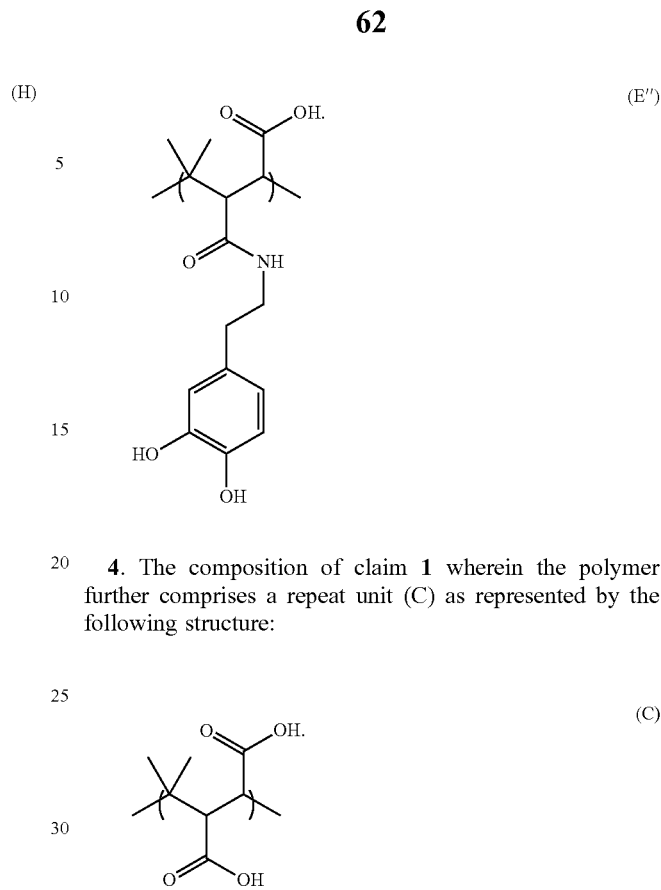
(E")

4. The composition of claim 1 wherein the polymer further comprises a repeat unit (C) as represented by the following structure:

(C)

5. The composition of claim 1 wherein the polymer further comprises a repeat unit (D), as represented by the following structure:

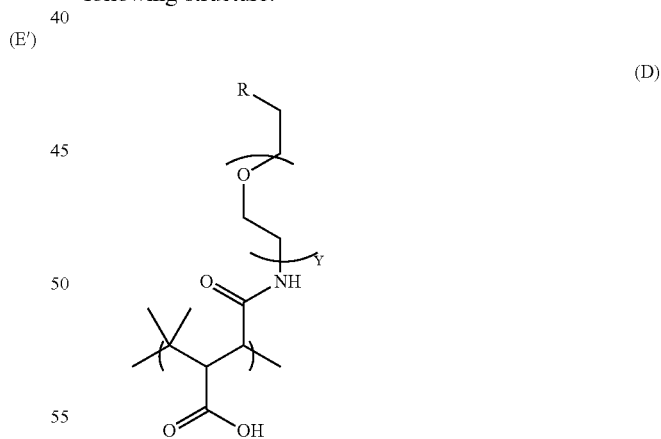
(D)

wherein Y has a value between one and about 100 and each R is independently selected from the group consisting of hydroxy (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin.

6. The composition of claim 1 wherein the polymer further comprises the repeat unit (G), as represented by the following structure:

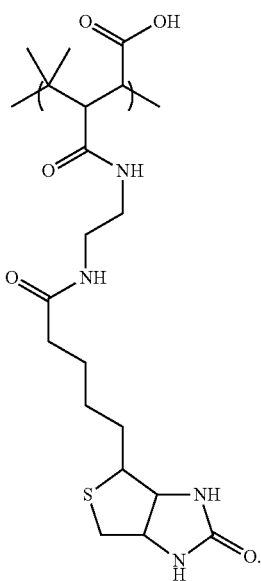
(G)

7. The composition of claim 1 wherein the polymer further comprises the repeat unit (H), as represented by the following structure:

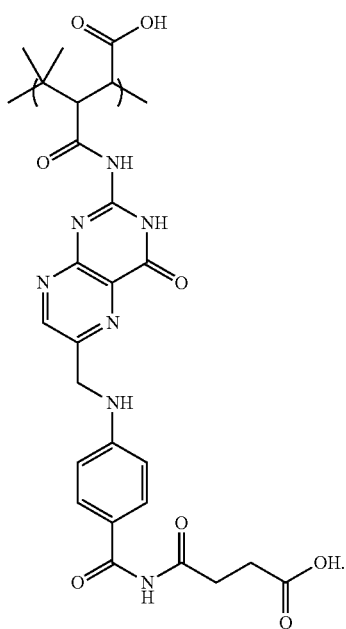
(H)

8. The composition of claim 1 wherein the polymer comprises the combination of:
(i) the repeat unit (F);
(ii) at least one of the repeat unit (A') and the repeat unit (A");
(iii) the repeat unit (B); and
(iv) at least one of the repeat unit (G) and the repeat unit (H); and
further wherein a molar ratio of the at least one of the repeat unit (A') and the repeat unit (A") to the repeat unit (B) is between 2:1 and 1:2.

9. A composition comprising
a nanoparticle; and
a coating encompassing the nanoparticle, the coating comprising a polymer comprising repeat unit (F) as represented by the following structure:

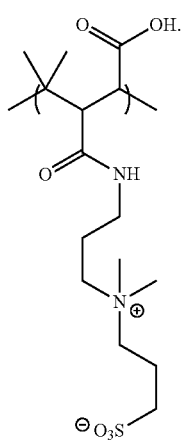
(F)

wherein the polymer further comprises a repeat unit selected from the group consisting of repeat unit (A'), repeat unit (A"), repeat unit (B), and any combination thereof, as represented by the following structures:

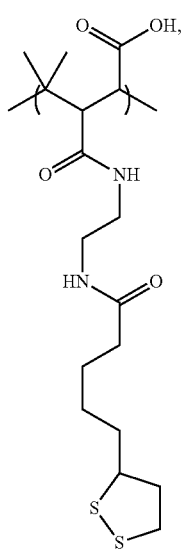
(A')

(A″)

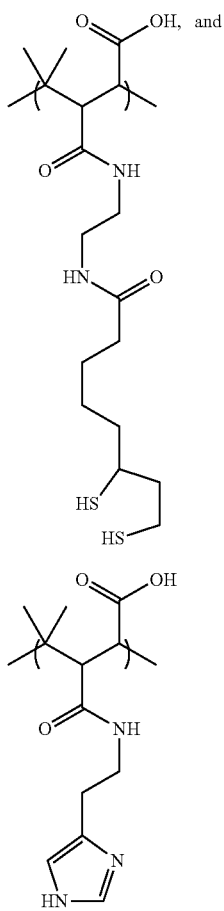

further wherein the polymer further comprises a repeat unit selected from the group consisting of a repeat unit (G), a repeat unit (H), and a combination thereof, as represented by the following structures:

(G)

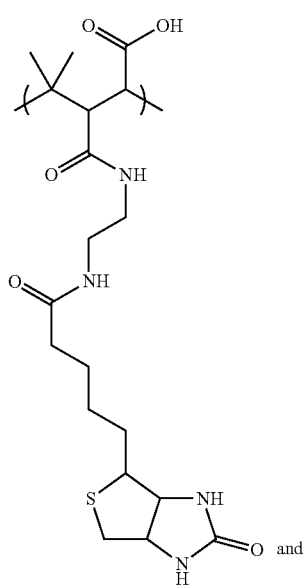

and (H)

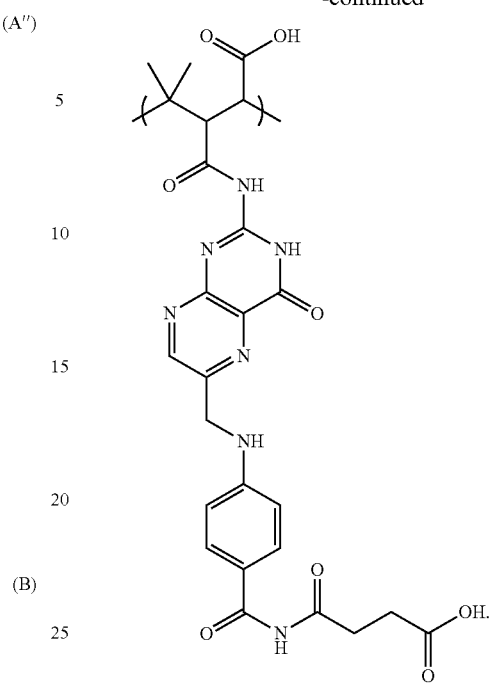

10. The composition of claim 9 wherein the nanoparticle comprises a semiconductor material.

11. The composition of claim 9 wherein the nanoparticle comprises a magnetic material.

12. The composition of claim 9 wherein the nanoparticle comprises a material selected from the group consisting of $Fe_3O_4$, $Fe_2O_3$, FePt, Co, Mn-doped $Fe_3O_4$, CdSeS/ZnS, InP/ZnS, PbS, CdTe, CoPt, FeCoPt, $CoFe_2O_4$, MnO, $Mn_3O_4$, $Co_3O_4$, FeO, Ni, $TiO_2$, $Al_2O_3$, CdSe, PbSe, $ZrO_2$, ZnO, Au, Ag, and graphene oxide.

13. The composition of claim 9 wherein the polymer further comprises a repeat unit (E') as represented by the following structure:

(E')

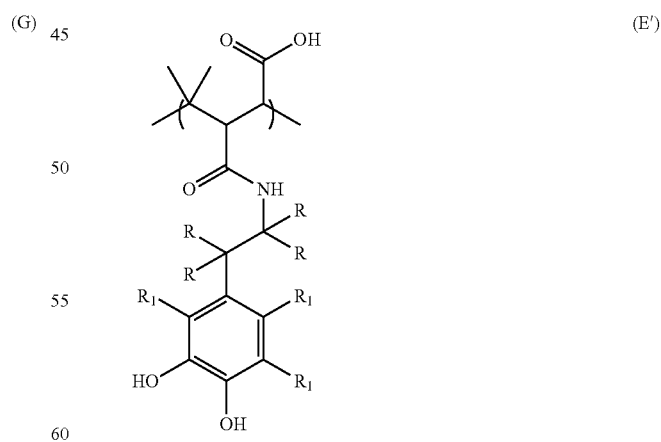

wherein each R is independently hydrogen or —COOH, and
each $R_1$ is independently —H, —$NO_2$, or —OH.

14. The composition of claim 9 wherein the polymer further comprises a repeat unit (E″) as represented by the following structure:

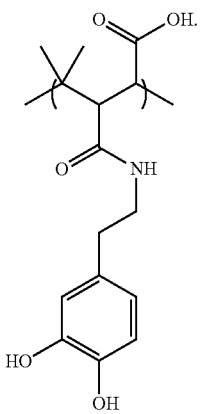
(E'')

15. The composition of claim 9 wherein the polymer further comprises a repeat unit (C) as represented by the following structure:

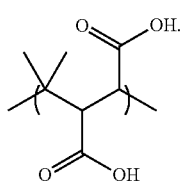
(C)

16. The composition of claim 9 wherein the polymer further comprises a repeat unit (D), as represented by the following structure:

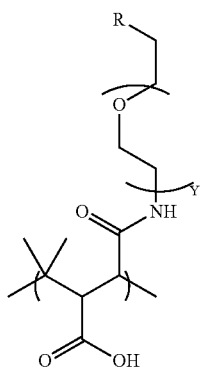
(D)

wherein Y has a value between one and about 100 and each R is independently selected from the group consisting of hydroxy (—OH), methoxy (—OCH$_3$), amino (—NH$_2$), azido (—N$_3$), thiol (—SH), lipoic acid, ethynyl (—C≡CH), carboxyl (—COOH), aldehyde (—C(O)H), maleimide, and biotin.

17. The composition of claim 9 wherein the polymer further comprises the repeat unit (G), as represented by the following structure:

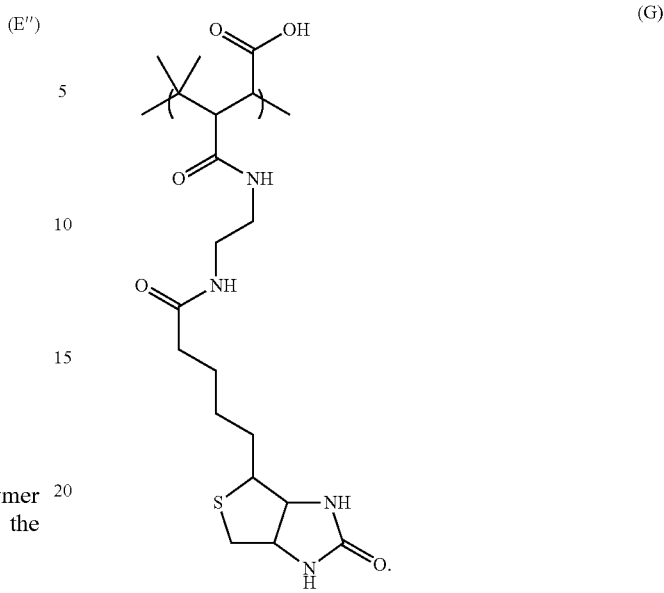
(G)

18. The composition of claim 9 wherein the polymer further comprises the repeat unit (H), as represented by the following structure:

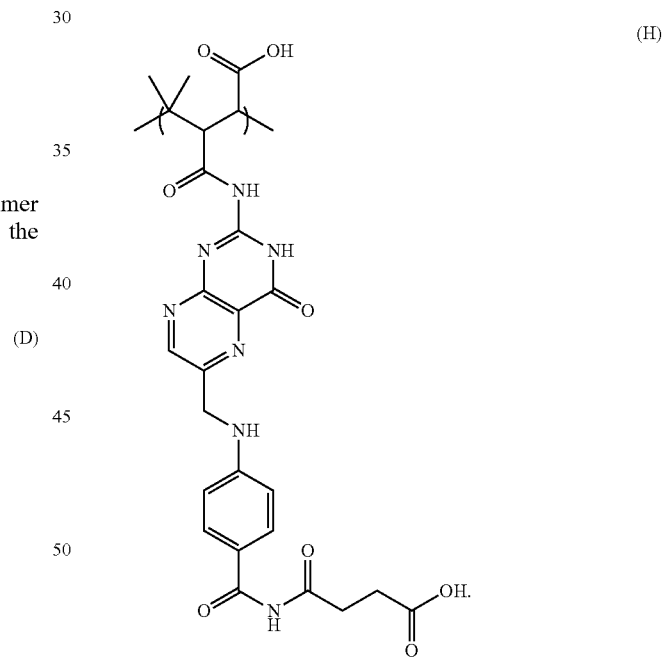
(H)

19. The composition of claim 9 wherein the polymer comprises the combination of:
 (i) the repeat unit (F);
 (ii) at least one of the repeat unit (A') and the repeat unit (A'');
 (iii) the repeat unit (B); and
 (iv) at least one of the repeat unit (G) and the repeat unit (H); and
 further wherein a molar ratio of the at least one of the repeat unit (A') and the repeat unit (A'') to the repeat unit (B) is between 2:1 and 1:2.

* * * * *